United States Patent
Penland, Jr. et al.

(10) Patent No.: US 10,017,903 B2
(45) Date of Patent: *Jul. 10, 2018

(54) INDUSTRIAL MATS HAVING SIDE PROTECTION

(71) Applicant: QUALITY MAT COMPANY, Beaumont, TX (US)

(72) Inventors: Joe Penland, Jr., Beaumont, TX (US); Rustin Penland, Beaumont, TX (US); Scott Calvert, Beaumont, TX (US); Thomas O'Brien, Wanaka (NZ)

(73) Assignee: Quality Mat Company, Beaumont, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/789,412

(22) Filed: Oct. 20, 2017

(65) Prior Publication Data

US 2018/0058016 A1 Mar. 1, 2018

Related U.S. Application Data

(63) Continuation of application No. 15/244,483, filed on Aug. 23, 2016, now Pat. No. 9,822,493, which is a
(Continued)

(51) Int. Cl.
*E01C 9/08* (2006.01)
*B32B 3/08* (2006.01)
(Continued)

(52) U.S. Cl.
CPC .............. *E01C 9/086* (2013.01); *B32B 3/06* (2013.01); *B32B 3/085* (2013.01); *B32B 3/14* (2013.01);
(Continued)

(58) Field of Classification Search
CPC ... E01C 9/086; E01C 9/08; E01C 5/00; E01C 11/24
See application file for complete search history.

(56) References Cited

U.S. PATENT DOCUMENTS 2,836,529 A 5/1958 Morris
3,078,621 A 2/1963 Hinds
(Continued)

FOREIGN PATENT DOCUMENTS

CA 2 233 776 A1 12/1999
CA 2 557 701 A1 2/2008
(Continued)

OTHER PUBLICATIONS

Richard West Co., Inc., Steel Reinforced Crane Mat, downloaded from the internet on May 11, 2016 (see http://www.richardwestcompany.com/products.html).
(Continued)

*Primary Examiner* — Abigail A Risic
(74) *Attorney, Agent, or Firm* — Winston & Strawn LLP

(57) ABSTRACT

An industrial mat that has a support core configured and arranged to support other components of the mat; and upper and lower layers that provide upper and lower surfaces of the mat and that protect the support core. The support core includes a frame of longitudinal side members, end members and cross members each of which is made of steel or a thermosetting plastic material. The frame can include wood, plastic or elastomeric internal members or materials to fill internal open areas of the frame, with the upper and lower layers and the sides and ends of the frame retaining the internal members or materials therein. The mat preferably includes lifting elements of D-shaped rings, O-shaped rings, chains, or cables attached to the upper or lower layer or the
(Continued)

support core to provide certified overhead lifting of the mat for installation and reclamation thereof.

20 Claims, 52 Drawing Sheets

Related U.S. Application Data continuation-in-part of application No. 15/188,113, filed on Jun. 21, 2016, now Pat. No. 9,663,903, which is a continuation-in-part of application No. 15/155,685, filed on May 16, 2016, which is a continuation-in-part of application No. 15/081,340, filed on Mar. 25, 2016, now Pat. No. 9,476,164, which is a continuation-in-part of application No. 15/056,212, filed on Feb. 29, 2016, now Pat. No. 9,447,547, which is a continuation-in-part of application No. 14/839,888, filed on Aug. 28, 2015, now Pat. No. 9,315,949, said application No. 15/244,483 is a continuation-in-part of application No. 15/056,344, filed on Feb. 29, 2016, now Pat. No. 9,663,902, and a continuation-in-part of application No. 15/056,212, filed on Feb. 29, 2016, now Pat. No. 9,447,547, and a continuation-in-part of application No. 14/855,336, filed on Sep. 15, 2015, now Pat. No. 9,486,976, and a continuation-in-part of application No. 15/155,685, filed on May 16, 2016, and a continuation-in-part of application No. 15/081,340, filed on Mar. 25, 2016, now Pat. No. 9,476,164, which is a continuation-in-part of application No. 15/056,344, filed on Feb. 29, 2016, now Pat. No. 9,663,902, which is a continuation-in-part of application No. 14/839,900, filed on Aug. 28, 2015, now Pat. No. 9,315,951.

(60) Provisional application No. 62/054,186, filed on Sep. 23, 2014, provisional application No. 62/138,143, filed on Mar. 25, 2015, provisional application No. 62/158,196, filed on May 7, 2015, provisional application No. 62/052,954, filed on Sep. 19, 2014, provisional application No. 62/211,662, filed on Aug. 28, 2015, provisional application No. 62/211,664, filed on Aug. 28, 2015.

(51) Int. Cl.

| | | |
|---|---|---|
| B32B 3/14 | (2006.01) | |
| B32B 3/18 | (2006.01) | |
| E01C 5/00 | (2006.01) | |
| E01C 5/22 | (2006.01) | |
| B32B 3/26 | (2006.01) | |
| B32B 7/00 | (2006.01) | |
| B32B 7/08 | (2006.01) | |
| B32B 15/095 | (2006.01) | |
| B32B 15/18 | (2006.01) | |
| B32B 21/04 | (2006.01) | |
| B32B 21/12 | (2006.01) | |
| B32B 25/04 | (2006.01) | |
| B32B 27/06 | (2006.01) | |
| B32B 27/08 | (2006.01) | |
| B32B 3/06 | (2006.01) | |

(52) U.S. Cl.
CPC ............ *B32B 3/18* (2013.01); *B32B 3/266* (2013.01); *B32B 7/005* (2013.01); *B32B 7/08* (2013.01); *B32B 15/095* (2013.01); *B32B 15/18* (2013.01); *B32B 21/04* (2013.01); *B32B 21/045* (2013.01); *B32B 21/12* (2013.01); *B32B 25/04* (2013.01); *B32B 27/06* (2013.01); *B32B 27/08* (2013.01); *E01C 5/006* (2013.01); *E01C 5/22* (2013.01); *B32B 2274/00* (2013.01); *B32B 2307/558* (2013.01); *B32B 2307/712* (2013.01); *B32B 2471/04* (2013.01); *B32B 2605/00* (2013.01); *B32B 2607/00* (2013.01); *E01C 2201/10* (2013.01); *E01C 2201/12* (2013.01)

(56) References Cited

U.S. PATENT DOCUMENTS

| | | |
|---|---|---|
| 3,985,169 A | 10/1976 | Chow |
| 4,324,037 A | 4/1982 | Grady, II |
| 4,462,712 A | 7/1984 | Penland, Sr. |
| 4,600,336 A | 7/1986 | Waller, Jr. |
| 4,629,358 A | 12/1986 | Springston et al. |
| 4,875,800 A | 10/1989 | Hicks |
| 4,889,444 A | 12/1989 | Pouyer |
| 4,932,178 A | 6/1990 | Mozingo |
| 5,020,937 A | 6/1991 | Pouyer |
| 5,032,037 A | 7/1991 | Phillips |
| 5,050,366 A | 9/1991 | Gardner et al. |
| 5,113,632 A | 5/1992 | Hanson |
| 5,139,845 A | 8/1992 | Beckerman et al. |
| 5,163,776 A | 11/1992 | Pouyer |
| 5,241,163 A | 8/1993 | Vachtsevanos et al. |
| 5,273,373 A | 12/1993 | Pouyer |
| 5,342,260 A | 8/1994 | Markland |
| 5,402,609 A | 4/1995 | Kelley, Jr. |
| 5,535,694 A | 7/1996 | Czipri |
| 5,653,551 A | 8/1997 | Seaux |
| 5,679,191 A | 10/1997 | Robinson |
| 5,822,944 A | 10/1998 | Penland, Sr. |
| 5,888,612 A | 3/1999 | Needham et al. |
| 5,930,967 A | 8/1999 | Stoehr et al. |
| 5,985,415 A | 11/1999 | Giltner |
| 6,007,271 A | 12/1999 | Cole et al. |
| 6,023,900 A | 2/2000 | Stoehr et al. |
| 6,214,428 B1 | 4/2001 | Henderson |
| 6,231,950 B1 | 5/2001 | Giltner |
| 6,231,994 B1 | 5/2001 | Totten |
| 6,259,373 B1 | 7/2001 | Ghahramani |
| 6,365,650 B1 | 4/2002 | Chen et al. |
| 6,380,309 B1 | 4/2002 | Parker et al. |
| 6,450,235 B1 | 9/2002 | Lee |
| 6,474,905 B1 | 11/2002 | Smith, Jr. |
| 6,497,956 B1 | 12/2002 | Phillips et al. |
| 6,511,257 B1 | 1/2003 | Seaux et al. |
| 6,649,110 B1 | 11/2003 | Seaux et al. |
| 6,662,508 B1 | 12/2003 | Else |
| 6,695,527 B2 | 2/2004 | Seaux et al. |
| 6,722,831 B2 | 4/2004 | Rogers |
| 6,763,873 B2 | 7/2004 | Lee |
| 6,821,623 B2 | 11/2004 | Kvesic |
| 6,945,732 B2 | 9/2005 | Renick |
| 7,137,226 B2 | 11/2006 | Fiutak et al. |
| 7,303,800 B2 | 12/2007 | Rogers |
| 7,404,690 B2 | 7/2008 | Lukasik et al. |
| 7,413,374 B2 | 8/2008 | Rogers et al. |
| 7,427,172 B2 | 9/2008 | Lukasik |
| D609,956 S | 2/2010 | Lukasik |
| 7,818,929 B2 | 10/2010 | Fiutak et al. |
| 7,934,885 B2 | 5/2011 | Fournier |
| 8,061,929 B2 | 11/2011 | Dagesse |
| 8,070,004 B2 | 12/2011 | Williams et al. |
| 8,088,477 B2 | 1/2012 | Curtis et al. |
| 8,382,393 B1 | 2/2013 | Phillips |
| 8,424,577 B2 | 4/2013 | Poutanen |
| 8,613,373 B2 | 12/2013 | Holtby et al. |
| 8,734,263 B2 | 5/2014 | Ford et al. |
| 8,784,001 B1 | 7/2014 | Phillips |
| 8,857,125 B2 | 10/2014 | Lu et al. |
| 8,906,480 B2 | 12/2014 | Fiutak et al. |
| 8,936,073 B1 | 1/2015 | Phillips |
| 9,133,598 B2 | 9/2015 | Hsu |
| 9,315,951 B1 | 4/2016 | Penland, Jr. |

(56) References Cited

U.S. PATENT DOCUMENTS

| | | |
|---|---|---|
| 9,347,184 B2 | 5/2016 | Evelyn |
| 9,476,164 B2 | 10/2016 | Penland, Jr. et al. |
| 2002/0110418 A1 | 8/2002 | Renick |
| 2003/0192804 A1 | 10/2003 | Gheblikian |
| 2004/0037644 A1 | 2/2004 | Renick |
| 2004/0071914 A1 | 4/2004 | Fiutak et al. |
| 2004/0253055 A1 | 12/2004 | Polivka, Jr. |
| 2005/0022363 A1 | 2/2005 | Harrison |
| 2006/0034654 A1 | 2/2006 | Sanders |
| 2006/0179733 A1 | 8/2006 | Padmanabhan |
| 2006/0260264 A1 | 11/2006 | Reynolds |
| 2006/0265976 A1 | 11/2006 | Fiutak |
| 2007/0056228 A1 | 3/2007 | Penland, Sr. et al. |
| 2007/0237581 A1 | 10/2007 | Lukasik et al. |
| 2008/0028703 A1 | 2/2008 | Brandstorm |
| 2008/0085154 A1 | 4/2008 | Lukasik |
| 2008/0152861 A1 | 6/2008 | Barker |
| 2008/0292397 A1 | 11/2008 | Farney et al. |
| 2009/0087261 A1 | 4/2009 | Fournier |
| 2009/0301004 A1 | 12/2009 | Dagesse |
| 2011/0233363 A1 | 9/2011 | Wold |
| 2011/0280657 A1 | 11/2011 | Martinez |
| 2012/0063844 A1 | 3/2012 | Wold |
| 2013/0156501 A1 | 6/2013 | Hemphill |
| 2013/0284872 A1 | 10/2013 | Tubbs |
| 2013/0306804 A1 | 11/2013 | Holtby et al. |
| 2013/0318896 A1 | 12/2013 | Rogers |
| 2014/0154462 A1 | 6/2014 | Fiutak et al. |
| 2014/0183319 A1 | 7/2014 | Tubbs |
| 2014/0186573 A1 | 7/2014 | Tubbs |
| 2014/0193196 A1 | 7/2014 | Fournier |
| 2014/0199119 A1 | 7/2014 | Stasiewich |
| 2014/0205377 A1 | 7/2014 | Hill |
| 2014/0341649 A1 | 11/2014 | Bryan et al. |

FOREIGN PATENT DOCUMENTS

| | | |
|---|---|---|
| CA | 2 637 470 A1 | 1/2010 |
| EP | 1 600 558 A1 | 11/2005 |
| EP | 2 705 950 A1 | 3/2014 |
| WO | 95/25076 A1 | 9/1995 |
| WO | 2006/002507 A1 | 1/2006 |
| WO | 2006/048654 A1 | 5/2006 |
| WO | 2007/112537 A1 | 10/2007 |

OTHER PUBLICATIONS

Forest Products Laboratory. Wood Handbook—Wood as an Engineering Material—4. Mechanical Properties of Wood. U.S. Department of Agriculture. Online version available at: app.knovel.com/hotlink/pdf/id:kt0052LP04/wood-handbook-wood-an/mechanical-properties (1999).
"Inflammable". Wiktionary. Archived Sep. 6, 2014.
Quality Mat Company website: http://www.qmat.com/ (2015).
"Crane Mat," retrieved from http://www.qmat.com/products/crane-mats/ (2015).
Invitation to Pay Additional Fees, Appl. No. PCT/US2016/020067, Jun. 20, 2016.
International Search Report and Written Opinion, Appl. No. PCT/US2016/020067, dated Aug. 8, 2016.
International Search Report and Written Opinion, Appl. No. PCT/US2016/020081, dated Jun. 2, 2016.
International Search Report and Written Opinion, Appl. No. PCT/US2017/014658, dated Jul. 10, 2017.
U.S. Appl. No. 14/839,888, Non-Final Rejection, dated Nov. 6, 2015.
U.S. Appl. No. 14/839,888, Notice of Allowance, dated Jan. 14, 2016.
U.S. Appl. No. 14/839,888, Notice of Allowability, dated Feb. 19, 2016.
U.S. Appl. No. 15/056,212, Non-Final Rejection, dated Apr. 22, 2016.
U.S. Appl. No. 15/056,212, Notice of Allowance, dated Jun. 9, 2016.
U.S. Appl. No. 15/056,212, Notice of Allowability, dated Aug. 11, 2016.
U.S. Appl. No. 15/056,212, Notice of Allowability, dated Aug. 25, 2016.
U.S. Appl. No. 15/081,340, Non-Final Rejection, dated May 6, 2016.
U.S. Appl. No. 15/081,340, Notice of Allowance, dated Jun. 15, 2016.
U.S. Appl. No. 15/081,340, Notice of Allowability, dated Sep. 1, 2016.
U.S. Appl. No. 15/081,340, Notice of Allowability, dated Sep. 23, 2016.
U.S. Appl. No. 15/155,685, Non-Final Rejection, dated Oct. 3, 2016.
U.S. Appl. No. 15/244,483, Non-Final Rejection, dated Jun. 19, 2017.
U.S. Appl. No. 15/244,483, Notice of Allowance, dated Jul. 20, 2017.
U.S. Appl. No. 15/244,614, Non-Final Rejection, dated Dec. 15, 2016.
U.S. Appl. No. 15/244,614, Final Rejection, dated Mar. 9, 2017.
U.S. Appl. No. 15/244,614, Notice of Allowance, dated Apr. 13, 2017.
U.S. Appl. No. 15/244,614, Notice of Allowability, dated Apr. 27, 2017.
U.S. Appl. No. 15/377,545, Non-Final Rejection, dated Feb. 10, 2017.
U.S. Appl. No. 15/377,545, Notice of Allowance, dated Feb. 28, 2017.
U.S. Appl. No. 15/377,545, Corrected Notice of Allowability, dated Mar. 10, 2017.
U.S. Appl. No. 15/621,989, Non-Final Rejection, dated Aug. 25, 2017.

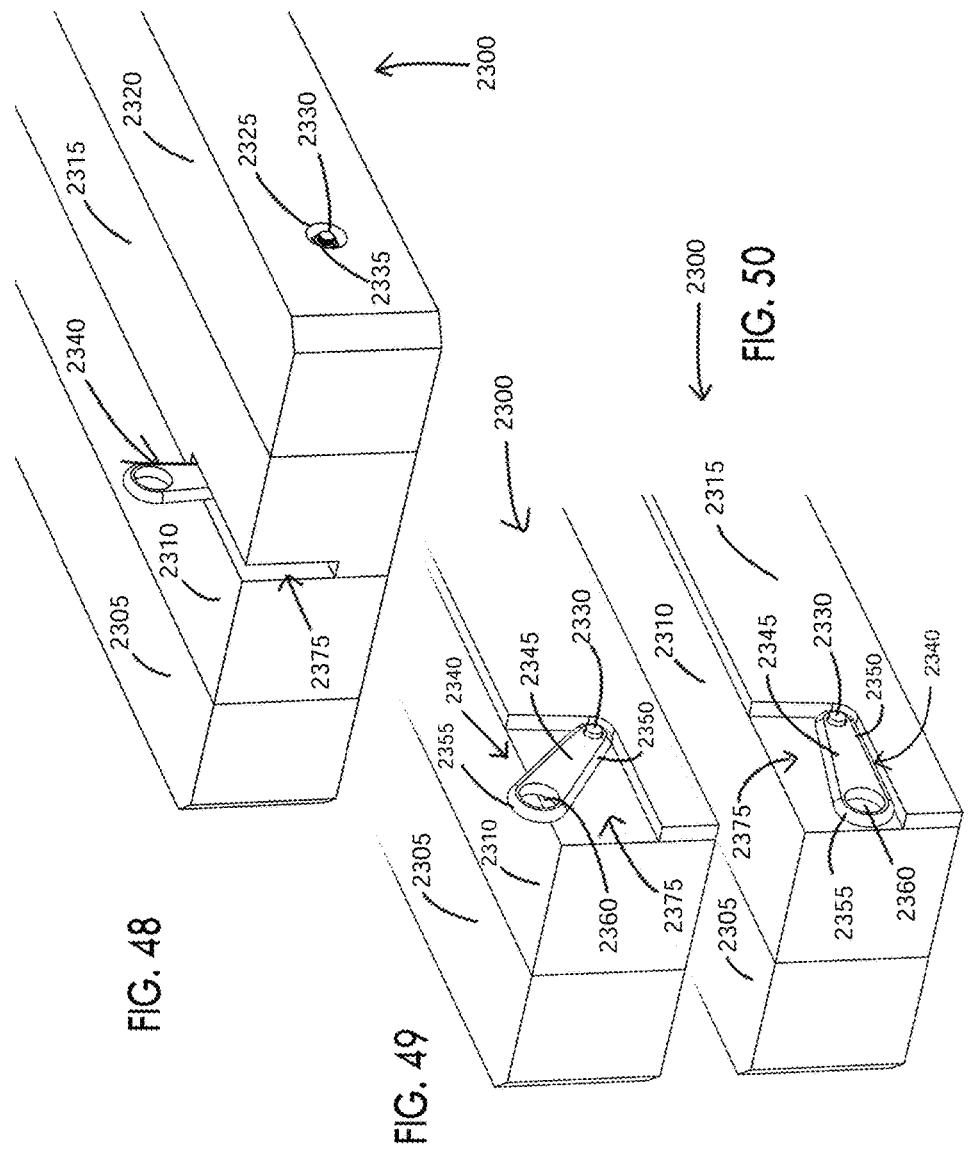

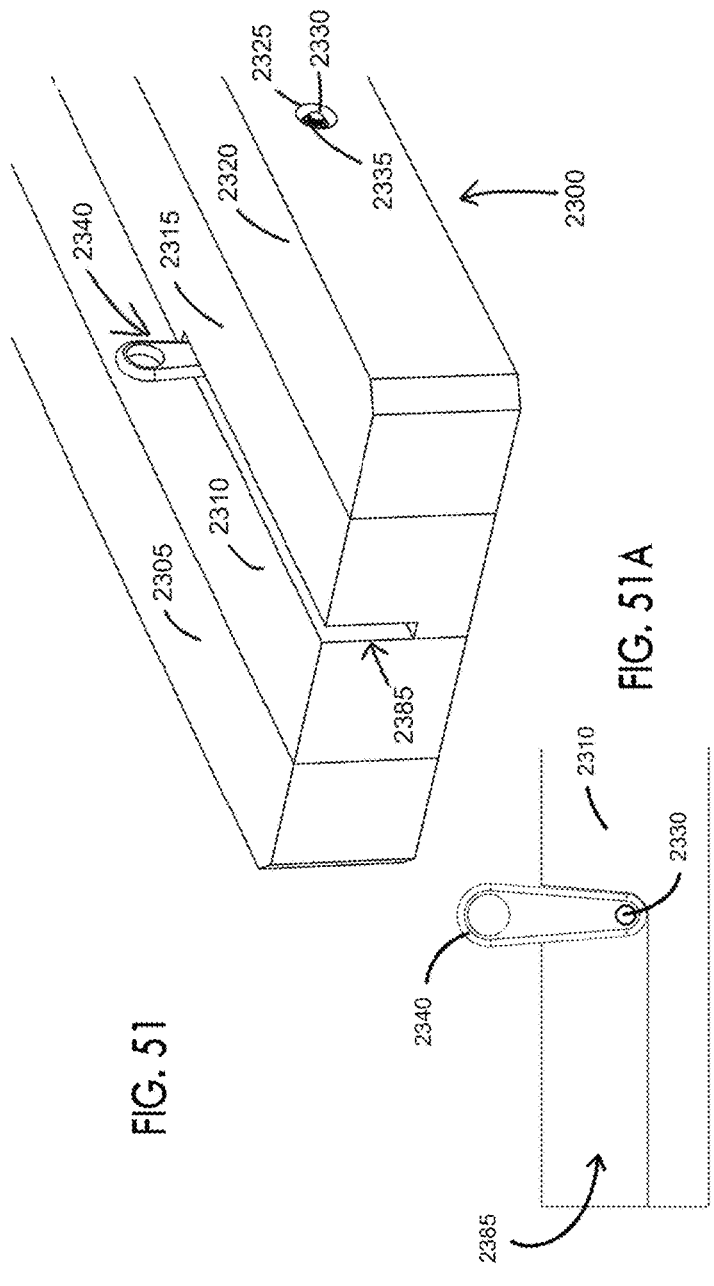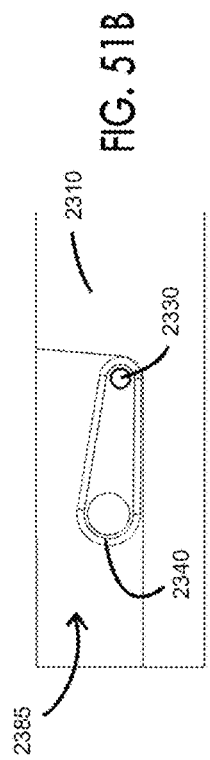

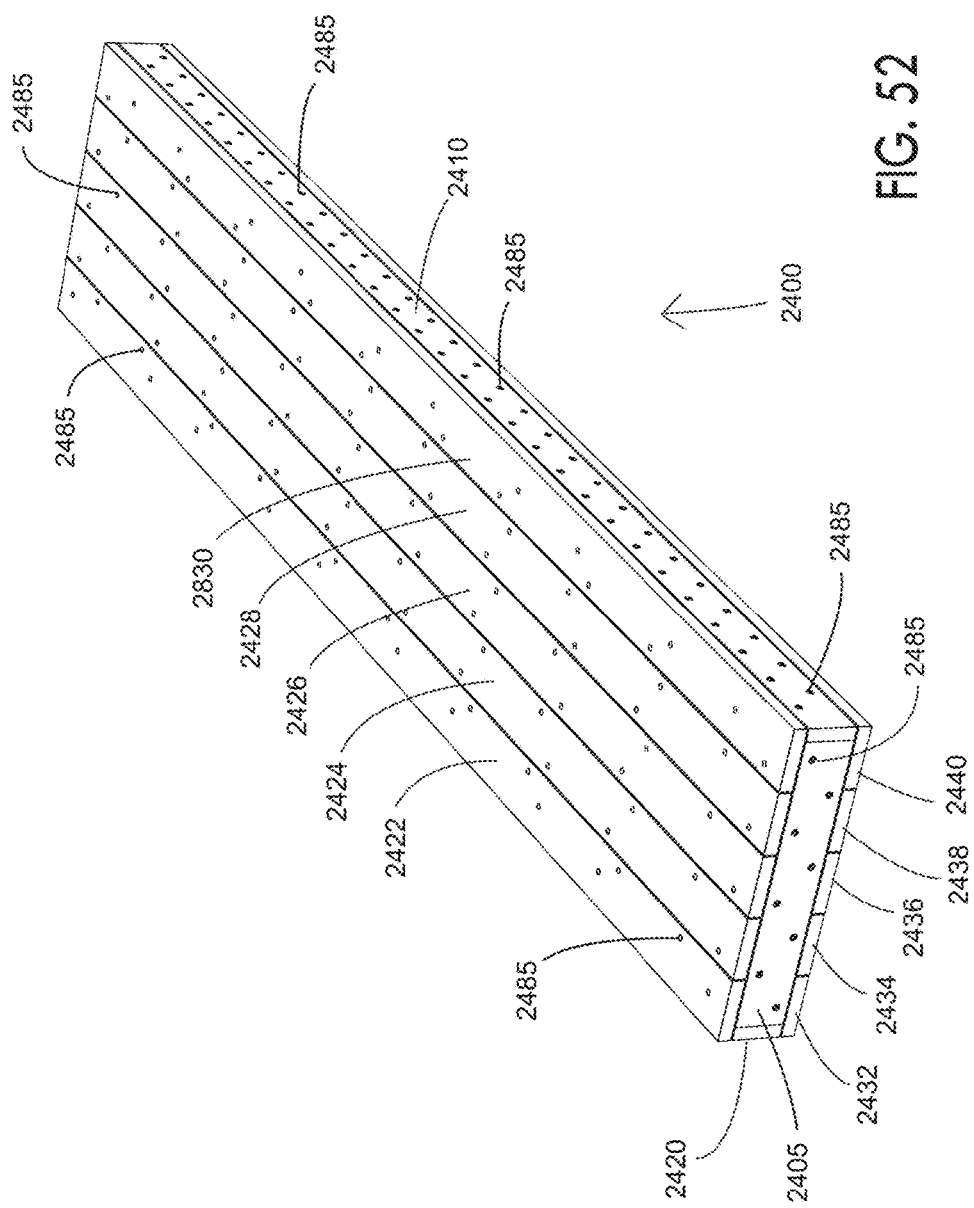

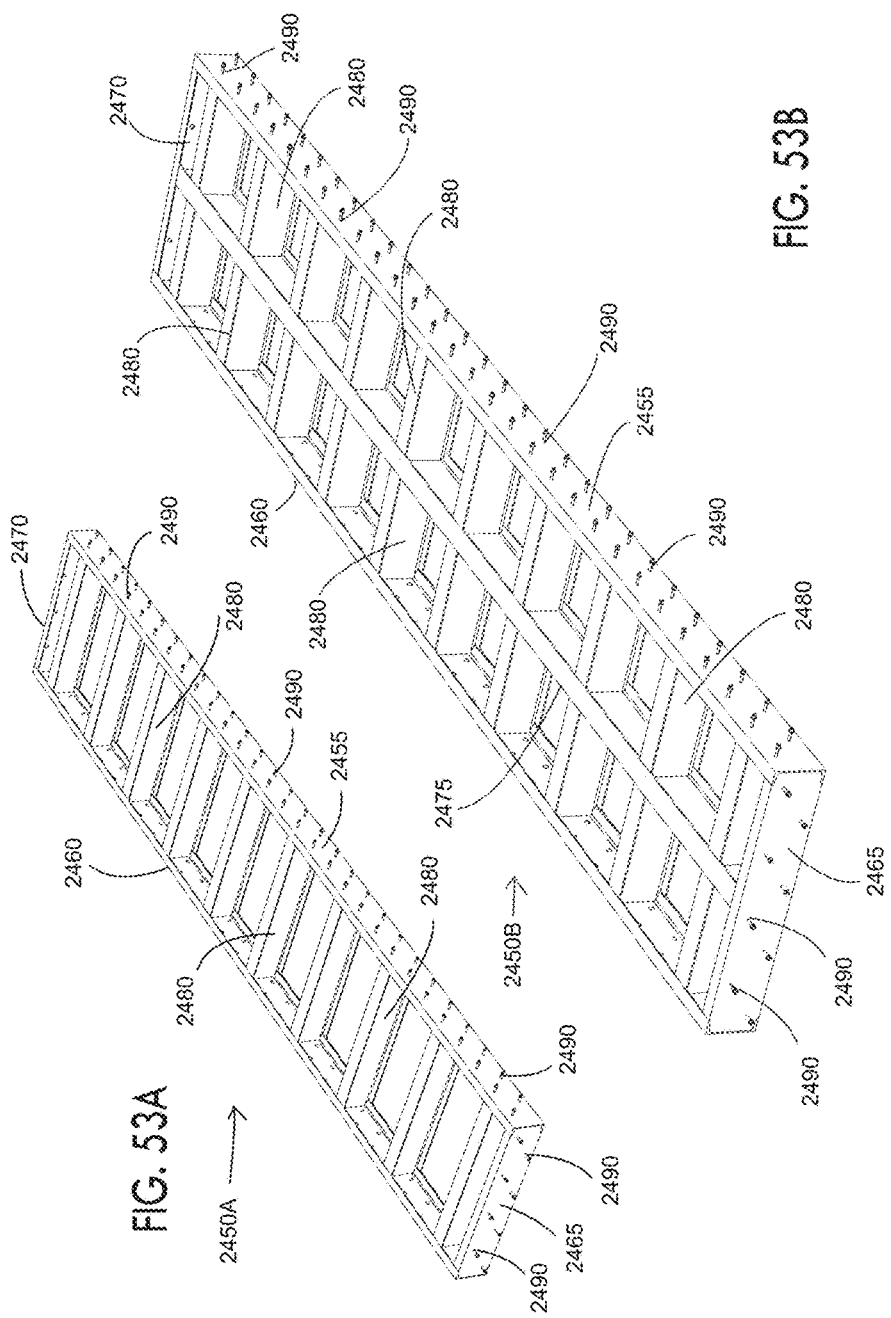

INDUSTRIAL MATS HAVING SIDE PROTECTION

CROSS-REFERENCE TO RELATED APPLICATIONS

This application is a continuation of U.S. application Ser. No. 15/244,483 filed Aug. 23, 2016, which in turn is a continuation-in-part of U.S. application Ser. No. 15/188,113 filed Jun. 21, 2016, now U.S. Pat. No. 9,663,903, which in turn is a continuation-in-part of U.S. application Ser. No. 15/155,685 filed May 16, 2016, which in turn is a continuation-in-part of U.S. application Ser. No. 15/081,340 filed Mar. 25, 2016, now U.S. Pat. No. 9,476,164, which in turn is a continuation-in-part of U.S. application Ser. No. 15/056,212 filed Feb. 29, 2016, now U.S. Pat. No. 9,447,547, which in turn is a continuation-in-part of U.S. application Ser. No. 14/839,888 filed Aug. 28, 2015, now U.S. Pat. No. 9,315,949, which claims the benefit of each of U.S. applications Nos. 62/054,186 filed Sep. 23, 2014, 62/138,143 filed Mar. 25, 2015, and 62/158,196 filed May 7, 2015.

U.S. application Ser. No. 15/244,483 filed Aug. 23, 2016, is also a continuation-in-part of each of U.S. application Ser. No. 15/056,344 filed Feb. 29, 2016, now U.S. Pat. No. 9,663,902, Ser. No. 15/056,212 filed Feb. 29, 2016, now U.S. Pat. No. 9,447,547, Ser. No. 14/855,336 filed Sep. 15, 2015, now U.S. Pat. No. 9,486,976, Ser. No. 15/155,685 filed May 16, 2016, and Ser. No. 15/081,340 filed Mar. 25, 2016, now U.S. Pat. No. 9,476,164.

U.S. application Ser. No. 15/081,340 filed Mar. 25, 2016 is also a continuation-in-part of U.S. application Ser. No. 15/056,344 filed Feb. 29, 2016, now U.S. Pat. No. 9,663,902, which in turn is a continuation-in-part of U.S. application Ser. No. 14/839,900 filed Aug. 28, 2015, now U.S. Pat. No. 9,315,951, which claims the benefit of U.S. application No. 62/052,954 filed Sep. 19, 2014.

U.S. application Ser. No. 15/244,483 also claims the benefit of U.S. applications Nos. 62/211,662 filed Aug. 28, 2015 and 62/211,664 filed Aug. 28, 2015.

The entire content of each of the foregoing applications is expressly incorporated herein by reference thereto.

BACKGROUND

The present invention relates to a reusable system for the construction of roadways and equipment support surfaces in areas having poor ground integrity characteristics. More particularly, the present invention relates to a system of durable mats which can be interconnected to form roadways and/or equipment support surfaces. More particularly still, the present invention relates to a reusable system of mats which can be quickly and easily positioned in a single layer to form roadways and/or equipment support surfaces, and which can thereafter be easily removed and stored until needed again.

Mats for this use are generally known in the art. In remote and unstable environments, a stable roadway (or any roadway) often does not exist, such that temporary roadways are assembled by aligning planks, boards or mats along the desired path. The mats provide temporary structures for various construction projects as well as for use in environmental or disaster cleanup projects. These mats enable trucks and other equipment to drive over, store equipment on, or create campsites on otherwise unstable, soft or moist land or damaged areas by providing a relatively level and stable surface.

While conventional wood mats provide useful service at a reasonable cost, the wood core, which is typically made of white oak, can deteriorate over time due to moisture causing gradual rotting and degradation of the wood material. This causes the mat to be discarded, because unlike some of the other materials that are used on the upper and lower layers of the mat, the core cannot be replaced without essentially making an entirely new mat.

Thus, there is a need for improvement in mat construction in order to provide longer service lives. There is also a need for mats having improved resistance to abuse and damage to further extend their service lives. There are also needs for better lifting elements for transport, installation and retrieval of industrial mats. The present invention now provides new mat constructions that meet these needs by provide longer service lives, improved abuse resistance and better lifting/carrying constructions.

SUMMARY OF THE INVENTION

The invention relates to an industrial mat comprising a support core made of a metal plate or of a frame having longitudinal side members connected by end members and internal cross members with the members made of steel or a thermosetting plastic material. The support core is configured to support additional components of the mat. The mat includes an upper layer provided above the support core that forms an upper surface for the mat and that contacts upper surfaces of the side and end members, and a lower layer provided below the support core that forms a lower surface of the mat and that contacts lower surfaces of the side and end members.

The frame preferably includes wood, plastic or elastomeric internal members or materials that fill all internal open areas of the frame, with the upper and lower layers and the sides and ends of the frame retaining the internal members or materials therein. These internal members typically comprise a plurality of elongated members of wood, plastic or elastomeric material that provide additional weight and ruggedness to the mat. In one specific embodiment, the internal members are wood blocks that are aligned and in contact to fill in the internal open areas of the frame.

The upper and lower layers of the mat may be made of a sheet, plate or elongated members of wood, plastic, elastomers or metal, and the mat has a width of between about 4 and about 8 feet, a height of about 6 inches to about 24 inches and a length of between about 4 and about 60 feet. In one embodiment, the plate and frame are made of steel and the upper and lower layers are made of metal or a thermosetting plastic material. Thus, when the plate or frame is made of steel and the upper and lower layers comprise steel plates, those layers can conveniently be welded to the plate or frame of the support core.

The mat may include an additional elongated member, beam or bumper on one or more or all of the longitudinal side members and/or end members of the frame. Generally, these are provided on at least the two side members but they can also be provided on the front and rear end members. When the longitudinal side members of the frame are made of steel and two additional elongated members are provided for the sides of the mat, an advantageous construction has the additional members made of wood, engineered wood, plastic or elastomeric material and including bores passing therethrough. Thus, the additional members can be attached to the side members by the use of bolting members that welded to the elongated side members. Thus, each additional elongated member is attached to a respective longitudinal side member by the bolting members which pass through the bores and by nut members engaging the bolting members.

The upper layer, lower layer or both may comprise a plurality of elongated members made of wood, engineered wood, thermoplastic, thermosetting plastic or elastomeric materials, to provide abrasion, wear and abuse resistance to the mat. Preferably, the elongated members of the upper and lower layers are removably attached to the frame so that they are replaceable when damaged while the core structure is protected for reuse with replaced elongated members in the upper or lower layers. One embodiment has the elongated members of the upper and lower layers made of wood or engineered wood, while another embodiment has the elongated members of the upper and lower layers made of plastic or elastomeric material.

For certain embodiments, the elongated members of the upper and lower layers are arranged in an angled or herringbone pattern with the members not perpendicular to sides or ends of the mat. This assists in providing better traction on the mat and facilitates water drainage from the mat. For further protection of the mat during use, additional elongated members or plates arranged on at least the upper layer are provided in a track pattern that corresponds to the spacing of wheels of vehicles that may travel over the mat.

Another feature of the invention is a crane mat having a width of at least about 4 feet and a length of about 4 feet to about 60 feet and comprising a support core having at least first and second longitudinal side members, with the support core configured to support additional components of the mat. Two additional elongated members made of wood, engineered wood, thermoplastic, thermosetting plastic or elastomeric materials or combinations thereof are provided with each additional elongated member attached adjacently to a respective longitudinal side member. Each elongated and respective side member has essentially the same length and positioned in a parallel side by side arrangement, with the elongated members having square or rectangular cross sections to protect the support core from side impact. The additional elongated members are preferably attached to the longitudinal side members by bolting or rod members which pass through bores in the elongated members and by nut members engaging the bolting or rod members.

If desired, the crane mat may further include at least one of an upper layer provided above the support core that forms an upper surface for the mat and that contacts upper surfaces of the longitudinal side members, or a lower layer provided below the support core that forms a lower surface of the mat and that contacts lower surfaces of the longitudinal side members, or both upper and lower layers. Preferably, the additional side members are made of thermoplastic, thermosetting plastic or elastomeric materials, and wherein the upper layer, the lower layer or both the upper and lower layers comprise a plurality of elongated members made of wood, engineered wood, thermoplastic, thermosetting plastic or elastomeric materials to provide abrasion, wear and abuse resistance to the mat.

In yet another embodiment, the support core of the mat may include a plurality of additional longitudinal members with each of the longitudinal and elongated members having cross sections of sizes of at least about 6×6 inches to about 24×24 inches and with a steel plate of essentially the same height and length as the longitudinal members and positioned between adjacent pairs of longitudinal members and attached thereto. Additional steel plates can be provided on the outermost sides of the longitudinal members of the mat if desired. These steel plates provide further reinforcement of the crane mat. These additional elongated members are preferably made of wood and softwoods such as pine are acceptable because of the steel plate reinforcement. Alternatively, the longitudinal and additional elongated members can be made of solid or hollow plastic material, elastomeric material or a combination thereof, with if desired filling material therein of the various types that are disclosed herein.

In a preferred embodiment, the beams are made of wood with oak or other hardwoods being preferred. For the embodiments where the upper and lower surfaces are protected by boards or other elongated members or components, the beams can be made of pine or other softwoods and the boards can be made of oak or other hardwoods, plastics, elastomers or even metal. The beams and outer boards can each be made of materials that are not wood if desired. Accordingly, the invention provides many different materials and combinations that can be used for different applications.

The crane mat may also be encapsulated within a plastic or elastomeric material to form an encapsulation that surrounds and encapsulates the entire mat, with the encapsulation having a thickness sufficient to provide environmental resistance to the longitudinal and elongated members while also providing abrasion resistance to the mat. The encapsulation preferably comprises a thermoplastic of polyethylene or polybutylene, or crumb rubber particles embedded in a polyurethane matrix.

The invention also relates to a mat as disclosed herein that further comprises lifting elements that are generally attached to the frame of the core or to the upper or lower layer. These the lifting elements comprise D-shaped members, O-shaped members, U-shaped members, eyelets, hooks, circular or polygonal rings, chains, or cables provide with sufficient strength to provide certified overhead lifting of the mat for installation and reclamation thereof.

In another embodiment, the invention relates to a crane mat comprising a plurality of a plurality of longitudinal beams that are positioned in a side by side arrangement; each of the beams having a plurality of spaced lateral apertures passing therethrough, with the lateral apertures being in alignment to form bores through the mat; a plurality of lateral rods with each rod passing through each beam through the aligned lateral apertures to hold the beams together in the side by side arrangement; and at least two lifting elements each located in an opening in one of the beams, each lifting element having a body with a first end thereof connected to a lateral rod and a second end having grasping means for allowing a hook or connecting element of equipment to engage the grasping means for lifting and manipulation of the mat, with the opening configured and dimensioned to hold and maintain the lifting element therein in a first retracted position when not in use and to allow retrieval and removal of the second end of the lifting element from the opening to a second position that exposes the grasping means when the mat is to be lifted or manipulated.

The first end of the lifting element generally includes a first aperture in the body which is configured and dimensioned to receive the lateral rod to allow the lateral rod to pass through the first aperture to attach the lifting element to the lateral rod, and the second end of the lifting element generally includes a second aperture in the body which is configured and dimensioned to receive the hook or connecting element when removed from the opening and placed in the second position.

The body of the lifting element is typically elongated and the first and second ends are arcuate to allow rotational movement of the second end about the lateral rod when the second end is to be removed from the opening. Also, the opening is sufficiently large to provide space around or access to the lifting element to allow a user to grab the second end to rotate it about the lateral rod and out of the opening.

The invention also relates to a crane mat of the type described herein wherein the lifting element comprises a chain or cable that is attached to or passes around a lateral rod and has a portion that can be retrieved from the surrounding opening to allow for temporary connection to a hook or connecting element of equipment for lifting and manipulation of the mat, with the mat opening configured and dimensioned to hold and maintain the lifting element therein in a first retracted position when not in use and to allow retrieval and removal of the lifting element portion from the opening to a second position that exposes the lifting element portion when the mat is to be lifted or manipulated.

Advantageously, one lifting element is located on a lateral rod nearest one end of the mat and another lifting element is located on a lateral rod nearest the opposite end of the mat. In any of these embodiments, however, the openings for the lifting element may also be spaced about 1 to 3 feet from the front or rear ends of the mat rather than be provided at the end or ends of the mat.

In a crane mat, the beams preferably have a width by height dimensions of between about 6 by 6 inches to about 24 by 24 inches and a length of between about 4 and about 60 feet, and are made of wood, engineered wood, a thermoplastic, elastomeric or thermosetting plastic material. Typically, between 4 and 16 beams are present in the mat. If desired, the mat can include metal plates located between one or more pairs (or between all pairs) of beams with the metal plates being essentially the same height and length as the beams or an inch or so shorter on one or all dimensions. These metal plates can also be provided on the outer sides of the outermost beams for further protection of the sides of the mat from impact. When made of wood, softwoods such as pine can be used for the beams. When made of a thermosetting plastic, the beams can be made of solid material, or of a box or tube structure that optionally is filled with one or more of the filler materials disclosed herein. When thermoplastic or elastomeric materials are used, the beams can be made of a plurality of layers of such materials which are joined together by welding, an adhesive or preferably by mechanical fasteners such as bolting. The steel plates essentially hold the layers together in the mat, in particular when outer side plates are also provided.

In another embodiment, the invention provides an industrial mat comprising a supporting structure that is configured and arranged to provide strength and rigidity to the mat and to support other components of the mat; an upper layer provided above the supporting structure for forming an upper surface of the mat, a lower layer provided below the supporting structure for providing a lower surface of the mat; and lifting elements attached to the upper layer, the lower layer or the supporting structure, with the lifting elements comprising D-shaped members, O-shaped members, U-shaped members, eyelets, hooks, circular or polygonal rings, chains, or cables that are configured and dimensioned for attachment to attached to the supporting structure or the upper or lower layer with sufficient strength to provide certified overhead lifting of the mat for installation and reclamation thereof; wherein the supporting structure includes at least two longitudinal members forming sides of the mat; and wherein upper and lower layers are independently made of a plate, sheet or plurality of elongated members.

The lifting element may be directly attached to the upper or lower layer or to a connecting member that is attached to the side longitudinal members of the supporting structure. The connecting member typically comprises a plate, tube or rod, and, as disclosed herein, the mat has a width of between about 4 and about 8 feet, a height of about 6 inches to about 24 inches and a length of between about 4 and about 60 feet.

In an embodiment, the supporting structure comprises first and second longitudinal members of steel or reinforced thermosetting resin that are joined together by a plurality of cross members to form a frame, with the lifting elements directly connected to the frame. The lifting elements as noted preferably comprise D-, O- or U-shaped members or rings that are attached directly to a cross member of the supporting structure; or chains or cables that pass through openings in the upper or lower layers of the mat, with the openings optionally reinforced with collars which protect the openings from contact by the chains or cables and which adds stability as the mat is being hoisted or moved.

Alternatively, the lifting elements may include one or two U-shaped members operatively associated with a rod that passes through the mat and that includes a plate attached thereto, with the lifting element including a spring between the plate and the U-shaped member and with the rod having a U-shaped member on one or each end, wherein when two U-shaped members are present, two springs are also present, one between each U-shaped member and the plate.

Furthermore, the lifting elements may include at least two lifting elements each located in an opening in the mat, each lifting element having a body with a first end thereof connected to one of: the upper or lower layers, the side longitudinal members, or to a connecting member that is attached to the side longitudinal members of the supporting structure, and a second end having grasping means for allowing a hook or connecting element of equipment to engage the grasping means for lifting and manipulation of the mat, with the mat including an opening configured and dimensioned to hold and maintain the lifting element therein in a first retracted position when not in use and to allow retrieval and removal of the second end of the lifting element from the opening to a second position that exposes the grasping means when the mat is to be lifted or manipulated. For this embodiment, the body of the lifting element is elongated and the first and second ends are arcuate to the second end to be removed from the opening, wherein the opening is sufficiently large to provide space around or access to the lifting element to allow a user to grab the second end to move it out of the opening.

The invention also provides a mat that includes a core structure that provides strength and rigidity to the mat. The core structure is provided as one or more components comprising a sheet, a plurality of elongated members, a frame, a plurality of compartments, or combinations thereof. These components of the core structure are made of environmentally resistant non-wood materials. The mat also includes at least one outer layer attached to the core structure directly or indirectly through other components, with the outer layer(s) having a length and width that substantially corresponds to that of the core structure and that forms an upper or lower surface of the mat or both upper and lower surfaces of the mat. The at least one outer layer comprises a plurality of elongated members, wherein the elongated members of the outer layer(s) are made of wood, engineered wood, thermoplastic, thermosetting plastic or elastomeric materials, with the materials of the elongated members of at least one outer layer being different from the materials of the structural components of the core. The outer layer can also be a sheet or plate of a metal such as steel or aluminum. Thus, the components of the outer layer(s) provide abrasion, wear and abuse resistance to the mat and are removably attached to the core construction so that the components of the outer layer(s) are replaceable when damaged while the core structure is protected and not subject to degradation so that it can be reused to form a mat having replaced components in the outer layer(s).

The environmentally resistant materials for the structural components of the core structure may be selected from treated wood, metal, an elastomeric material, a thermoplastic material, a thermosetting material or a combination thereof. The core structure is an essential component to the mat which is designed to provide sufficient strength and rigidity to the mat, both initially and after the mat has been in service for a while, as the environmentally resistant material can withstand repeated contact with rain and snow conditions without degradation or deterioration.

One outer layer forms the upper surface of the mat, while and another outer layer forms the lower surface of the mat. Optionally, additional layers comprising one or more components in the form of a sheet, a plurality of elongated members or combinations thereof can be present for attaching the outer layer(s) to the core structure. Preferably, the outer layer(s) are removably attached directly or indirectly to the core structure by bolting. The components of the outer layer(s) typically have a modulus of about 1.6 M psi.

In a preferred arrangement, the structural components of the core structure include elongated members of a thermoplastic or thermosetting plastic material, a solid or apertured plate or sheet (i.e., one containing a random or ordered set of openings or holes therein) of a thermoplastic or thermosetting plastic material, and two outer layers are provided: one outer layer comprising a plurality of elongated members of wood or engineered wood and forming the upper surface of the mat and another outer layer forming the lower surface of the mat and comprising a thermoplastic, thermosetting plastic or elastomeric material in the form of elongated members, a solid or apertured plate or sheet structure, or a grid or grating, the latter two being specific embodiments of an aperture plate or sheet structure.

Another embodiment of the invention relates to a method for prolonging the service life of an industrial mat that has wood components. This method includes configuring the industrial mat to have a core structure that provides strength and rigidity to the mat, wherein the core structure is provided as one or more structural components comprising a sheet, a plurality of elongated members, a frame, a plurality of compartments, or combinations thereof and wherein the components of the core structure are made of environmentally resistant non-wood materials; providing at least one removable outer layer attached to the core structure directly or indirectly through other components, with the outer layer(s) forming an upper or lower surface of the mat or both upper and lower surfaces of the mat, wherein the at least one removable outer layer comprises elongated members made of wood, engineered wood, thermoplastic, thermosetting plastic or elastomeric materials to provide abrasion, wear and abuse resistance to the mat, with the materials of the elongated members of at least one outer layer being different from the materials of the structural components of the core structure. The method then includes renewing the mat by replacing elongated members of the outer layer(s) that are damaged or deteriorated during use by removing one or more of the damaged or deteriorated elongated members while reusing the core structure that is protected and not subject to degradation to form a renewed mat having replaced elongated members or other components in the outer layer(s).

In this method, the components of the outer layer(s) can be attached to the mat by a bolting arrangement so that they are removable by loosening the bolting arrangement. Next, the replacement components are attached to the core structure using the same bolting arrangement.

Additionally, the mats can be provided with beams or bumper members made of wood or a plastic material upon the longitudinal sides of the core structure to protect the core structure from damage due to transport or installation of the mat, with the beams or bumper members optionally also provided on the ends of the core structure. The beams or bumper members can also be configured to be removably attachable to the core structure so that they are replaceable when damaged to form a renewed mat having replaced beams or bumper members.

The mats of the invention are typically designed to provide sufficient load bearing capacity: A fully supported mat (one that is properly installed on a suitable prepared ground surface) must be able to withstand a 10 ton load, spread over a 12 inch diameter surface without degradation of mat properties or permanent deformation of the mat. The support structure would have a crush resistance of between about 500 and 800 psi to as much as 1000 psi depending upon the specific construction of the support structure and when properly installed on a suitably prepared ground surface. This provides resistance against compression as large vehicles or equipment move over or are placed upon the mat and avoids permanently deforming the core structure.

The core structure may be any of a plurality of elongated tubular members made of metal, a thermoplastic material or a thermosetting material with each tubular member being of the same or a different material, being hollow or solid or being individual members or joined together to form a unitary component. The thermoplastic, thermosetting, elastomeric or polyolefin material may be present as a sheet or in a solid or honeycomb structure. The honeycomb structure may have closed or open cells. The cells of the honeycomb structure optionally may be provided with a filler material to increase the weight of the mat, as well as to control, preclude or provide absorption of liquids. If necessary, when the open cells of the core structure are to be provided with filler material, upper and lower sheets can be included to assist in retaining the filler material in the cells.

Another embodiment of the invention relates to a crane mat having top and bottom surfaces and comprising first and second side beams having top, side, and bottom surfaces; a non-wood support structure located between and connecting the first and second side beams; a plurality of joining rods that attach the side beams to the support structure, with the joining rods passing through the sides of the beams and support structure; and a first plurality of elongated members attached to the upper portion of the support structure. The support structure has upper, lower and side portions, a height that is less than that of the side beams, a width and a length, with the first and second longitudinal members being joined together by a plurality of cross members.

The top surface of the mat is substantially flat and is formed by the top surfaces of the beams, the first plurality of elongated members, or both. The mat may include a second plurality of elongated members attached to the lower portion of the support structure. The bottom surface of the mat can be substantially flat, being formed by the bottom surfaces of the beams, the second plurality of elongated members, or both.

The joining rods typically comprise bolts that pass through the side beams and support core. Preferably, the beams and longitudinal members include tubular sleeves that facilitate passage of the bolts therethrough for assembly of the mat. The first and second plurality of elongated members typically have the same thickness, with the joining rods each preferably comprising a carriage bolt and nut arrangement wherein the bolts pass through the sleeves in a central area of the side beams and the longitudinal members of the support structure and are secured in place by the nuts.

The beams generally have width and height dimensions of between about 1×6 inches and about 24×24 inches or between about 6×6 inches and about 16×16 inches; the first and second longitudinal members are joined together by cross members spaced about 10 to about 30 inches apart; the joining rods are spaced about 3 to about 6 feet apart; and the mat has a width of between about 4 and about 8 feet and a length of between about 4 and about 60 feet.

In a preferred embodiment, the side beams may be made of solid cut wood, engineered lumber or a thermosetting plastic, with the first and second longitudinal members configured as a flat plate, I-beam or rectangular or C-shaped beams for contact with the side beams. The cross members may be configured as a flat plate, and I-beam or a C-shaped beam, while the plurality of elongated members are boards made of solid cut wood, engineered lumber or a thermosetting plastic. The elongated members are bolted to the support structure.

The first and second longitudinal members and plurality of cross members of the support structure typically form a frame, with the mat having a width of between 4 and 8 feet; and the support structure has a width that is about 2 to 8 times the width of one side beam with the mat having a width of about 4 to 12 times the width of one side beam.

The side beams generally have the same dimensions and are attached to the support structure to locate their upper surfaces about 1.5 to 3 inches above the support structure and to locate their lower surfaces about 1.5 to 3 inches below the support structure, wherein the first and second plurality of elongated members have a thickness of about 1.5 to 3 inches to provide the substantially flat upper and lower surfaces to the mat.

To provide an interlocked structure of conjoined adjacent mats, the first side beam of the mat is sized to provide about one half the height of the mat, with the first side beam attached to an upper portion of the support structure. Alternatively or additionally, the second side beam may be sized to provide one half the height of the mat and is attached to the second side of the support structure in a lower position. To stabilize certain of these mats, an additional first beam of the same dimensions as the first beam is provided for placement below the first side beam of the first mat and an additional second side beam of the same dimensions as the second beam is provided for placement upon the second side beam of another mat to provide the substantially flat upper and lower surfaces of the conjoined structure and to stabilize the outermost sides of the conjoined structure.

Yet another embodiment of the invention relates to a mat comprising a support structure in the form of a frame or ladder structure having longitudinal and end sides, with the support structure configured to support or allow attachment of other components to form the mat. The mat includes additional layers of elongated members attached above, below or both above and below the support structure for forming an upper surface, lower surface or both upper and lower surfaces of the mat. The mat also includes bumper members removably attached at least to the longitudinal sides of the frame or ladder structure to protect against damage due to side impact during transport or installation of the mat. The bumpers are made of a plastic or elastomeric material and have a shape that provides an outer surface that extends beyond the sides of the support structure and has sufficient compression to absorb impact and shock to protect the support structure. The bumper members are removable so that they can be replaced when damaged so that the support structure and upper and lower layers of elongated members can be reused. Additionally, the upper and lower layers of elongated members can also be replaced when necessary, while the environmentally resistant support structure can be reused.

The longitudinal sides of the support structure may include an I-beam having an outer side facing open cavity, with the bumpers that are attached to the I-beam fitting in the I-beam cavity. Alternatively, the longitudinal sides of the support structure can include a beam having a flat outer side surface, with the bumpers are positioned adjacent the longitudinal sides by additional members or lips that retain the bumpers in place against the flat outer side surface of the beam. Other bumper embodiments are disclosed herein.

In another preferred embodiment, the support structure is made of steel or hollow, filled hollow or solid rectangular tube members of fiberglass reinforced thermosetting plastic material, and the elongated members are made of wood, engineered wood or a thermoplastic or thermosetting plastic material. Also, open areas of the support structure can be provided with one or combinations of: wood boards that provide greater weight, compressive strength or ruggedness to the mat, wherein the core of wood boards are configured to fit within openings of the support structure and are bolted together so that they do not move around inside of the mat; recycled rubber tire material, sand or other particulate or solid filler material located in open areas of the support structure, wherein the particulate filler material is retained in place in the support structure by a mesh, screen or sheets that are secured to the top and bottom of the support structure; or foam or extruded polymer material located in open areas of the support structure.

To protect the mat from damage due to transport or installation, the mat may include protective members upon at least the longitudinal sides of the core structure to protect the core structure from damage due to transport or installation of the mat. These protective members may be beams or bumpers made of wood or a plastic material and they may also be provided on the front and rear ends of the core structure. Bumper members are not required for some embodiments.

When protective members are provided, a preferred embodiment includes a frame configured to support and provide a periphery about the core mat; upper and lower layers protecting upper and lower surfaces of the core. Advantageously, the frame comprises steel I-beams and the bumpers are received in outer cavities of the I-beams. Alternatively, the frame is a box frame made out of a rectangular tube member of fiberglass reinforced plastic and the bumpers sit on the outer side of each box frame member. The bumpers may extend onto the top and bottom surfaces of the mat. Alternatively, the bumpers are held in position by lip members associated with the upper and lower layers of the mat. If desired, the lip members may be integral with the upper and lower layers of the mat.

The bumpers are generally configured to have a narrower upper and lower profiles and a wider central profile to accommodate attachment to the mat, with the upper and lower layers being made of a plastic or elastomeric material. If desired, the box frame members may be filled with an insert, e.g., a molded solid, foam or pellet material. For simplicity, the box frame structure is protected by an outwardly adjacently positioned wood structure. The core may be a molded solid or foam material, or can be made of oak.

For lifting and movement of the mats when the support structure comprises steel members, lifting elements comprising D-shaped rings, O-shaped rings, chains, or cables that are connected directly to the steel members are provided to allow overhead lifting of the mat. And to improve the environmental resistance of the mat, the steel members of the support structure may be coated or painted.

Finally, the mats may include one or more of a radio frequency identification (RFID) tag to enable the mat to be monitored in an inventory system or when rented for use; lighting elements embedded in the elongated members to provide light to assist in the use of the mat during the night or on days that are dark due to poor weather conditions; or color coding to identify the construction of the mat or to identify mats for a particular customer, end use or to indicate that the mat is rented or leased.

The invention also relates to a mat comprising a core construction that provides strength and rigidity to the mat; and a durable skin that surrounds and encapsulates the core, the skin having a thickness sufficient to provide environmental resistance to the core construction and being made of a material that provides abrasion resistance to the mat.

The skin preferably comprises a thermoplastic, thermosetting or elastomeric material and has a thickness of 0.25 to 0.5 inches. Advantageously, the skin is prepared in upper and lower portions which are configured to conform to the core construction and which have peripheries that are in contact and are joined together to encapsulate and seal the core construction therein.

Advantageously, the core construction comprises a central layer made of a sheet, a plurality of elongated members, a plurality of compartments, or combinations thereof. The core construction may also include an upper layer positioned above the central layer, wherein the upper layer is made of a sheet, a plurality of elongated members or combinations thereof. The core construction may also include a lower layer positioned below the central layer, wherein the lower layer is made of a sheet, a plurality of elongated members, a plurality of compartments, or combinations thereof.

Preferably, the central layer of the core construction comprises a sheet made of wood, metal, a thermoplastic material or a thermosetting material or a combination thereof and provides sufficient strength and rigidity to the mat. When wood is used, it is preferably engineered lumber. Also, the upper and lower layers each comprises a plurality of elongated members in the form of wood boards or tubes of metal, a thermosetting material or a combination thereof with the members having a modulus of about 1.6 MM+20%.

The core construction materials also provide a load bearing capacity that is able to withstand a load of at least 600 to 800 psi to as much as 1000 psi without permanently deforming the core construction.

The mat advantageously includes bumpers provided along at least the front and rear ends of the mat to protect front and rear edges of the mat from damage during transport and installation. Preferably, the bumpers are provided along the sides as well as the front and rear ends of the mat to protect all edges of the mat between the top and bottom surfaces from damage.

In another embodiment, the bumpers are provided upon a mat construction that provides strength and rigidity to the mat. The core construction is also protected by a durable skin that surrounds and encapsulates the core, with the skin having a thickness sufficient to provide environmental resistance to the core construction and being made of a material that provides abrasion resistance to the mat, with the skin having upper and lower skin portions. Preferably, the skin portions are joined at a flange that forms the periphery of the mat on the sides thereof, with the bumpers attached to the flange of the mat to provide protection from damage to the flange and edges of the mats during transport and installation to prevent moisture from entering the core at a damaged flange joint due to penetration by teeth or tines of the moving equipment. Alternatively, the bumpers provided on and as part of the peripheries of the upper and lower skins to protect all edges of the mat between the top and bottom surfaces from damage during transport and installation.

In a preferred construction, at least the front and rear bumpers are provided in two parts. These two parts generally conform to the upper and lower skin portions with the flange having an extension that is directed away from the mat core. The extension is typically flat and the flange further includes a terminal portion configured and dimensioned to be perpendicular to the flat extension. Additionally, the side bumpers may be formed as a unitary piece that is configured with a cut out central portion that allows attachment of the bumper by sliding movement over the flange and terminal portion. Also, the front and rear bumpers are configured with corner portions that protect the corners of the mat, with the corner portions configured to abut the ends of the side bumpers to assist in retaining the side bumpers in position.

The invention also relates to industrial mats having substantially flat top and bottom surfaces and comprising first and second side beams having top, side, and bottom surfaces, a non-wood support structure located between and connecting the first and second side beams, a plurality of joining rods that attach the side beams to the support structure, and elongated members attached to the upper and lower portions of the support structure.

The mats of the invention advantageously utilize side beams having width and height dimensions of between about 6×6 inches and about 24×24 inches and a length of between about 4 and 60 feet. Also, the joining rods pass through the sides of the beams and support structure, with the rods spaced about 2 to 6 feet apart, to hold the mat securely together. These mats may include one or more openings in an elongated member to provide access to a joining rod for lifting or other manipulation of the mats.

The support structure provides strength and helps holds the mat components together. The support structure has upper, lower and side portions, a height that is less than that of the side beams, a width and a length, with the support structure comprising first and second longitudinal members that are joined together by a plurality of cross members spaced about 10 to 30 inches apart. The cross members provide rigidity to the mat and resistance to torsional forces that the mat will encounter when being transported, installed and when in service. Preferably, the first and second longitudinal members are configured as a flat plate or a C-shaped beam and the cross members are configured as a flat plate, and I-beam or a C-shaped beam.

In the support structure, the first and second longitudinal members and plurality of cross members of the support structure form a frame. Generally, the longitudinal members of the support structure have a length that is less than that of the side beams, and the mat further comprises bumper members that are joined to the support structure to form the front and rear ends of the mat between the first and second beams.

A first plurality of elongated members is attached to the upper portion of the support structure, while a second plurality of elongated members is attached to the lower portion of the support structure. Thus, the top surface of the mat is formed by the top surfaces of at least one or both of the beams and the first plurality of elongated members, while the bottom surface of the mat is formed by the bottom surfaces of at least one or both the beams and the second plurality of elongated members. This enables the mat to provide a secure base when placed on prepared ground (e.g., terrain that is leveled and provided with a crushed stone base of 4 inches for 8 inch thick mats and 8 inches for 12 inch thick mats).

In particular, the invention relates to a crane or timber mat having substantially flat top and bottom surfaces and comprising first and second side beams having top, side, and bottom surfaces, with the beams having width and height dimensions of between about 6×6 inches and about 24×24 inches and a length of between about 18 and 60 feet; a non-wood support structure located between and connecting the first and second side beams, with the support structure having upper, lower and side portions, a height that is less than that of the side beams, a width and a length, with the support structure comprising first and second longitudinal members that are joined together by a plurality of cross members spaced about 10 to 30 inches apart; a plurality of joining rods that attach the side beams to the support structure, with the joining rods passing through the sides of the beams and support structure, with the rods spaced about 3 to 6 feet apart; a first plurality of elongated members attached to the upper portion of the support structure; and a second plurality of elongated members attached to the lower portion of the support structure. The top surface of the mat is formed by the top surfaces of the beams and the first plurality of elongated members, and the bottom surface of the mat is formed by the bottom surfaces of one or both of the beams and the second plurality of elongated members.

The mat preferably includes beams having square or rectangular cross-sections and width and height dimensions of between about 8×8 inches and about 20×24 inches and lengths of between about 10 and 40 feet. The support structure is configured to have a height that is about 3 to 6 inches less than that of the beams. This provides space at the top and bottom of the support structure to receive elongated members to provide the substantially flat surfaces on the top and bottom of the mat.

In one embodiment, each side beam has the same dimensions and the side beams are attached to the support structure to locate their upper surfaces about 1.5 to 3 inches above the support structure and to locate their lower surfaces about 1.5 to 3 inches below the support structure. The elongated members preferably have a corresponding thickness of about 1.5 to 3 inches. This arrangement allows the placement of the first plurality of elongated members on top of the support structure and the second plurality of elongated members on the bottom of the support structure to provide the substantially flat upper and lower surfaces of the mat.

For these embodiments, the first and second plurality of elongated members have the same thickness and are typically bolted to the support structure to form those surfaces. The joining rods each comprises a bolt and nut arrangement wherein the bolts pass through a central area of the side beams and the longitudinal members of the support structure and is secured in place by the nuts. Furthermore, some of the first and second plurality of elongated members have one or more openings to provide access to one or more joining rods to facilitate lifting or manipulation of the mat. Also, the first and second plurality of elongated members have a thickness of about 1.5 to 3 inches so that they can provide flat surfaces on the top and bottom of the mat adjacent the side beams. The mat preferably has a load bearing capacity that is able to withstand a load of at least 500 to 800 psi to as much as 1000 psi without permanently deforming the support structure.

In an alternative embodiment, the first side beam is sized to provide about one half the height of the mat, with the first side beam attached to an upper portion of the support structure such that the upper surface of the first side beam extends above the support structure by about 1.5 to 3 inches. The second side beam is also sized to provide about one half the height of the mat and is attached to the second side of the support structure in a lower position such that the lower surface of the second side beam extends below the support structure by about 1.5 to 3 inches.

For this embodiment, the joining rods preferably comprises a bolt and nut arrangement that passes through a central area of the side beams and support structure, with the bolts passing through the first beam connected to an upper portion of the first longitudinal member of the support structure, and with the bolts passing through the second beam connected to a lower portion of the second longitudinal member of the support structure. The resulting "stepped" structure of the side beams allows the quick and easy installation of the mats in an interlocking configuration wherein the first side beam of one mat sits upon the second side beam of an adjacent mat to form an interlocked structure of conjoined mats to form a working base. And as above, the first and second elongated members have a thickness of about 1.5 to 3 inches to assist in forming the substantially flat upper and lower surfaces of the mat.

In a further embodiment of the interlocking mats, modified mats are provided with a first side beam being a half-size beam as described in the previous paragraph, and with a second side beam sized to provide the full height of the mat, such that the mat can provide an outermost mat of an interlocked structure of conjoined mats wherein the outermost size of the mad is fully stabilized without any stepped portions or areas. As in the other embodiments, the upper surface of the second side beam extends above the support structure by about 1.5 to 3 inches and the lower surface of the second side beam extends below the support structure by about 1.5 to 3 inches so that the adjacent areas can receive elongated members having a thickness of about 1.5 to 3 inches to provide substantially flat upper and lower surfaces for the mat.

Alternatively, to stabilize the outermost sides of the interlocked mats, additional first beams of the same dimensions as the first beam can be provided for placement below the first side beams of the outmost first mats. Similarly, additional second side beams of the same dimensions as the second beams are provided for placement upon the second side beams of other outermost mats. These additional beams allow the entire upper and lower conjoined mat surfaces to be substantially flat with the outermost sides of the conjoined structure stabilized to support equipment or to allow vehicles to drive onto the conjoined mat structure.

For any of the preceding embodiments, a number of preferred features are provided. The mat preferably includes the first and second longitudinal members as C-shaped beams in order to provide flat faces for contact with the side beams. The side beams are typically made of solid cut wood, engineered lumber or a thermosetting plastic, generally as a pultrusion. Similarly, the plurality of elongated members are boards made of solid cut wood, engineered lumber or a thermosetting plastic pultrusion.

The mats of the invention typically have a width of between about 4 and 8 feet, with the support structure having a width that is about 2 to 8 times the width of one side beam and the mat having a width of about 4 to 12 times the width of one side beam.

In another embodiment, the first and second side beams are sized to provide about one half the height of the mat, with the first side beam attached to the first side of the support structure in a raised position such that the upper surface of the first side beam extends above the support structure by about 1.5 to 3 inches, and with the second side beam attached to the second side of the support structure in a lowered position such that the lower surface of the second side beam extends below the support structure by about 1.5 to 3 inches. This arrangement allows adjacent mats to be interlocked together. In particular, the first side beam of one mat will sit upon the second side beam of an adjacent mat to form an interlocked structure of conjoined mats.

In a further embodiment, the invention relates to a non-wood mat having the components and structures disclosed herein, wherein the first and second longitudinal members are metal beams that provide flat faces for contact with the side beams; the side beams are made of a thermosetting plastic; the plurality of elongated members are boards made of a thermosetting plastic and are bolted to the support structure; and the joining rods each comprises a bolt and nut arrangement wherein the bolts are made of high strength steel and pass through a central area of the side beams and the longitudinal members of the support structure and is secured in place by the nuts.

In yet another embodiment, these mats include one or more openings in an elongated member to provide access to a joining rod to facilitate movement or lifting of the mat without providing full exposure of a joining rod. Preferably, a mat lifting element is associated with at least one opening to facilitate lifting or movement of the mat.

Each opening of the mat is configured and dimensioned to provide a minimum of open space to avoid creating holes or other discontinuities into which a worker can stumble. In particular, the one or more openings in the elongated members includes one opening in each of two elongated members; one opening in each of four elongated members; one opening in each member; two openings in one elongated member; two openings in each of two elongated members; two openings in each of four elongated members; or two openings in each elongated member.

As noted, it is advantageous for a lifting element to be provided with each opening. In this regard, each lifting element generally comprises, a chain link, a connector ring; a hook, a D-shaped member, a U-shaped member, or a circular or polygonal ring. These elements, and in particular the chain, can be connected directly to the joining rod while other elements can be associated with or attached to another structural element that is attached to the joining rod. The preferred lifting elements include a D- or U-shaped member or a ring that is attached directly to a cross-member of the support structure or that is operatively associated with a connecting member that is attached to the support structure. For this, the connecting member comprises a plate or tube that is attached to one or more cross-members.

Another preferred the lifting element is a U-shaped member that is operatively associated with a rod that passes through the connecting member, with the lifting element including a spring between the plate and the U-shaped member. The lifting element can include two U-shaped members that are located on each end of a rod that passes through the connecting member, with two springs present, one between each U-shaped member and the connecting member.

And to protect the opening in the mat from contacting the lifting element, a collar is provided in each opening. The collar member may also be designed to be in contact with the lifting member to add stability to the assembly when the mat is being hoisted or moved.

BRIEF DESCRIPTION OF THE DRAWINGS

The appended drawing figures provide additional details of the invention, wherein:

FIG. 48 is an end view of a crane mat to illustrate another lifting element for use with the mat;

FIG. 49 is a cutaway view of the lifting element of FIG. 48 as it is being raised from the opening in which it resides;

FIG. 50 is a cutaway view of the lifting element of FIG. 48 as it is retracted in the opening;

FIG. 51 is a view of the lifting element of FIG. 48 in a position spaced from the end of the mat, while FIG. 51A illustrates the lifting element in an operative position and FIG. 51B illustrates the lifting element in a retracted position.

FIG. 52 is a perspective view of another crane mat in accordance with the present invention;

FIGS. 53A and 53B are perspective views of two related core structures for the crane mat of FIG. 52.

DETAILED DESCRIPTION OF THE INVENTION

Figure 1:
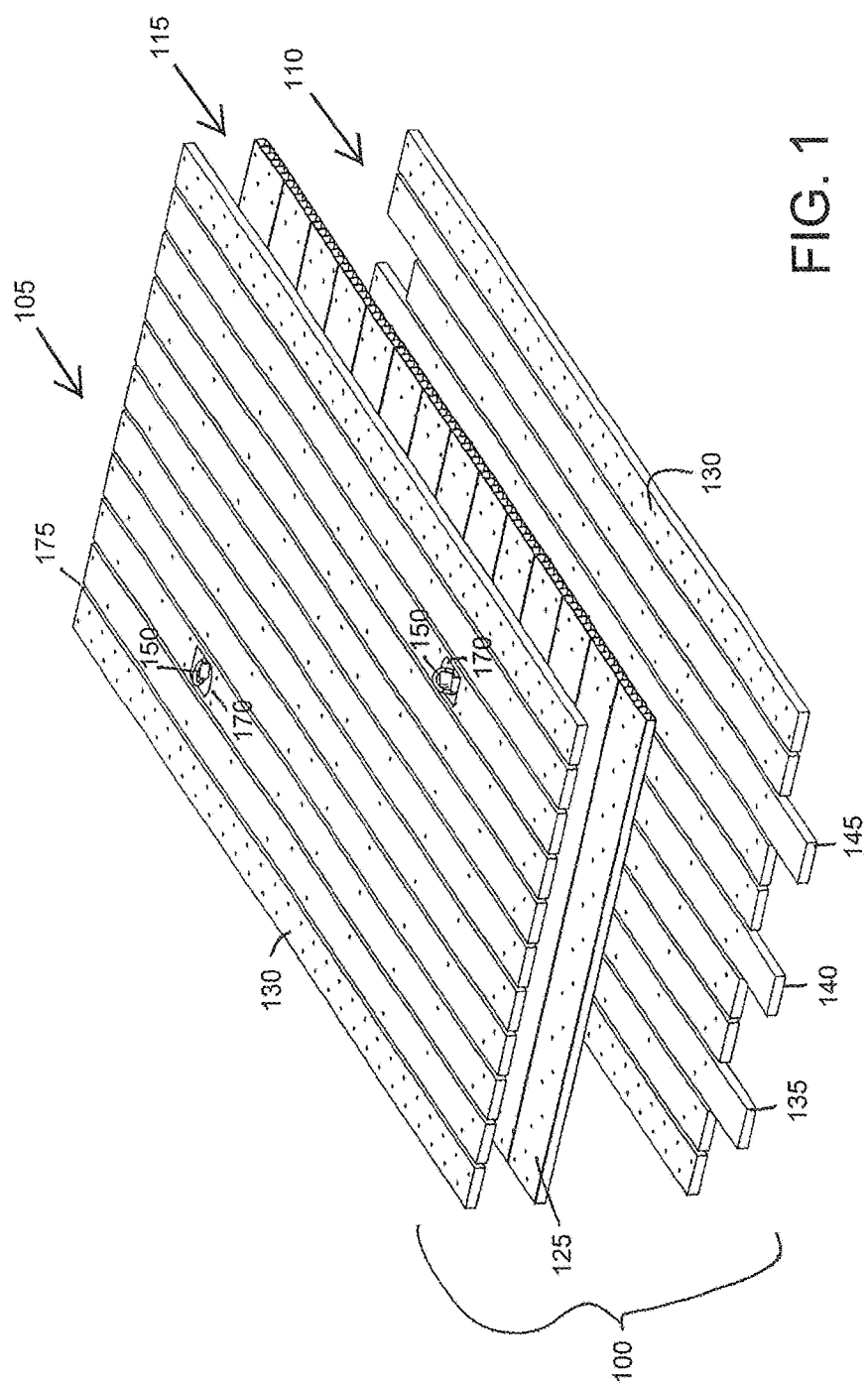
FIG. 1 is an exploded view of one embodiment of the mat of the invention which includes a core of fiber glass reinforced polyester beams and wood boards for the outer layers.

The present invention now provides various improved industrial mats that have improved properties, better resistance to impact, abrasion and abuse, and which facilitate lifting or installation and recovery of the mats.

Certain terms that are used herein are defined hereinbelow to assist in the understanding of the invention.

The term "industrial mat" is intended to cover relatively large mats having widths of at least about 4 feet with lengths running from about 4 feet to 40 feet and incorporating elongated members, beams, or other components having square or rectangular cross sections of sizes of at least about 6×6 to 24×24 inches with lengths from about 4 feet to as much as 40 feet or more. Preferred dimensions are described throughout the specification. As noted, previous and current mats of this type that are commercially available are primarily constructed of monolithic wood.

The term "non-wood" to describe the support structure is used for its ordinary meaning. The components of the structure are generally not made of wood but instead are made of metal, a thermosetting plastic or other materials that are resistant to degradation due to environmental factors such as moisture from water, snow or ice, organisms that can cause wood rot, or similar external factors that affect wood.

The term "substantially" is used for its ordinary meaning to indicate that the dimensions are not precise or exact. A skilled artisan can readily determine what tolerances are acceptable to provide a surface that is considered to be flat based upon the size of the side beams and the type of service that the mat is expected to provide. There is no requirement that the beams and elongated members be flush with each other along the top and bottom surfaces of the mat. Typically, the term "substantially" will mean that the top surfaces of the beams and elongated members can vary by as much as a few inches although in the more preferred embodiments the variance is less than 1 inch.

Additionally, all dimensions recited herein are approximate and can vary by as much as +10% to in some case+25%. In some situations, the term "about" is used to indicate this tolerance. And when the term "about" is used before reciting a range, it is understood that the term is applicable to each recited value in the range. Often, the craftsmanship and engineering procedures that are followed in construction of these mats minimize these tolerances as much as possible or industrially practical.

In one embodiment, the mats possess better environmental resistance due to the provision of a core made of environmentally resistant materials. The term "environmentally resistant material" means a material that is not subject to deterioration by water, moisture or other environmental conditions when compared to a conventional wood material such as white oak that is commonly used for such mats. This term includes thermoplastic and thermosetting materials as disclosed herein along with elastomers and even metals such as steel, aluminum or stainless steel. While steel does rust when encountering moisture or water, this is not considered to be a deterioration of the material as it is a surface phenomenon that does not affect the physical properties of the material but instead just detracts from its surface appearance. To avoid this, the steel components can be coated or painted to provide a better appearance and even further environmental resistance. Under certain conditions treated wood can withstand rotting and degradation much better than untreated wood such that it would be considered to be an environmentally resistant material because of its improved resistance against rotting.

A wide range of thermoplastic or polymeric materials can be used for the core of the mats of this invention. These materials would be molded or cast to the desired size and thickness of the mat. Useful materials include:

Acrylonitrile butadiene styrene (ABS)
Acrylic (PMA)
Celluloid
Cellulose acetate
Cyclo olefin Copolymer (COC)
Ethylene-Vinyl Acetate (EVA)
Ethylene vinyl alcohol (EVOH)
Fluoroplastics (PTFE, alongside with FEP, PFA, CTFE, ECTFE, ETFE)
Ionomers
Kydex, a trademarked acrylic/PVC alloy
Liquid Crystal Polymer (LCP)
Polyacetal (POM or Acetal)
Polyacrylates (Acrylic)
Polyacrylonitrile (PAN or Acrylonitrile)
Polyamide (PA or Nylon)
Polyamide-imide (PAI)
Polyaryletherketone (PAEK or Ketone)
Polybutadiene (PBD)
Polybutylene (PB)
Polybutylene terephthalate (PBT)
Polycaprolactone (PCI)
Polychlorotrifluoroethylene (PCTFE)
Polyethylene terephthalate (PET)
Polycyclohexylene dimethylene terephthalate (PC (PC)T)
Polycarbonate
Polyhydroxyalkanoates (PHAs)
Polyketone (PK)
Polyethylene (PE)
Polyetheretherketone (PEEK)
Polyetherketoneketone (PEKK)
Polyetherimide (PEI)
Polyethersulfone (PES)—see Polysulfone
Polyethylenechlorinates (PEC)
Polyimide (PI)
Polylactic acid (PLA)
Polymethylpentene (PMP)
Polyphenylene oxide (PPO)
Polyphenylene sulfide (PPS)
Polyphthalamide (PPA)
Polypropylene (PP)
Polystyrene (PS)
Polysulfone (PSU)
Polytrimethylene terephthalate (PTT)
Polyurethane (PU)
Polysulfone (PSU)
Polytrimethylene terephthalate (PTT
Polyvinyl chloride (PVC)
Polyvinylidene chloride (PVDC)
Styrene-acrylonitrile (SAN)

The core may also be made of an elastomeric material. The elastomers are usually thermosets (requiring vulcanization) but may also be thermoplastic. Typical elastomers include:

Unsaturated rubbers that can be cured by sulfur vulcanization—these are preferred from a strength and hardness standpoint:
  Natural polyisoprene: cis-1,4-polyisoprene natural rubber and trans-1,4-polyisoprene gutta-percha;
  Synthetic polyisoprene;
  Polybutadiene;
  Chloroprene rubber, i.e., polychloroprene;
  Butyl rubber (i.e., copolymer of isobutylene and isoprene) including halogenated butyl rubbers (chloro butyl rubber; bromo butyl rubber);
  Styrene-butadiene Rubber (copolymer of styrene and butadiene); and
  Nitrile rubber (copolymer of butadiene and acrylonitrile).
Saturated (i.e., non-vulcanizable) rubbers include:
  Ethylene propylene rubber (EPM);
  Ethylene propylene diene rubber (EPDM);
  Epichlorohydrin rubber;
  Polyacrylic rubber;
  Silicone rubber;
  Fluorosilicone Rubber;
  Fluoroelastomers;
  Perfluoroelastomers;
  Polyether block amides; and
  Chlorosulfonated polyethylene.

The elastomeric, thermoplastic or thermosetting materials disclosed herein can also be provided with conventional fillers to increase weight and hardness. They also can be reinforced with particulates, fibers such as glass, fabric or metal screening or scrim to reduce elongation and provide greater rigidity. Also, when the entire mat is made of elastomeric, thermoplastic or thermosetting materials, the entire mat can be made as an integral component.

The polymeric or elastomeric core can also be made as a flat sheet provided that it has the necessary weight and rigidity. These variables can be controlled by the selection of the particular polymer or by providing a particular configuration for the core. For example, the core can be made with a honeycomb or open cell structure.

The term "honeycomb structure" refers to a structure that has openings or open cells therein which can be used to reduce weight or can be filled with other materials. The shape of the cells can be hexagonal, square, rectangular, or of another polygonal shape, or they can even be round. The cells can be adjacent to each other or spaced as desired and can extend in either the horizontal or vertical or direction.

With this construction, the weight of the mat can be increased and the resistance to liquid absorption improved by filling the cells of the honeycomb structure of the core with one or more of various materials, including sand, dirt, gravel, particles of plastics, ceramics, glass or other materials, various foam materials, or even of recycled materials such as particles of ground vehicle tires or other recyclable materials. The latter are preferred to fill the core to provide an environmentally friendly or "green" mat.

The core can also be provided in two half sections, an upper section and a lower section. The upper section can be designed with protrusions or raised and lower areas on its lower surface with the lower section designed with complementary recesses or lower and raised areas on the surface that faces the upper section so that the upper and lower section can be joined together by engagement of the protrusions and recesses or raised and lower areas.

Alternatively, the core can be made of a metal frame or metal structure. Typically, steel, stainless steel or aluminum are used and the frame or structure can be bolted, riveted or welded together. The metal frame or structure if made of steel can be further protected by galvanizing, painting or otherwise depositing powder or liquid coating material thereon to prevent moisture from contacting the steel. For example, the entire construction core when made of steel can be coated with a paint or even with a thermoplastic or thermosetting resin.

The metal frame can be used as is or can be configured with netting, mesh or other material that allows any frame openings to be provided with a filler to modify the weight of the mat. If additional weight is desired, heavier filler material can be used. To fill in the interior sections of the frame without adding too much weight to the mat, a plastic or rubber filler of low density particles or foam can be used.

In another embodiment, for certain mat applications, the core can be a steel plate that is about 0.5 to 1" thick. The plate can be made from a rolled billet as a single member with smooth upper and lower surfaces, or smaller plate members can be welded together to form the core. The welds can be ground to provide the smooth surfaces or the elongated member or members that are attached to the plate can be modified to lay flat over the welds. Holes can be made through the plate to facilitate attachment of the elongated members on the upper or lower sides. Alternatively, threaded studs can be welded to the upper and lower surfaces of the plate to be received within matching holes in the elongated members to allow attachment by applying washers and nuts to the studs after the elongate members are placed upon the plate.

The assembled mats can be between about 4 and about 8 feet wide, between about 10 and about 60 feet in length and between about 4 and 24 inches in height. A preferred embodiment will be approximately 8 feet by 12, 14 or 16 feet. The core may be made of any environmentally resistant material disclosed herein and in the desired shape and configuration. The number of top, bottom, and core components will be dictated by the final dimensions of the mat for the particular application or end use.

The core made of environmentally resistant materials prevents degradation from exposure to weather conditions in the event that water or other liquids enter into the core. Preferred specific environmentally resistant materials for the core include:

- various thermosetting materials, including Epoxy, Melamine formaldehyde (MF), Phenol-formaldehyde (PF), Polyester, Polyurethane (PU), Polyimide (PI), Silicone (SI) or Urea formaldehyde (UF). These materials can be reinforced with fibers or filler (carbon, glass, metal, etc.);
- a thermoplastic material (any of the various plastics mentioned hereinabove) and in particular, HDPE, PET and SBR as disclosed in U.S. Pat. No. 6,380,309;
- a honeycomb structure with filled cells and upper and lower plate surfaces that are molded or otherwise constructed, as disclosed in U.S. Pat. No. 8,061,929;
- open face filled cellular structures of thermoplastics, polyolefins or vulcanized rubber as disclosed in U.S. Pat. No. 6,511,257;
- molded sheets of thermoplastic resin as disclosed in U.S. Pat. No. 5,888,612;
- a metal structure or frame of aluminum or stainless steel or of steel that is coated, painted or galvanized to assist in preventing rusting when contacting water; or
- a reinforced plastic composite material as disclosed in U.S. Pat. No. 4,629,358.

The edges of the core construction can be protected as disclosed in US patent 2014/0193196 or with wood or synthetic laminate to avoid mechanical damage to core edges. Additionally, a bumper structure of wood, elastomeric or plastic material as disclosed herein can also or preferably be used.

For certain open cell core structures, reinforcement with sheets or other cell closing materials can be used to improve stiffness and strength of the core while also retaining the filler in the cells or openings.

It is also possible to use a metal plate as the core. To reduce the weight of the mat, the core can be made of a honeycomb or lath structure, or with a plurality of openings. For very open structures, the cells or openings can be filled as noted above with a material that is lighter than the metal to maintain the weight at a desired level. The openings can be covered with upper and/or lower sheeting to retain the filler therein. Any material can be used for the sheeting as the metal core is providing the necessary strength and rigidity to the mat. Typically, the sheeting may be plywood, plastic, metal or composite material, and can be solid or in mesh form. The sheeting can be attached to the mat preferably by riveting, bolting or by an adhesive. The sheeting and core can be maintained in position be being sandwiched between the outer layers, with the entire structure held together by bolting or riveting. If necessary, holes for the bolts or other fasteners can be drilled through the metal plate or sheeting to facilitate assembly by allowing passage of the fasteners therethrough.

Generally, the mat construction comprises one of the cores disclosed herein along with upper and lower layers of elongated members such as plates, sheets, boards or beams. For the upper and lower layers, the thickness of the elongated member or members, boards or beams will be approximately 1.75 inches but may be between 1.5 and 3 inches. Length will be as desired but will preferably be 12, 14 or 16 feet. The width of the elongated member or members, boards or beams will vary depending upon location on the core. That is, the width of the top and bottom layer when boards are used will be approximately 8 inches (single width) or 16 inches (double width). Approximately means they may be slightly less such as 7.5 to 8.5 inches or 15 to 17 inches. The width of a plate or sheet will be the same as the width of the mat or some portion thereof, i.e., one-half, one-third, one-quarter or some other fraction of the width of the mat. Typically, the width will be about 4' to 8'. A typical thickness for the mat is approximately 6", with the central layer providing a thickness of about 1" to 4" and the upper and lower layers providing a thickness of about 1" to 3". Of course, the dimensions can vary depending upon the specific end use intended for the mat. Also, the elongated member or members, boards or beams can be manufactured to any particular thickness, width and length, but the preferred dimensions disclosed herein approximate those of conventional mats of white oak or other materials which are in use in the industry.

The mats are typically made of longitudinal members having a rectangular cross-section with all members having the substantially the same dimensions. In an alternative embodiment, some or all of the beams can be made smaller than the desired thickness of the mat and can be protected on their top and bottom surfaces by elongated members of boards or other structural components. These beams are typically made of lower cost materials having sufficient strength for use in the mat but that may not have sufficient ruggedness for the intended use of the mat. In this arrangement, the protective members and components are selected to provide better impact and abrasion resistance than the smaller beans such that the strength of the beams can be obtained with mat surfaces that are more resistant to the movement and placement of equipment across or onto the mat.

In a most preferred embodiment, the mat includes a core of an environmentally resistant material, an outer upper layer positioned above the core and an outer lower layer positioned below the core, wherein each outer layer includes a plate, sheet, or plurality of elongated members. When made of wood, these would have a modulus of 1.6 MM±20%. As noted, the core is made of materials that provide a load bearing capacity that is able to withstand a load of at least 600 to 800 psi to as much as 1000 psi without damaging or permanently deforming the core construction. The elongated members can also be made of any type of elastomer or plastic including recycled plastic materials. The plate or sheet can be made of those materials as well as of metal, e.g., steel or aluminum.

The core can include one or two outer layers as desired or necessary for a particular installation and stiffness. The core components can be made be of sections or smaller portions that are joined together to form the desired size of the core. As an example, for a thermoplastic core of HDPE, sections may be welded together to provide the desired size, e.g., four HDPE 4'×8' sections can form the core of a mat that is 8'×16'. Similarly, eight 4'×4' sections can be joined by welding to form the same 8'×16' mat. The same is true of wood, metal or elastomeric components, which can be joined mechanically, by adhesives or where applicable by welding. The core can also be made of upper and lower half sections that can be joined together by welding, a mechanical interlocking, by fasteners or by adhesives.

Additional layers or components can be added to the core or mat, but the most preferred construction includes outer layers above and below the core as noted herein. The outer layers are preferably made of white oak as disclosed in U.S. Pat. No. 4,462,712 (three layer) and U.S. Pat. No. 5,822,944 (two layer), the entire content of each of which is expressly incorporated herein by reference thereto. The mats are generally designed with water channels on the outer layer(s) to drain water from the mat.

Figure 2:
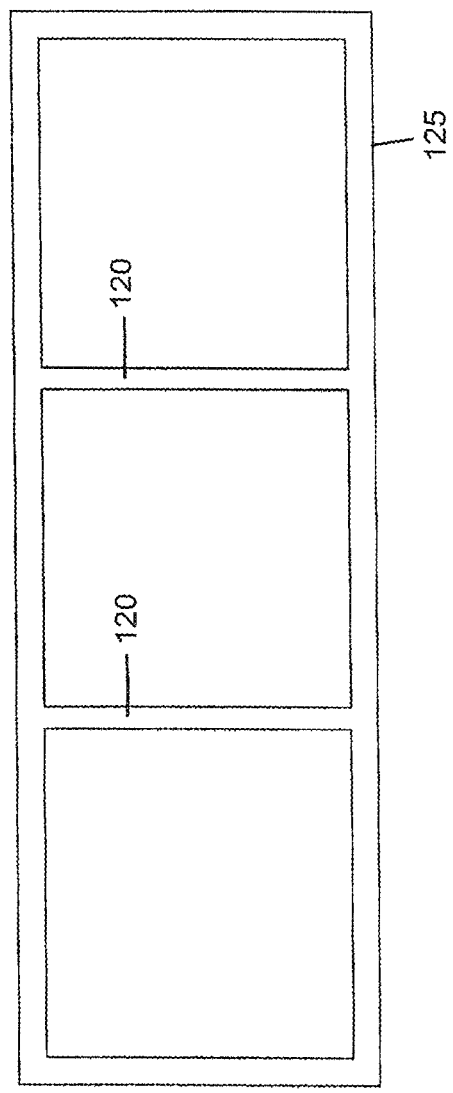
FIG. 2 is a side view of a reinforced polyester beam for use in the mat of FIG. 1.

Referring now to the Figures, FIG. 1 illustrates mat 100 that includes an upper outer layer 105 and lower outer layer 110 which are used to surround core 115. The core includes a plurality of reinforced polyester beams 125 and the outer layers include single width wood boards 130. The reinforced polyester beams 125 are oriented perpendicular to the boards of the upper and lower outer layers. As shown in FIG. 2, the reinforced polyester beam 125 is in the form of a rectangular tube that has two internal wall supports 120 running along the interior of the tube.

Boards 125 are applied to the core 115 by nailing, screwing, bolting or riveting of the boards 125 to the reinforced polyester beams 125 of the core 120. When bolting is used, the bolts can extend from the upper boards to the lower boards through the reinforced polyester beams 125. The nails, screws or bolt heads and nuts are recessed below the top surface of boards 130 and below the bottom surface of boards 130 to present relatively smooth upper and lower surfaces of the mat 100.

Alternatively, the boards can be attached to the core 120 by an adhesive or other means that provide a secure attachment. For example, when the core is made of a thermosetting material, the sheet and boards can be made of the same material as a unitary component. For a metal core, holes can be drilled to allow the bolts to pass therethrough.

Figure 3:
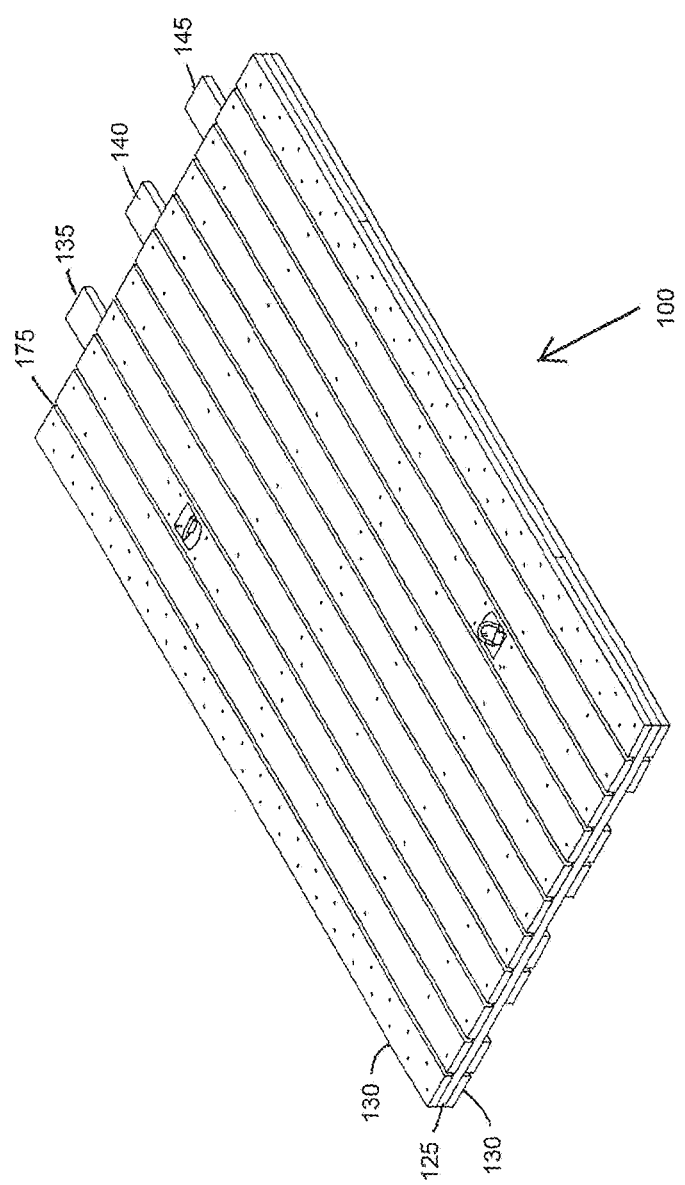
FIG. 3 is a view of the assembled mat of FIG. 1.

As shown in FIGS. 1 and 3, eleven (11) boards are used. The third, sixth, and ninth boards (135, 140, 145 respectively) of the lower outer layer are offset to provide an interlocking feature for the mat. And while offsetting of certain boards is preferred for providing an interlocking with adjacent mats, this is not always needed such that interlocking can be considered to be an optional yet desirable feature. Interlocking is often preferred to avoid staking of the mats to the ground or to avoid including other more complex components for use in connecting adjacent mats together.

And while the interlocking is shown on opposite sides of the mat, the mats can be interlocked together in any direction using the top or bottom layers with appropriate configuring of the components of those layers. The interlocking boards are provided on at least the lower surface of the mat, but in certain embodiments, they can be provided on both the lower and upper surfaces of the mat.

Lifting elements 150 are provided on the third and ninth boards of the upper outer layer. These lifting elements 150 are configured as D shaped rings which are attached to the boards in recesses 170 so that the lifting element 150 can remain flat when the mat 100 is in use. Two lifting elements are shown but a skilled artisan can determine how many elements are needed for lifting of any particularly sized mat. If desired, lifting elements can also be provided on the boards attached to the lower outer layer 110 for versatility in the handling and transportation of the mat. The lifting elements are provided on the boards that are attached to the skin portion so that if the lifting elements or boards are damaged they can be easily removed and replaced.

The provision of single width boards enables the upper and lower moldings to have water channels 175 on the upper surface of the skin to drain water from the mat.

FIG. 3 illustrates the final shape and configuration of the mat 100 after assembly.

Figure 4:
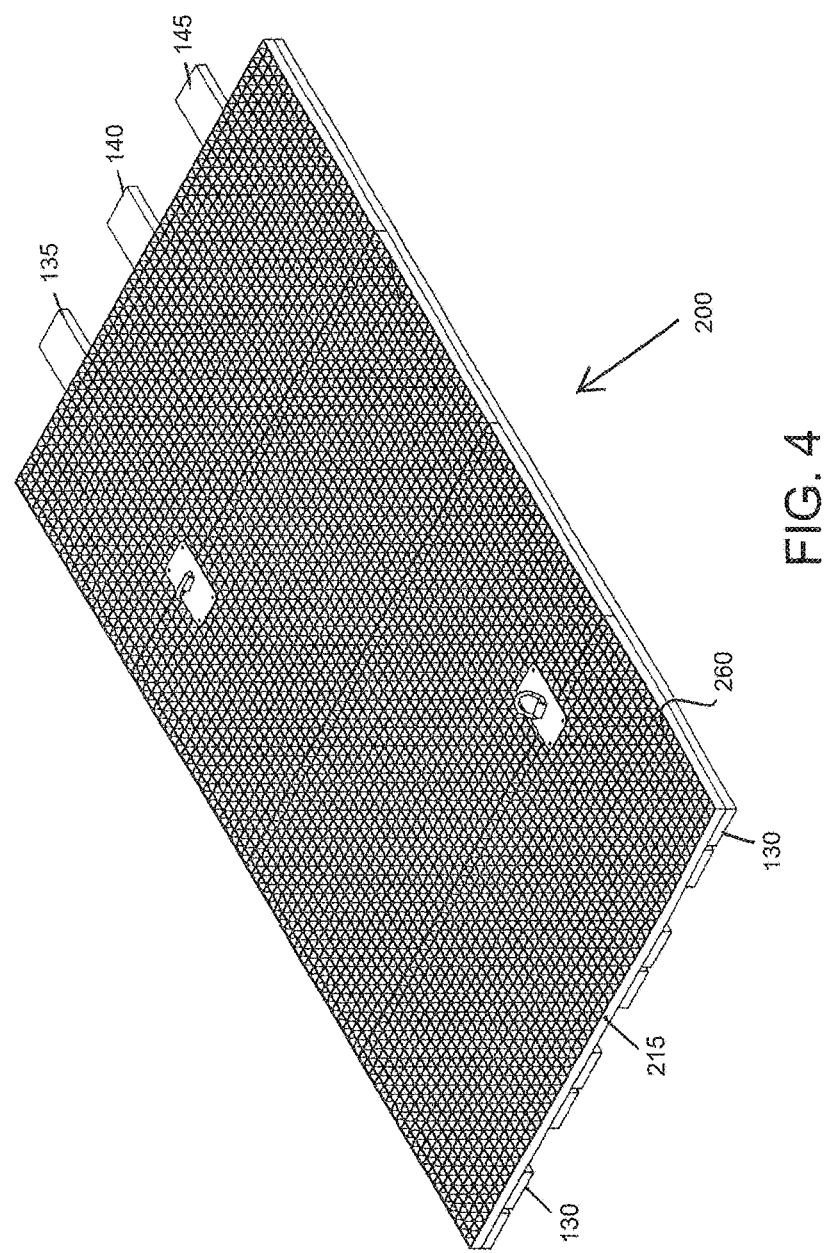
FIG. 4 is a perspective view of another embodiment of the mat of the invention to illustrate an open celled honeycomb structure for the core.

FIG. 4 illustrates a second mat 200 according to the invention which includes a lower outer layer 130 and a core 215 that has a plurality of cells 260. As some of the components are the same as in FIGS. 1-3, the same numerals used are used to designate the same components for the mat of FIG. 4. The core 215 may be made of a thermoplastic or metal and the cells can be left open or filled as disclosed herein. The core may be filled with a foam or other material that expands to fill the cells 260 and remains adhered thereto. In this situation, no cover member is needed to retain the filler material in the core 215. For that situation, or for the situation where the cells are not filled, upper and lower layers 130 as described above can be applied to the core 215 to assist in retaining the filler material in the cells 260.

Figure 5:
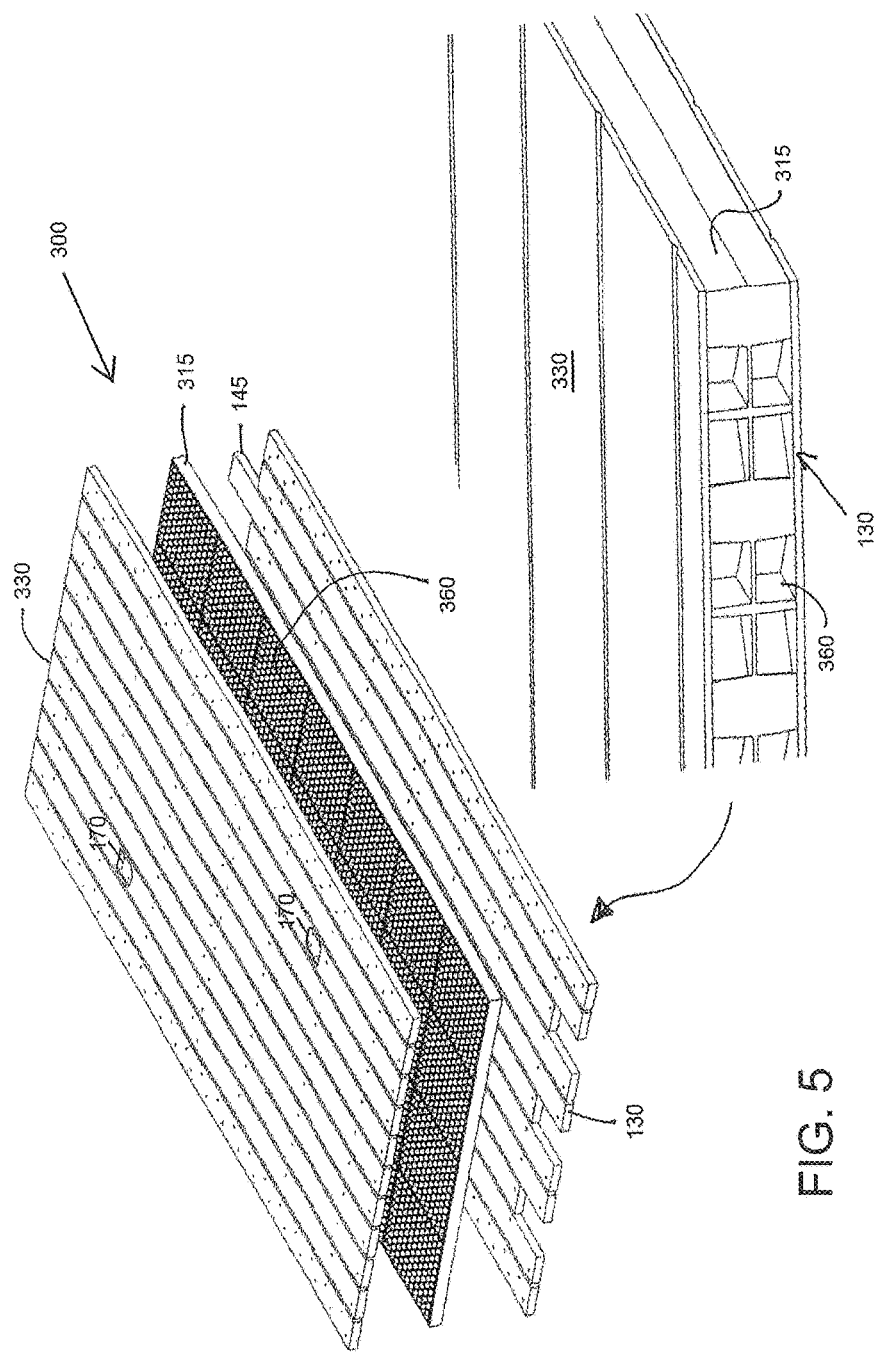
FIG. 5 is a perspective view of another embodiment of the mat of the invention to illustrate an open celled hexagonal honeycomb structure for the core and the presence of additional sheet members to retain particulate filler in the cells.

FIG. 5 illustrates a third mat 300 according to the invention which includes a lower outer layer 130, an upper outer layer 330 and a core 315 that has a plurality of cells 360. As some of the components are the same as in FIGS. 1-4, the same numerals used are used to designate the same components for the mat of FIG. 5. The core 315 may be made of a thermoplastic material or metal and the cells 360 are of hexagonal shape to provide larger openings can be left open or filled with particulate material as disclosed herein. In particular, the cells may be filled with foam, particulates or other non-adherent materials, e.g., rubber crumbles from recycled automobile tires. For such particulates, the cells 360 can be covered by one or more sheet members either above, below or both above and below the core to retain the non-adhering filler materials in the cells. The sheet members can be made of wood boards, plywood, plastic sheeting, metal sheeting, e.g., steel or aluminum, or the like. When the sheet members are only provided to hold the filler materials in the cells, they can be relatively thin e.g., ⅛" to ½" is sufficient although larger thicknesses can be used if desired to add weight to the mat. The core and sheet members can then be used as a core with outer layers applied as in the other embodiments.

Alternatively, when sheet members are not needed, the lower layer 130 and upper layer 330 can be wood boards that retain the filler in the cells 360 as shown in FIG. 5. In this embodiment, when the core 315 is molded of plastic material, the areas between where the boards are placed would be made of solid plastic rather than open cells so that the particulate material does not exit the cells through the spacing between the boards. These boards would have a thickness of 1.6" or greater depending upon the needed weight of the mat. The filler also contributes to the weight of the mat.

Of course, if the material of the core 315 and lower 130 and upper 330 layers provides sufficient weight, the cells do not need to be filled and the additional sheet members are not needed. Additional sheet members are also not needed if the cells are filled with an adherent filler material. The boards 130 of the upper and/or lower outer layers can be attached by bolting which passes through the cells. If desired, and preferably, the upper outer layer 330 is provided so that the final mat structure has an appearance that is similar to that of FIG. 3.

Another embodiment of the invention is a variation on that of FIG. 5. The core is made of a plastic material that has cells made with flat upper and lower surfaces. These surfaces support the sheet members if the cells are filled and instead support the lower and upper layers if the cells are not filled. These cells thus act as shock absorbers to provide resilient compression to the mat.

In a preferred embodiment of the invention, the mat includes bumpers which protect the sides of the mat from damage during transport and installation. These bumpers are generally configured as a rails, rods or beams of a material that protects the sides and core of the mat from damage when being moved around from warehouse to truck to jobsite. As the mats are relatively heavy, around 2000 pounds, they are moved by heavy equipment such as front end loaders or cranes, and are typically dragged or dropped into position. The bumpers also provide protection to the side edges of the mats due to such movements and manipulation as well as some resistance to penetration by teeth or tines of the moving equipment. In one embodiment, the bumpers are made of a durable, tough and resilient material such as a plastic or elastomer, in particular, HDPE or a rubber material having a Shore D hardness of 10 to 50 is preferred. The bumpers are preferably molded or extruded into the desired shape or shapes for releasable attachment to the mat.

Figure 6:
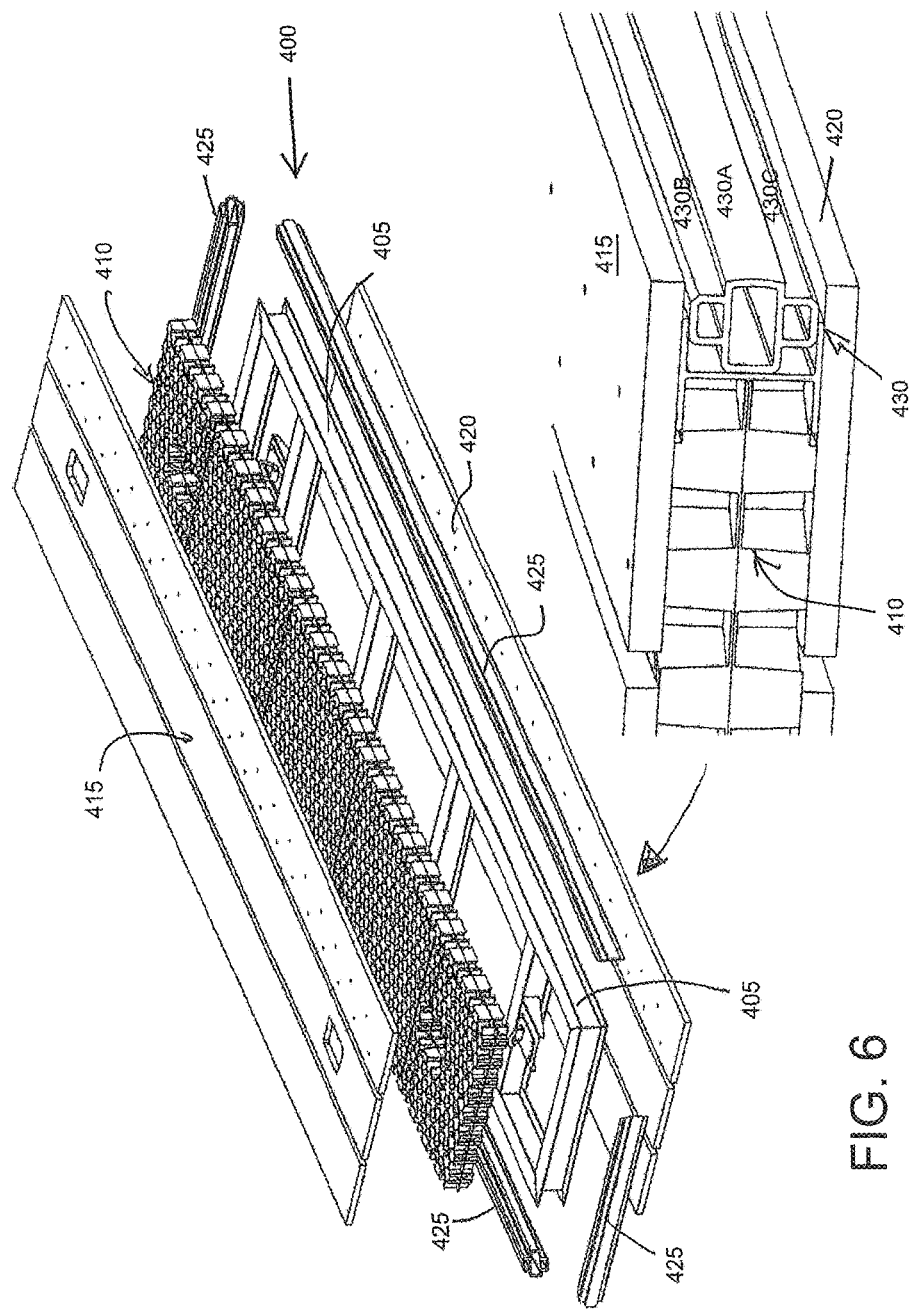
FIG. 6 is an exploded view of a mat that includes a steel I-beam frame, wood skins, a foam core and bumpers on all sides of the mat.

FIG. 6 shows mat 400 which is configured as a Crane/Pipeline mat, typically having dimensions of 8" thick by 4' wide and 18' long. These are used primarily for drilling rigs and similar applications such that these mats are much more robust and tough compared to mats for temporary roadways. To provide sufficient strength, the mat preferable includes a steel ladder frame 405 that provides the periphery of the mat. The frame 405 includes a number of cross-members to provide rigidity and strength to the frame to support the other mat components. The openings are provided to allow connections to be made and to reduce the overall weight of the mat compared to one made of solid steel. A core 410 is present within the ladder frame 405 and upper and lower wood skins 415, 420 are provided to protect the core 405. The core 410 of the mat is a solid or foam core preferably molded from HDPE or a similar polymer. The use of a polymeric core and the geometry/shape of the cells helps reduce the overall weight of the mat while providing sufficient internal support so that the mat can provide the necessary strength against compression and compaction. The wood skins 415, 420 provide sufficient durability to equipment or vehicles that move over or that are supported by the mat. Also, the mat has openings that allow water or other liquids to pass through during use. As the core is made of environmentally resistant materials, there is no need to provide a hermetic seal about the core components of the mat.

As shown in FIG. 6, the bumpers 425 are configured as an extruded or molded rail or rod that protects the sides of the mat. Generally, a single bumper structure is provided that is received in the open area of the I-beam that forms the periphery of the mat. The bumpers have a shape that fits within the open cavity of the I-beam without completely filling the area, as this allows the bumper to be compressed to absorb shock. If desired, the bumpers can be bolted, riveted or joined to the I-beam by an adhesive so that they are retained in position.

As shown, the bumpers in the enlarged view of mat 400 have a tri-tube arrangement 430, of a "+" shape, that has a larger tube 430A in the center and the smaller tubes 430B, 430C located above and below the central tube. The tubes can be extruded in the shape that is shown or separate tubes can be made and then joined by welding, adhesive bonding or even by mechanical fasteners. This shape is not critical, however, and other shapes that are round, polygonal or that have combinations of different shapes can be used for the bumpers if desired. For certain materials, the bumper can fill the entire open side cavity of the I-beam, or it can partially fill the cavity provided that the bumper contacts the inner wall of the I-beam and extends towards the periphery of the mat so that it can absorb shock or impact forces.

In other embodiments disclosed herein, the bumpers can be made of wood. Wood is a useful relatively low cost material that has a history of good service in oil field mat applications.

The bumpers are preferably located on all sides of the mat. To retain the bumpers in position in the I-beams, rather than using an adhesive of bolting, the upper and lower layers of the mat can be provided with an additional member that is nailed to the upper and lower wood skins to retain the bumpers in place to prevent their dislodgement from the I-beam. The bumpers provide protection to the sides of the mat as well as to avoid damage to the core components.

Figure 7:
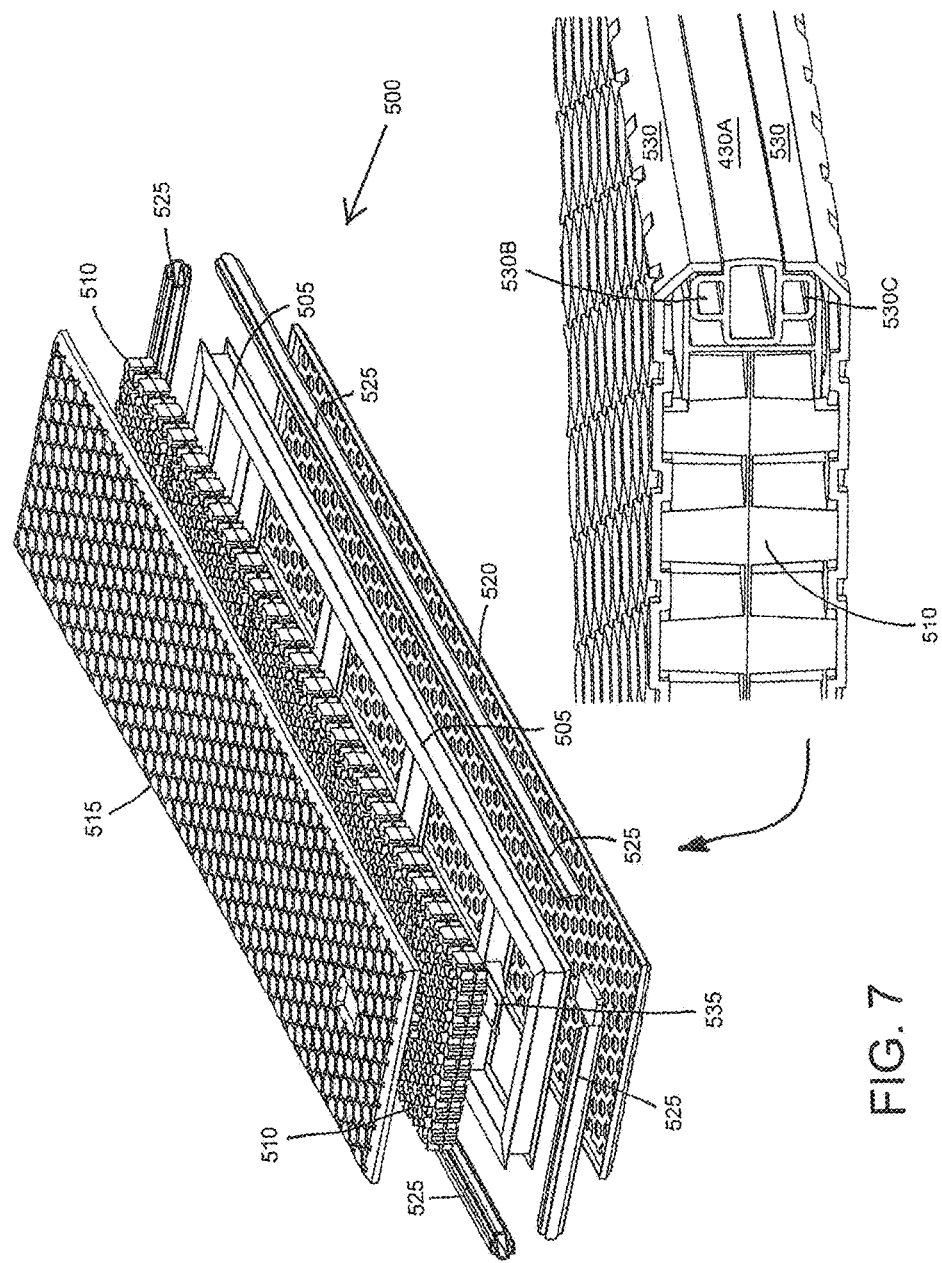
FIG. 7 is an exploded view of a mat that includes a steel I-beam frame, polymer skins, a foam core, and bumpers on all sides of the mat.

FIG. 7 illustrates another Crane/Pipeline mat 500 that also includes a steel ladder frame 505 that provides the periphery of the mat. A similar foam core 510 is present within the ladder frame 505 and upper. Instead of upper and lower wood skins, however, the mat 500 of FIG. 7 includes upper 515 and lower 520 vacuum formed polymer skins to protect the core 510. These skins can be formed to a thickness of up to 00.6" or greater. The skins preferably include lips 530 that engage the upper and lower portions of bumpers to retain them in place in the I-beams. Again, the bumpers are shaped as a plurality of joined tubes as shown in FIG. 6 with upper and lower tubes being of smaller cross section than the center tube. The upper and lower tubes can also be shaped to engage in full contact the I-beam inner surfaces while being recessed from the end of the central tube so that the lips 530 can maintain the bumpers in place. Other shapes for the bumpers are acceptable provided that they can fit in the I-beam and provide an outer surface that can absorb shock and impact. For the configurations shown the tubes can collapse somewhat to absorb such forces.

The lip portions of the upper 515 and lower 520 skins can be a separate component that is attached to those layers or it can be molded or formed as an integral part of those layers. Generally, the upper 515 and lower 520 skins are made of a molded plastic or elastomeric material because such materials provide environmental resistance and impart durability and toughness to the mat. Also, the core 510 can be provided in two halves, an upper half that is attached to the upper skin and a lower half that is attached to the lower skin. These halves can be designed with protrusions or raised and lower areas so that they can be joined together by engagement of the protrusions and recesses or raised and lower areas. This reduces installation time and also assures that the core and skins interlock to provide the best resistance against compressive forces.

In the embodiments of FIGS. 6 and 7, the steel frame can be painted or coated with a sacrificial metal (i.e., galvanized or phosphatized) to provide improved environmental resistance to the mat. While rusting of the steel is not detrimental to the operation of the mat, it does not provide a good cosmetic appearance such that the painting and coating compensate for that by minimizing rusting. Stainless steel can also be used but that material is more expensive. Aluminum can also be used but some strength to the mat is lost with that lighter weight construction. The metal ladder frame is advantageous because, in addition to its strength and ease of working, it can be configured to allow direct attachment of the lifting elements to the frame 505 to provide a more robust connection that facilitates lifting and manipulation of the mat.

As in FIG. 6, the mat of FIG. 7 has a reduced overall weight by incorporating the molded or structural foam core in the steel frame. Whether the upper and lower layers are made of an elongated member or members, boards or beams of wood, a plastic or elastomeric material or of metal, the entire structure is bolted or riveted together to form the final mat. When the frame and upper and lower layers are made of the same type of metal (e.g., steel or aluminum), they can be welded together.

Figure 8:
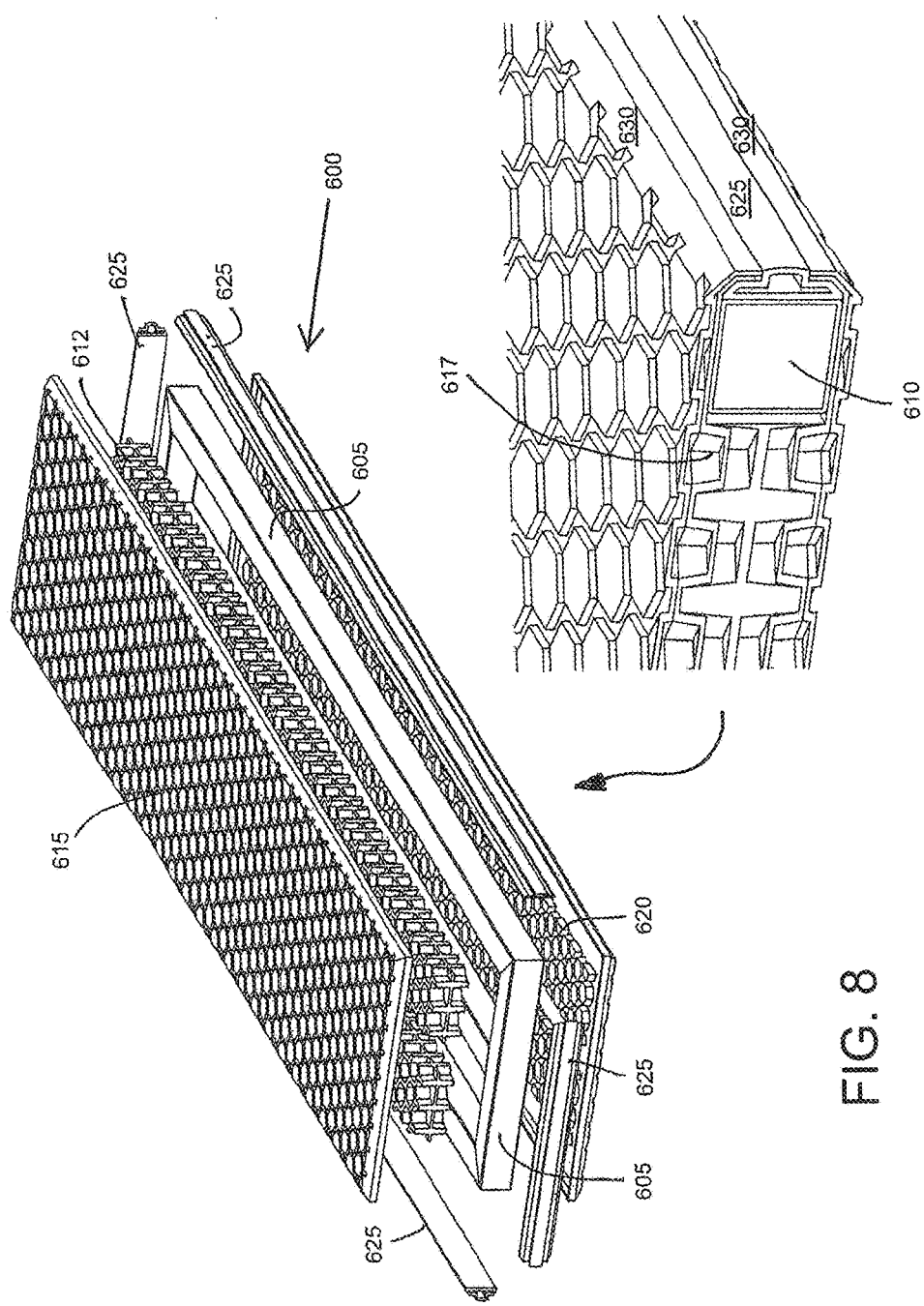
FIGS. 8 and 9 are exploded views of a mat that includes a fiberglass reinforced tube section frame, polymer skins, a foam core that interlocks with the skins and bumpers on all sides of the mat.

To further reduce the weight of the mat while also improving its environmental resistance, a box frame of fiberglass reinforced plastic (FRP) can be used instead of the steel frame. This is shown in FIG. 8, in mat 600, that has a FRP box frame 605. The box frame 605 may be made of rectangular or square tubular structures. The box frame can also be made of a plurality of such rectangular or square elongated tubular structures to imitate a crane mat that includes multiple beams or timbers. If desired, the FRP box frame 605 can instead be configured as a ladder frame as shown in FIGS. 6 and 7. The FRP frame provides lower weight and good durability and resistance to moisture of other liquids that may permeate into the core. To provide additional crush resistance to the frame 605, the open center portions of the tubular structures can be filled with foam, recycled rubber tire material or other filler material 610. A polyurethane foam can also be used for this purpose. The filler material can also be selected to provide additional weight to the mat if desired.

The plastic of the FRP material would be any one of the thermosetting plastics of the types mentioned herein but thermosetting polyesters and epoxies are preferred.

FIG. 8 illustrates another feature of the invention where the molded foam core 612 is locked in place by engaging pockets 617 in the upper 615 and lower 620 polymer skins. When a box frame is used, the bumpers 625 are configured with a flat surface to abut against the frame 605. The bumpers 625 are configured with upper and lower portions that are less wide than the central portion of the bumpers so that the skins 615, 620 can include lips 630 that engage the bumpers 625 to hold them in place against the box frame 605. These lips are essentially the same as those shown in FIG. 7. The bumpers protect the FRP box frame from damage since the FRP box frame is not as strong as the steel ladder of FIGS. 6 and 7. The FRP beams may be made by a pultruded process as this results in a light but strong construction.

In FIG. 8, the upper 615 and lower 620 polymer skins can be configured with protrusions or honeycombs that interlock with the core 612 to form a more rigid structure. Alternatively, the foam core 612 can be omitted and the open center of the mat filled recycled rubber tire material or other particulate filler material as is done with the central opening of the pultruded FRP box frame.

Alternatively, rather than fit into the structure on the sides of the mat, the bumpers can be designed with a "C" shaped cross section so that they can contact the top, side and bottom of the pultruded FRP box frame members. The top and bottom surfaces of the bumpers can extend above the upper and lower surfaces of the mat or they can be designed to remain flush with those surfaces by providing a thickness on the top and bottom bumper portions that correspond to the thickness of the top and bottom layers. Alternatively, the bumpers can be bolted, screwed, snap riveted or adhered to the FRP box frame with an adhesive.

Figure 9:
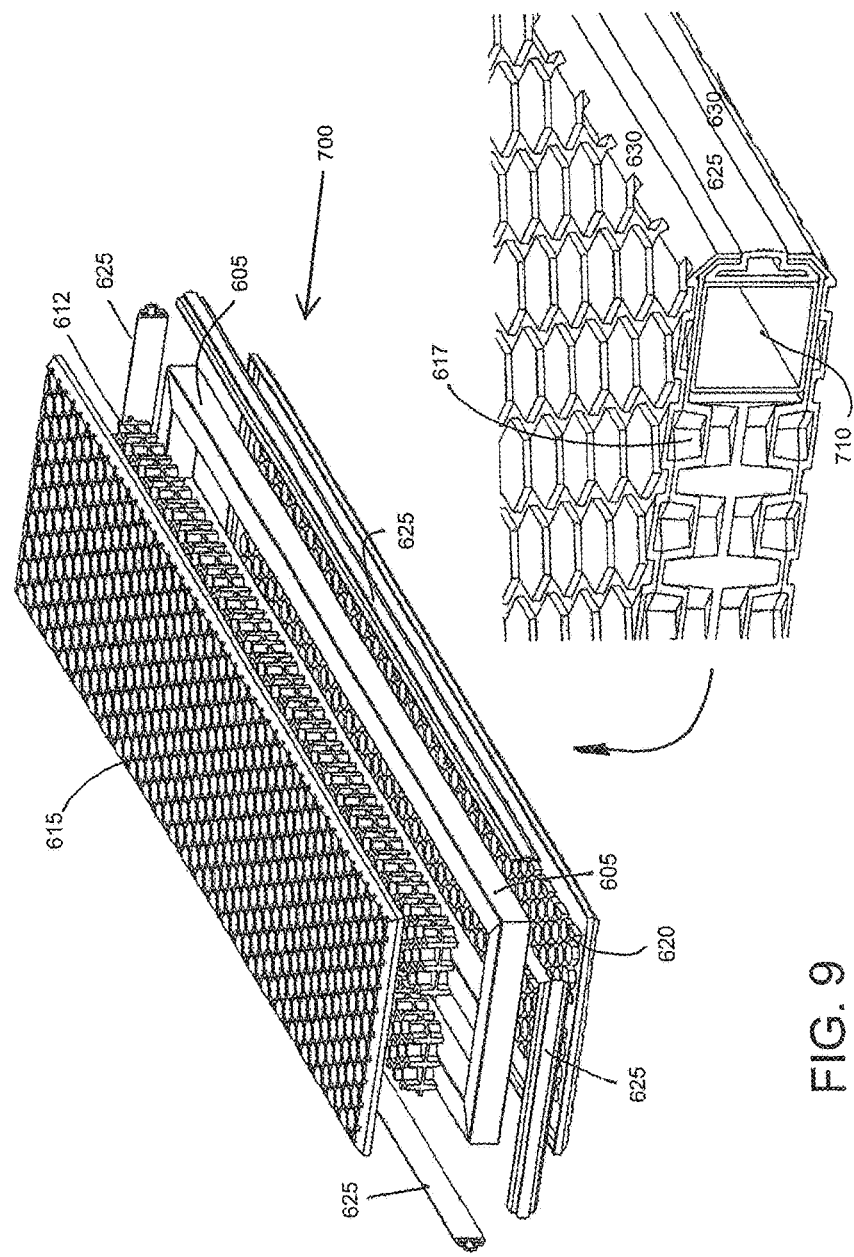

FIG. 9 illustrates the same type of mat as in FIG. 8 such that the same numbers are used to describe it. The main difference in the mat 700 of FIG. 9 is that the box fame 605 is not filled and is open 710 as for certain embodiments, the filler is not necessary. The bumpers in FIGS. 8 and 9 have a "T" shape with the central portion protruding beyond the sides of the mat to provide protection of the FRP frame and core.

Figure 10:
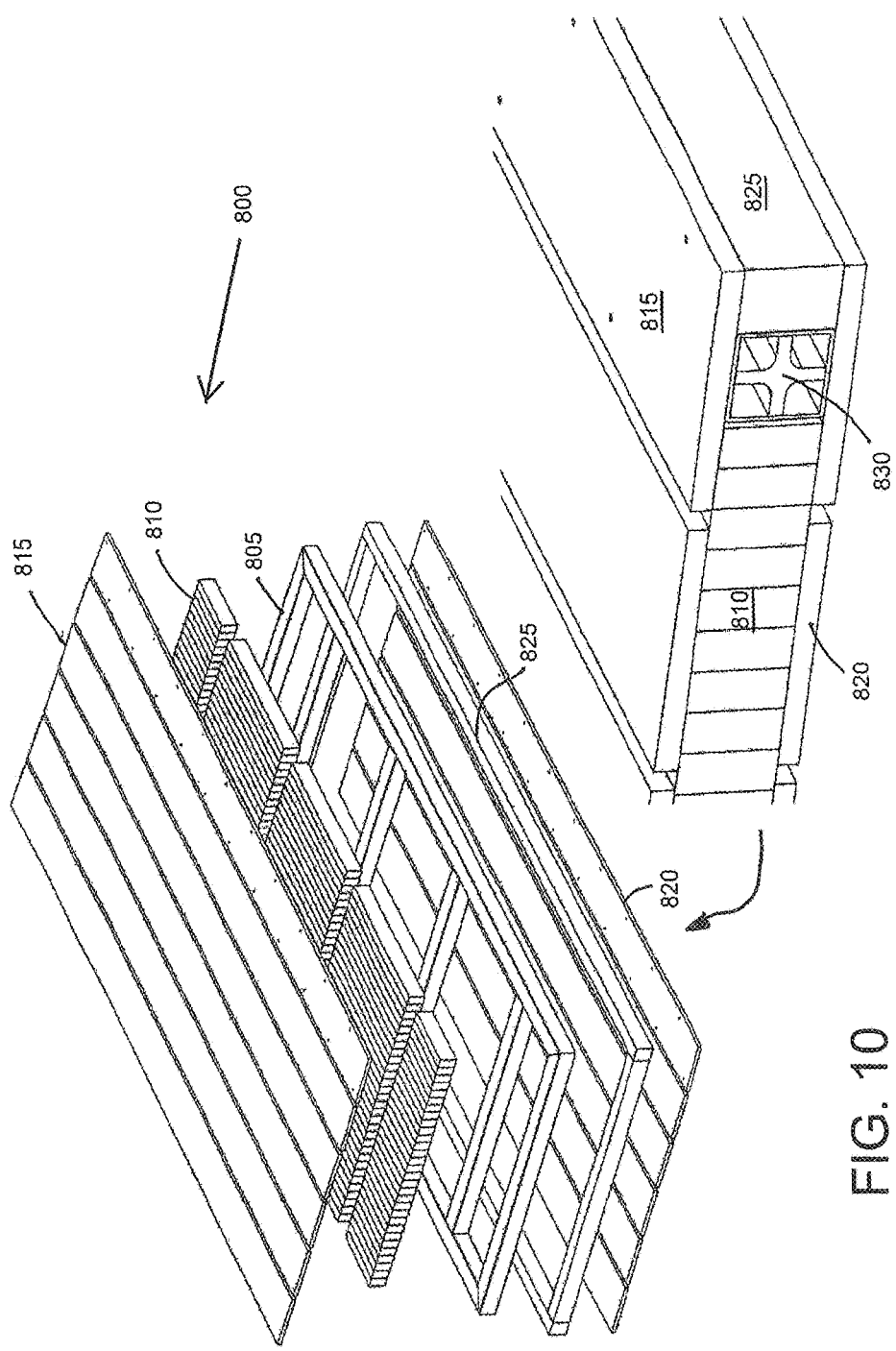
FIG. 10 is an exploded view of a mat that includes a fiberglass reinforced tube section frame, wood boards, a laminated oak core and an outer oak edge construction that protects the tube section.

FIG. 10 illustrates another embodiment of a Crane/Pipeline mat 800 that includes a box frame 805 of an FRP square tube. The box frame 805 surrounds a laminated wood core 810. Although the wood core 810 is heavier than the foam core of the other embodiments, it is much less expensive and can be used in certain installations where the greater weight or ruggedness of the mat is needed. The oak core boards are configured to fit within the openings of the box frame 805 and are bolted together so that they do not move around inside of the mat. Oak boards are also used as the top 815 and bottom 820 surfaces of the mat 800.

The FRP frame 805 is protected by a rectangular wooden structure 825 which is also made of oak boards. The boards are joined together to form a square structure that is approximately the same size as the box frame 805 in width and height dimensions although the perimeter is larger so that the structure 825 sits outside or and adjacent to the box frame 805. The wood structure 825 acts as a bumper to protect the FRP box frame from damage during loading, transport and installation.

To provide additional protection to the box frame 805, the open area of the frame can be provided with a stabilizer 830 of foam or extruded polymer. As in FIG. 8, the open area can be can be filled with recycled rubber tire material or other particulate or solid filler material. One variation of the stabilizer 830 is shown in FIG. 10 but the bumpers and solid foam inserts of the other embodiments can be used as well, depending upon the desires of the designer of the mat. The wood structure most likely obviates the need for stabilizers for most installations.

Figure 11:
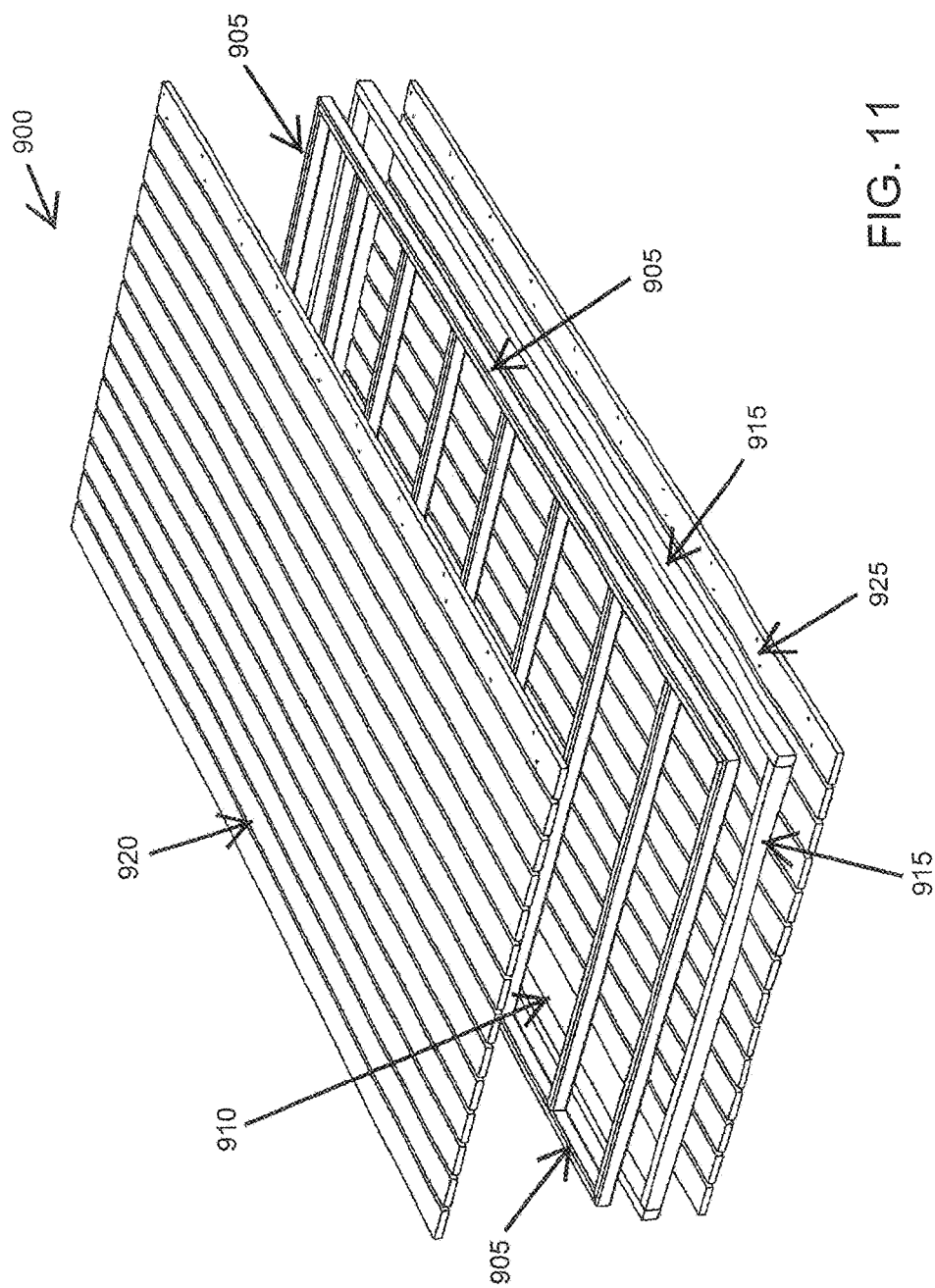
FIG. 11 is an exploded view of a mat that includes a metal frame, upper and lower wood boards and wood bumpers.

FIG. 11 illustrates another embodiment of a mat 900 that includes a frame 905 constructed of a metal such as aluminum, stainless steel or steel. The frame 905 is made of square or rectangular tubing that is welded together to provide a high strength core component for the mat. The frame 905 can remain as an open structure as shown or areas 910 between the cross members can be provided with a particulate filler or foam that is retained in place by a mesh, screen or sheets that are secured to the top and bottom of the frame. Also, if desired, the tubes can be filled with a foam, rubber particles or even sand to add weight and strength to the mat. If desired, a wood core can be used along with or instead of the fillers. Preferably, however, the areas are left free of any filler.

The mat 900 includes top 920 and bottom 925 wood boards preferably of oak that provide a flat surface for movement of vehicles or supporting equipment thereupon. These boards also provide upper and lower surfaces of the mat and protection of the core 905. These boards 920,925 also have spacings between them to allow water to drain from the upper surface of the mat, into the core and out of the lower surface of the mat. As the core 905 is made of an environmentally resistant material, there is no concern of deteriorating the core due to contact with water. The top and bottom wood boards are joined together about the frame using nails or bolts. Also, the tubular members of the frame 905 can also be provided with holes passing therethrough to accommodate bolting that is used to attach the wood boards 920,925 to the frame 905.

The frame 905 is also protected by wood boards 915 that provide replaceable bumpers for the frame 905. These can be attached to the frame by bolting that engages holes in the tubular members, or the wood boards 915 can be attached to the upper or lower boards 920, 925. As an alternative connection member, the frame 905 can be provided with studs or bolts that are welded to the tubular members and that receive the bumpers 915 or the upper 920 or lower 925 boards by passing through correspondingly located holes in those boards. The boards are then secured to the frame by appropriate nuts and washers or by flattening of the studs. This provides a simple yet robust construction for mat 900 which as noted allows replacement of boards that may become damaged during use. In the embodiments of FIGS. 9 to 11, the top boards can be 1.25" by 16" wide although smaller sections can be joined together if desired. The box frame has a preferred size of about 5.5" by 5.5" so that the mat has an overall thickness of about 6".

The new and improved industrial mats of the present invention now provide a number of surprising advantages over conventional mats. For one, the use of a support structure that is not made of wood conserves timber resources which would otherwise be harvested to provide the long length beans for construction of the mats. Now, only the side beams of wood are used with the support structure providing the remaining width of the mat. And in the preferred arrangements, the support structure is not of the same height as the side beams to allow other, thinner elongated members to be applied to the top and bottom of the support structure so that the upper and lower surfaces of the mat are substantially uniform. These members may be wood but shorter lengths and thinner cross sections are used.

For the arrangements where the beams are of smaller dimensions than the thickness of the mat, further conservation of wood resources is achieved with the inner beams protected by upper, lower or upper and lower layers of elongated materials of any of the materials mentioned. This is particularly advantageous when the smaller beams are made of pine or other softwoods with the upper and/or lower layers of one or more boards, plates or other elongated members being made of a more durable material to protect the softwood beams that are used in the mat core.

Other variations are also possible. The side beams can be made of a plastic, elastomeric or metal materials. These are generally rectangular in cross section and have a height that is the same as the overall thickness of the mat.

Another variation of the crane mat is the use of smaller pine timbers in the core. Instead of using 2 or 3 pine timbers of larger size, the crane mat uses pine boards of smaller dimensions, such as 2 by 8 inches, instead of 6 by 8 or 8 by 8 inches. This results in seven pine boards and six intermediate steel plates. Using a greater number of steel plates with the reduced width of the pine boards provides a reinforced structure that does a much better job of withstanding loads on the mat. The steel plates are ⅜" thick in this embodiment but they can vary from ¼" to ½" in other embodiments.

The smaller core members can also be plastic or elastomeric members that are solid or tubular structures that are filled or unfilled, or that are provided in layers of thinner members. The layers would be oriented perpendicular to the top and bottom surfaces of the mat and are held together by the joining rods and side beams or frame. Steel plate reinforcement between those members can also be used as previously described. And as an alternative, steel plates or tubes can be used.

Any of these configurations are acceptable for use with upper and lower layers that either protect a reusable core or that provide protection for the core when lesser abrasion resistant materials are used therein.

When the smaller beams in the core are protected by the upper and lower layers of other boards the working top and bottom surfaces of the mat are configured to be substantially uniform. In one arrangement, the top or bottom surfaces of the mat includes the top or bottom surfaces of the side beams and of the boards that protect the core beams. And in other arrangements, all beams can be of the same height with the upper and lower layers of boards covering all beams. In this arrangement, the top and bottom surfaces of the mat are the top and bottom surfaces of the protective boards.

A preferred embodiment uses fiberglass reinforced thermosetting resins, generally in the form of a pultrusion, for the side beams, all internal beams or the support structure, and for the and elongated members, essentially eliminates the use of any wood in the mats. This further conserves timber resources.

The use of a non-wood core or support structure enables that component to be reused in the event that the side beams or elongated members become damaged or experience deterioration due to use and exposure to harsh environmental conditions. By being made of more robust and environmentally resistant materials, it is possible to disconnect the joining rods to take apart the mats and remove the damaged side beams or elongated members, and then add new components to the structure to form a new mat. This also reduces the demand for wood beams or elongated members, in particular by 50 to as much as 100%.

Figure 12:
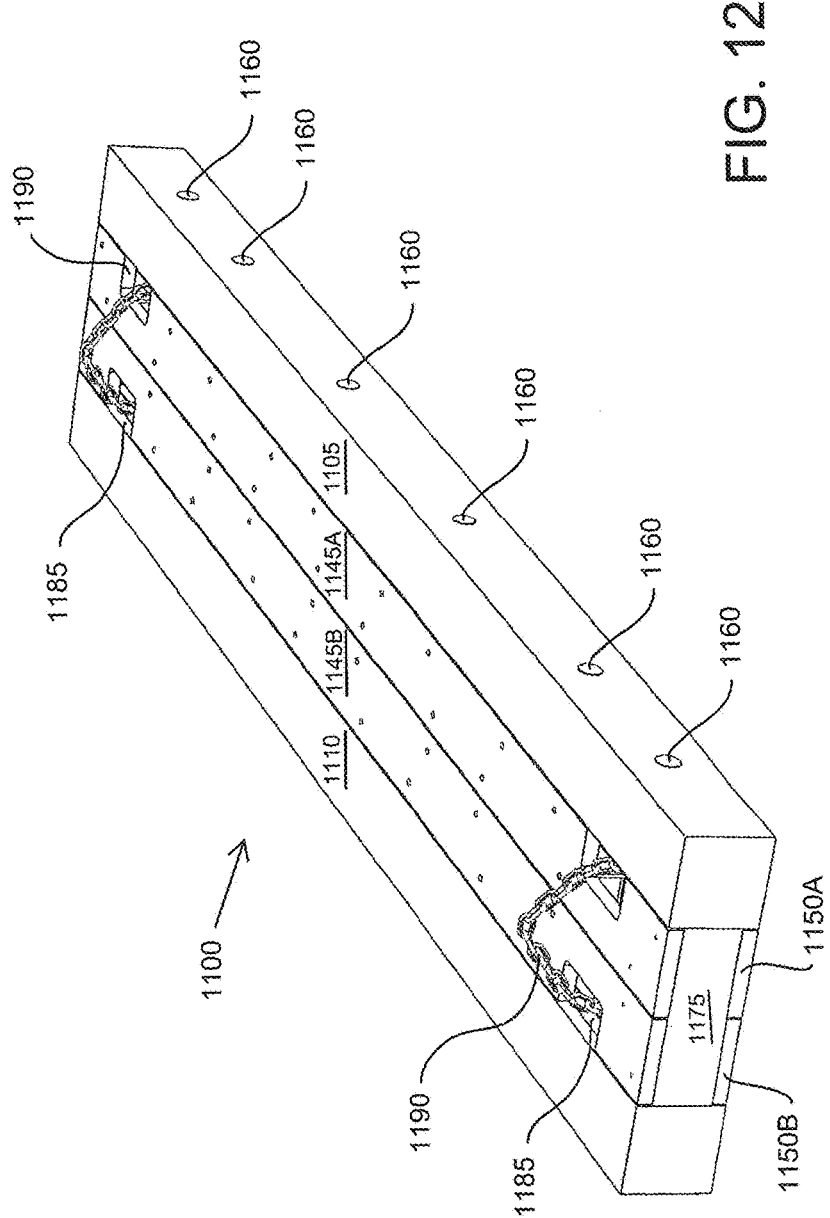
FIG. 12 is a perspective view of a first embodiment of a mat according to the present invention.
Figure 13:
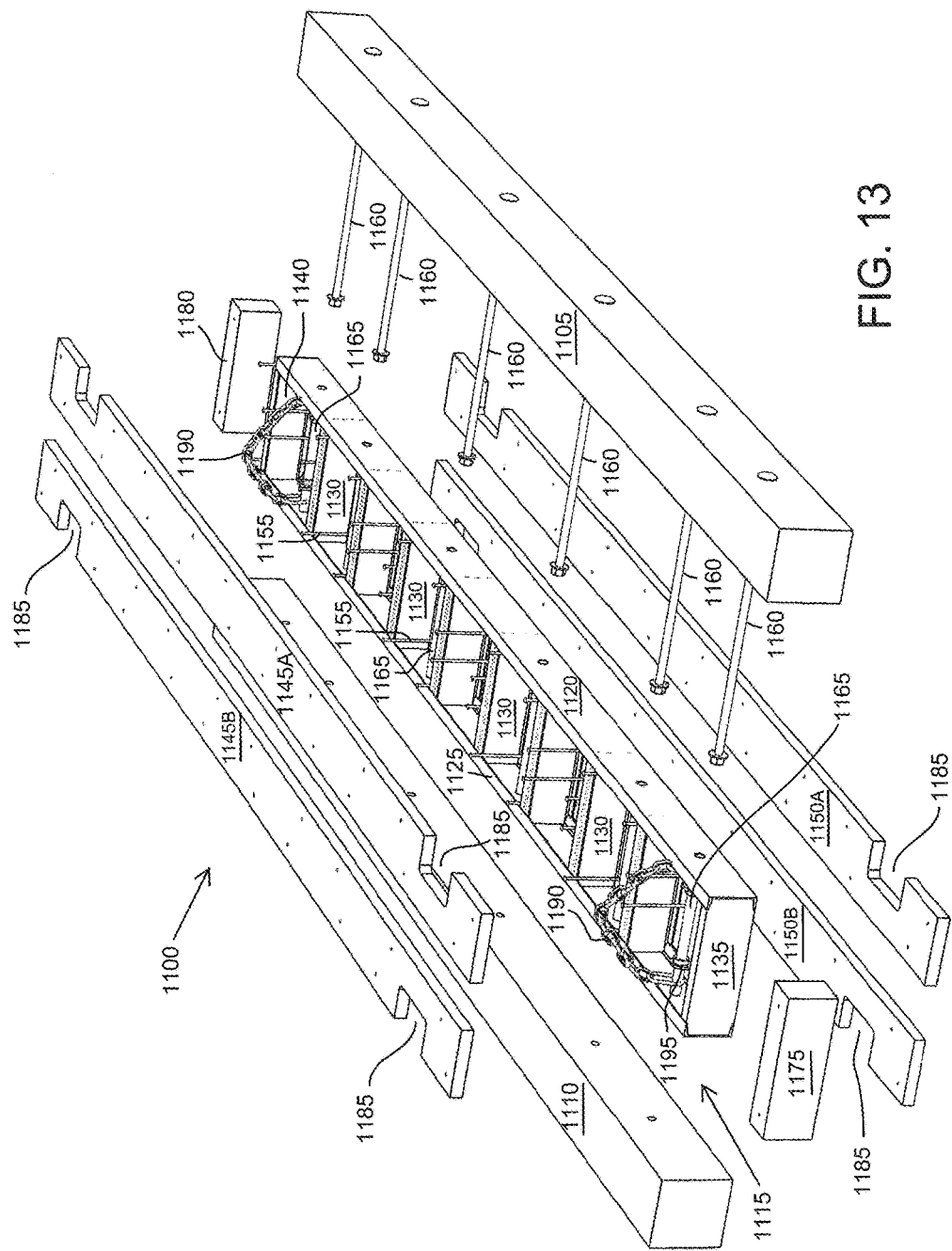
FIG. 13 is an exploded view of the mat of FIG. 12 to illustrate the various components present therein.

FIGS. 12 and 13 illustrate another embodiment of the invention in the form of a mat 1100 having substantially flat top and bottom surfaces. Although the bottom surface of the mat is not shown in these figures, the mat is preferably made with the same structure on both surfaces so that either one can be used as the upper surface of the mat that is to receive equipment or vehicles thereon. While this facilitates installation in that there is no requirement for placement of the mat in a particular orientation, it also allows the installer to select the surface of the mat that is in better condition to be used as the upper surface of the mat.

The mat 1100 includes first and second side beams (1105, 1110) having top, side and bottom surfaces, with the beams having width and height dimensions of between 6×6 inches and 24×24 inches and a length of at least 4 feet and typically between 10 and 60 feet. Preferably the lengths of the beams are in the range of 20 to 40 feet and preferably 30 to 40 feet as these length mats are easier to transport and ship compared to longer mats. Other dimensions that are typically used for the side beams are 8×8, 10×10, 12×12, 14×14 and 16×16 although a skilled artisan can select other dimensions as desired.

Typically, the widths and heights of the side beams are of the same dimension so that the beams have a square cross-section. Alternatively, for certain designs, the beams may be rectangular in cross section, with the width being about twice the dimension of the height or vice versa. Other typical dimensions are 6×12, 6×18, 8×10, 8×12, 12×14, 12×16, 12×24, and 18×24. These rectangular beams may be connected to the support structure with the longer side as the height or with the longer side as the width, depending upon the desired use of the mat. Using the longer side as the width is generally preferred for interlocking mat arrangements.

A support structure 1115 is located between and connecting the first and second side beams (1105, 1110), with the support structure having upper, lower and side portions, a height that is less than that of the side beams, a width and a length. The support structure, which is set forth in more detail in FIG. 14, includes first and second longitudinal members (1120, 1125) that are joined together by a plurality of cross members 1130.

In this and other embodiments of the invention, the beams are typically made of any type of wood with oak being the most preferred. They may also be made of engineered wood or lumber since that will be easier to make long lengths without having to obtain one piece virgin wood lengths. Additionally a layered veneer laminate can also be used for these members or beams. It is expected that the cost for that material would be about the same as the price for oak thus making it an attractive alternative.

The support structure 1115 may be made of steel components with the cross members 1130 welded to the longitudinal members 1120, 1125 to form a ladder type structure which forms a frame for the support structure. At the front and rear ends of the frame, additional cross members 1135, 1140 may be provided to form a peripheral rectangular structure. For this embodiment, it is preferred that both the longitudinal members and additional cross members 1135, 1140 be C-shaped beams having a relatively flat plate with upper and lower flanges directed away from one side of the plate. The surface of the flat plate opposite the flanges of the longitudinal members faces the side beams 1105, 1110 so that a close and secure connection can be made between the two. The flanges of the C-shaped beam also serve as a point of connection for elongated members (1145A, 1145B; 1150A, 1150B). Bolts 1155 can be attached to the flanges or to the cross members for this purpose. The flanges of cross-members 1135, 1140 also face the interior of the support structure so that the ends of the ladder frame have relatively smooth faces.

Figure 14:
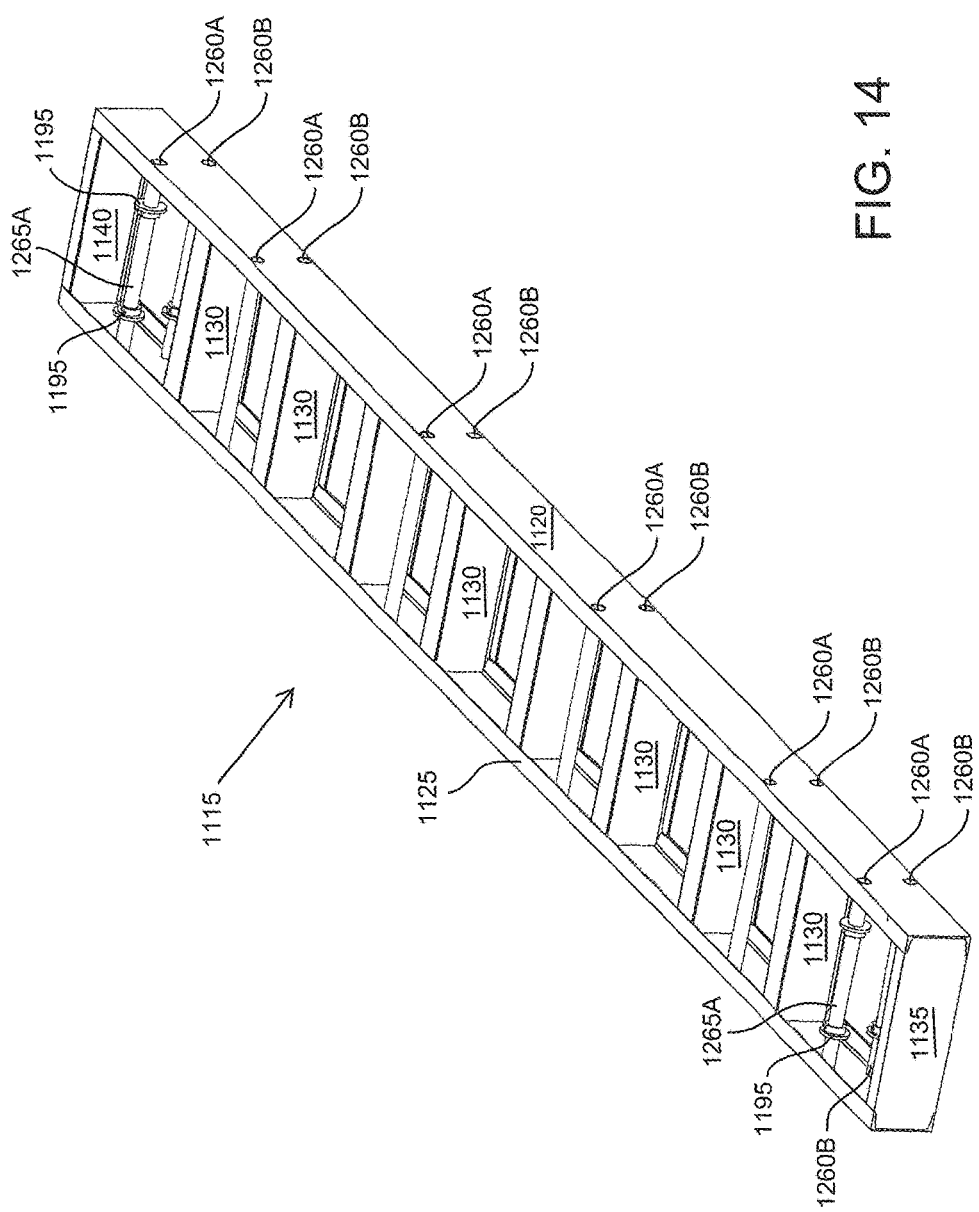
FIG. 14 is a perspective view of the support structure for the mat of FIG. 12.

The cross members 1130 can be attached to the C-shaped beam between the top and bottom flanges to form vertical connectors of the support structure that provide the desired strength and rigidity. As shown in FIGS. 13 and 14, the resulting structure is a rectangular box frame with spaced cross members on the front, back, top and bottom.

The cross members 1130 of the support structure greatly contribute to the stiffness and rigidity of the frame. These members are typically spaced 12 to 24 inches apart for support structures that are used for the smaller sizes of height and width beams. For larger size beams, the spacing can be reduced to 10 to 16 inches in order to provide sufficient strength to hold the mat together. The determination of the spacing of the cross members can be calculated for any particular size mat using generally known engineering guidelines and equations so a more detailed explanation is not needed herein. The cross members typically have a height that is at least half the height of the longitudinal members to which they are attached and preferably are about the same height as the longitudinal members. If desired, reinforcement members can be added to the structure. In one such arrangement, additional plates, rods, beams or other structural components can be added to the top and/or bottom portions of the support structure between the longitudinal members. This is certainly advantageous when supporting the largest or heaviest equipment on the mat. Also, other structural members can be provided between the cross members however in most situations this is not necessary. If additional reinforcement is needed, care must be taken for positioning such members to avoid blocking or interfering with the passage of the joining rods through the longitudinal members and into the support structure.

The C-shaped beam and cross members are typically made of a metal such as steel so that the structure can be made by welding the cross members to the beams. While the preferred construction of the metal frame of the support structure is by welding, the frame components can instead be joined together by brazing, rivets or bolting if desired depending upon the size and configuration of the overall support structure. Instead of a C-shaped beam, a flat plate (i.e., one without flanges) of the appropriate thickness can be used. For this arrangement, the cross members may have an I-beam shape to provide further strengthening of the support structure. A C-shaped steel beam is preferred for the longitudinal members, however, because the flanges provide additional rigidity and support to the structure as well as support for the cross members during installation. Of course, this can be compensated for by using a thicker flat plate for the longitudinal members when that embodiment is to be used. And the I-shaped beams can be used for the cross member when a C-shaped longitudinal member is used, with appropriate adjustments made where the flanges of each come into contact with each other.

When the components of the support structures are made of metal, steel is typically used as that material is readily available and of low-cost. Although not necessary for most applications, the support structure can instead be made of a more corrosion resistant material such as stainless steel, copper, bronze, or other alloys. When carbon steel is used, however, the corrosion resistance can be enhanced by painting or coating the structure so that it would be more resistant to moisture. Also, steel can be galvanized or provided with another type of protective coating so that it would have a lower tendency to rust when contacted by moisture.

Aluminum or titanium can also be used for the support structure in specialty applications. All of these materials generally have higher cost than steel and can present joining the problems of greater difficulties in welding or brazing the cross members to the longitudinal members. It is possible in an alternative embodiment as noted to use rivets or bolting to connect the various longitudinal and cross members together to form the frame of the support structure. The sizing of the rivets or bolts as well as the dimensions for the welding and brazing, can be readily determined by a skilled artisans using routine testing if necessary. The same is true for the thickness of the beams or members that are used in the frame structure.

Alternatively, the support structure may be made of a fiberglass reinforced thermosetting plastic material resin, which is typically a polyester or epoxy resin. The components of the structure may be pultruded in the form of a rectangular or square tube which may be hollow or filled with other materials depending on the overall weight and compressibility desired for the construction.

When fiberglass reinforced thermosetting plastic material is used to form the support structure, the box or ladder frame can be prepared in the desired shape with the cross members and longitudinal members joined together with resin prior to curing. It is also possible to utilize bolting or other mechanical fasteners to connect these components together.

A plurality of joining rods 1160 are used to attach the side beams to the support structure, with the joining rods passing through the sides of the beams and support structure. These joining rods 1160 are typically large carriage bolts that include threaded ends to receive nuts that when assembled will hold the components together. These rods are spaced about 3 to 6 feet apart depending upon the size of the mat. FIG. 13 shows the rods 1160 passing through side beam 1105 and toward the side structure: FIG. 14 shows how the rods 1160 would appear when present in the support structure. These carriage bolts are typically made of a high strength steel. Also, in some embodiments, the beams can include a sleeve that facilitates passage of the bolts through the support core. The sleeve can be a flanged hollow tube that extends through the support core and if desired into one side beam and part of the opposite side beam. The tube would terminate in the opposite beam so that it would not interfere with the net that engages the threaded end of the bolt. The sleeves are shown in FIG. 14 as elements 1165.

To form a substantially flat surface on the mat, various plates, sheets or elongated members can be provided. Shown are upper and lower elongated members (1145A, 1145B, 1150A, 1150B). A first plurality of elongated members (1145A, 1145B) are attached to an upper portion of the support structure 1115 while a second plurality of elongated members is attached to a lower portion of the support structure 1115. Thus, the top surface of the mat is formed by the top surfaces of the side beams 1105, 1110 and the first plurality of elongated members 1145A, 1145B, while the bottom surface of the mat is formed by the bottom surfaces of the side beams 1105, 1110 and the second plurality of elongated members 1150A, 1150B. The flat top surface of the mat is best shown in FIG. 12.

For top or bottom surfaces of the mats with no openings or spacings between elongated members, plates or sheets can be used. When the side beams are not used, metal plates or sheets can be welded to the frame to form an impervious platform.

As the upper and lower surfaces of the mat must be somewhat uniform, the support structure and upper and lower elongated members generally have a combined height that is the same as that of the side beams. Typically, the support structure is centered vertically with respect to the side beams. As an example, the side beams can be 12×12 and the support structure would have a height of 8 inches so that the plates, sheets or beams extend 2 inches above the top of the support structure and 2 inches below the bottom of the support structure. This provides room on the top and bottom of the support structure to accommodate 2 inch thick elongated members so that the top and bottom of the mat has substantially uniform surfaces. This type construction is preferred in that it minimizes the different types of thickness that need to be used for the elongated members and also provides a symmetrical mat that be oriented with wither surface facing up to receive equipment thereon. In other embodiments, different thicknesses of elongated members can be used on the top than on the bottom with the intent being that the thinner members are used on the bottom to prevent dirt or other materials from entering the support structure, while the elongated members on the top surface are provide to support the equipment or vehicles that are located or move upon the mat. In this embodiment, it is possible to provide a flat plate on the support structure of the lower surface rather than elongated members.

The same is true for the ends of the support structures. The longitudinal members 1120, 1125 can be shorter than the length of the side beams 1105, 1110 by a distance of about 1 to 24 inches on each end or by a total of 2 to 48 inches. The distance of the shortened ends can correspond to the width of the side beams, if desired. The space between the shortened ends of the support structure 1115 and the side beams can be filled in with bumper members 1175, 1180 which then allow the mat to have substantially flat front had rear ends. These bumper members can be of the same width as the elongated members so that the same material for the elongated members can be used to provide bumper members for the front and rear of the support. This creates a symmetrical structure but different thicknesses of the bumper members can be used if desired.

In a less preferred embodiment, the longitudinal members 1120, 1125 can be substantially the same length as that of the side beams 1105,1110 so that the front and rear cross members 1135, 1140 form with the ends of the side beams the front and rear end surfaces of the mat.

FIG. 12 also illustrates a lifting element 1190 in the form of a chain the ends of which are secured to a joining rod 1160. Each end of the chain 1190 passes through an opening 1185. The chain is configured of steel having sufficient strength to be able to lift the entire mat without bending or breaking. Also, the links at either end of the chain can be securely attached to the joining rod when the mat is assembled.

In a preferred arrangement, only one end of the chain 1190 is permanently secured to the joining rod, while the other is attached by a conventional connectable link. Thus, after the ma is moved into position, the chain can be disconnected and stored inside support structure so that personnel working on the mat will not trip over the chain.

Alternatively, if a removable chain is desired, such as may be supplied with the equipment used to move the mats, the chain can be provided with a connectable link on each end so that the workers can attach each end of the chain to the joining rod when the mat is to be moved. After the mat is installed, however, the chain can be removed from the joining rod and reused for moving or installing other mats. This again provides greater safety for workers as the chains are not present on the surface of the mat during use.

And for additional safety, the size of the opening 1185 is reduced compared to mats of the prior art. As the opening 1185 provided for connecting the chain is much smaller than the previous opening or cut away beam that exposed the joining rod, personnel who are working or conducting operations upon the mat have a much lower chance of stepping into hole 1185.

Figured 13 illustrates that the joining rod 1160 includes a flange or ring 1195 which is welded to the joining rod beneath hole 1185. This flange or ring 1195 is used to retain the end or connecting link of the chain 1190 in the proper position beneath hole 1185. In this way, the chain is pulled upward in a way that does not interfere with elongated members 1145A, 1145B.

As noted in FIGS. 12-14, openings 1185 are provided on the near the front and rear portions of the upper surface of the mat, as well as on the lower front and rear portions. This allows the installer to grasp any side or end of the mat to facilitate installation. And when a removable chain is provided, it can simply be attached to the holes at the easiest accessible end of the mat for lifting.

The mat must also provide sufficient load bearing capacity: A fully supported mat (one that is properly installed on a suitable prepared ground surface) must be able to withstand a 10 ton load, spread over a 12 inch diameter surface without degradation of mat properties or permanent deformation of the mat. The support structure would have a crush resistance of between about 500 and psi to possibly as much as 1000 psi depending upon the application and when properly installed on a suitably prepared ground surface. This provides resistance against compression as large vehicles or equipment move over or are placed upon the mat.

The side beams of the mat prevent or reduce damage to the support structure from side entrance or egress onto the mat from large vehicles with steel tracks. These beams in some embodiment can also act as bumpers to protect the mat and can be attached to the mat in a removable manner such that they can be replaced when necessary while the support structure can be reused to make a new mat.

The elongated members as well as the side beams are preferably made of any type of wood although oak is typically preferred. These members may also be made of engineered wood or lumber since that will be easier to make long lengths without having to obtain one piece virgin wood lengths. Additionally a layered veneer laminate can also be used for these members or beams. It is expected that the cost for that material would be about the same as the price for oak thus making it an attractive alternative.

Engineered lumber (or engineered wood) includes a range of derivative wood products which are manufactured by binding or fixing the strands, particles, fibers, or veneers or boards of wood, together with adhesives, or other methods of fixation to form wood composite materials. These materials provide the surprising benefit of repeatable consistency of the required sizes, the ability to mix different wood species to arrive at the final product, and exceptional properties generally exceeding what is provided from monolithic boards.

There are three types of engineered wood that can be used in the present invention:
 parallel strand laminate (PSL), which is a beam that can be manufactured up to about 12×12 inches in any length due to the production of the beam by a continuous process;
 layered stand laminate (LSL), which is a billet that can be made at thicknesses of from about 1" to 4", in widths from about 2 inches to 54", and in lengths of about 8 feet to 64 feet; and
 layered veneer laminate (LVL) which is also a billet that can be made up to about 4 feet square by any length.

While the beams are typically made of wood, as noted other materials may instead be used. When the beams are made of metal, steel is typically used as that material is readily available and of low-cost. Although not necessary for most applications, the beams can instead be made of a more corrosion resistant material such as stainless steel, copper, bronze, or other alloys. When carbon steel is used, however, the corrosion resistance can be enhanced by painting or coating the structure so that it would be more resistant to moisture. Also, steel can be galvanized or provided with another type of protective coating so that it would have a lower tendency to rust when contacted by moisture. It is preferred for some embodiments that the metal be weldable to facilitate construction of the beams. And aluminum or titanium can also be used for the beams in specialty applications. All of these materials generally have higher cost than steel and some present greater difficulties during welding or brazing. For these embodiments, the metal beams are typically provided as square or rectangular tubular structures or as a plurality of plates. These members can be prepared in the desired shape and configuration by welding or brazing smaller shapes or segments together.

Alternatively, the side beams and elongated members may be made of a fiberglass reinforced thermosetting plastic material such as fiberglass reinforced polyester or epoxy resins. These materials may be pultruded into a solid form or preferably as a rectangular or square tube. If desired, hollow tubes can be filled with any one of a variety of materials to contribute to the overall strength or compression resistance or desired compressibility of the tube. Typically, crumb rubber, recycled tires or other plastic or elastomeric materials, sand, crushed rock or polyurethane foam may be provided inside the tube either before or after attachment to the support structure. A polyurethane foam is preferred for this purpose as it can be injected in a liquid form after the pultrusion is attached to the support structure. For stronger or heavier filler, the joining rods may be initially placed into the beam so that the filler does not block the insertion of the rods when joining the side beams to the support structure. Additionally, a metal or pultruded plastic tubular sleeve can be provided in the beams at the locations where the rods are to be inserted, so that the rod has an opening that remains after the filler is placed into the beams.

The plastic or elastomeric materials can be used either as solid rectangular structures or as layers. Depending upon the anticipated service and conditions to be experienced, different combinations of beam materials can be used. Thus, the invention provides a wide range of different beam materials and material combinations that can be selected for any particular end use or service requirement for the mat.

As these mats are relatively massive, provision should be made for moving, transporting and installing the mat at the desired field location. For this purpose, holes are provided in the upper surface, lower surface, or both to provide access to one or more of the joining rods. These holes are formed as cut out portions 1185 of the elongated members 1145, 1150. In this way, the holes allow access by a hook from a crane or other mechanical attachment to the joining rods for lifting or manipulation of the mat. For convenience, the attachment openings 1185 are provided both on the upper and lower surfaces of the mat so that either surface can contact the ground or be exposed on top as the surface upon which the equipment is to be installed, thus facilitating installation.

Figure 15:
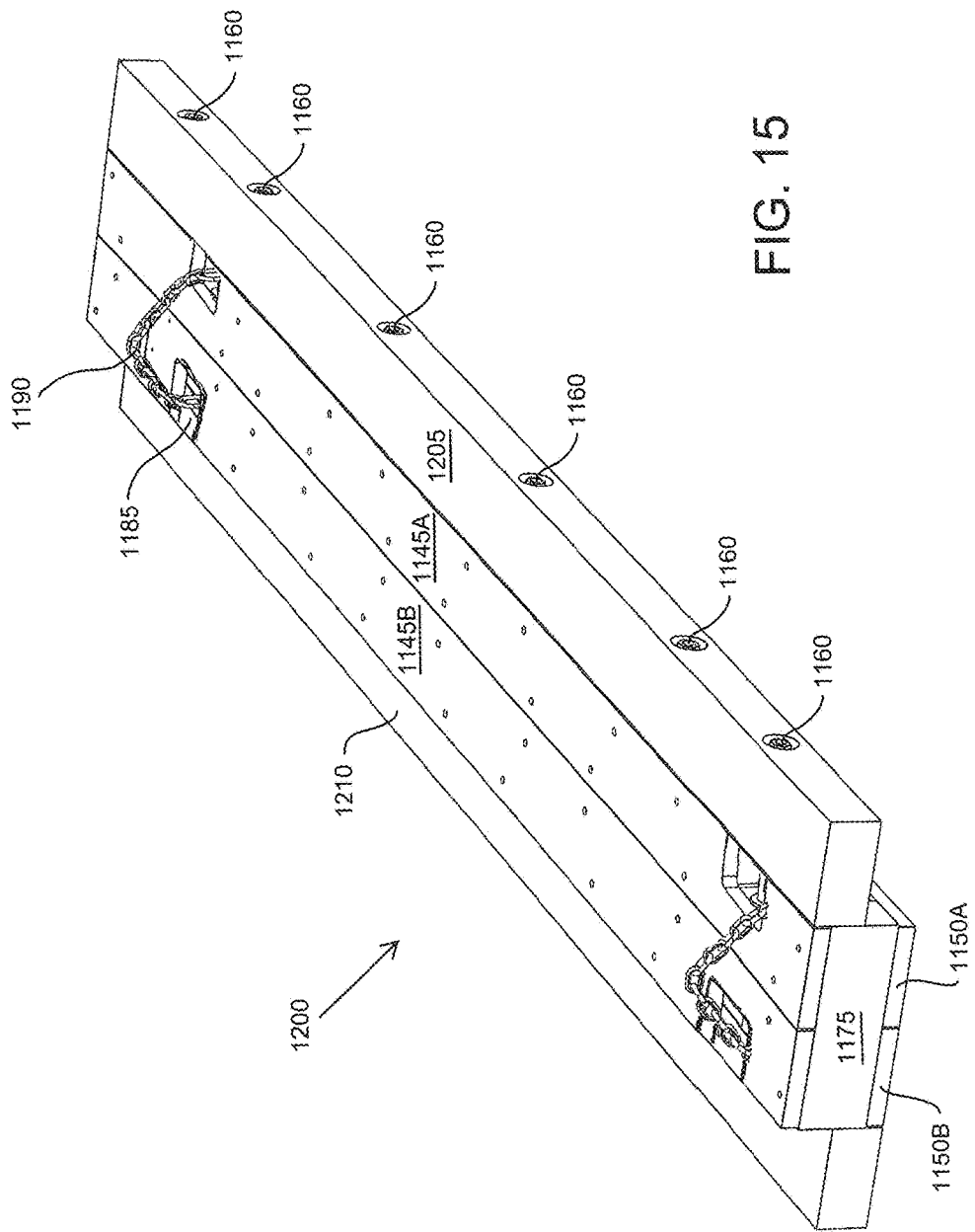
FIG. 15 is a perspective view of a second embodiment of a mat according to the present invention.
Figure 16:
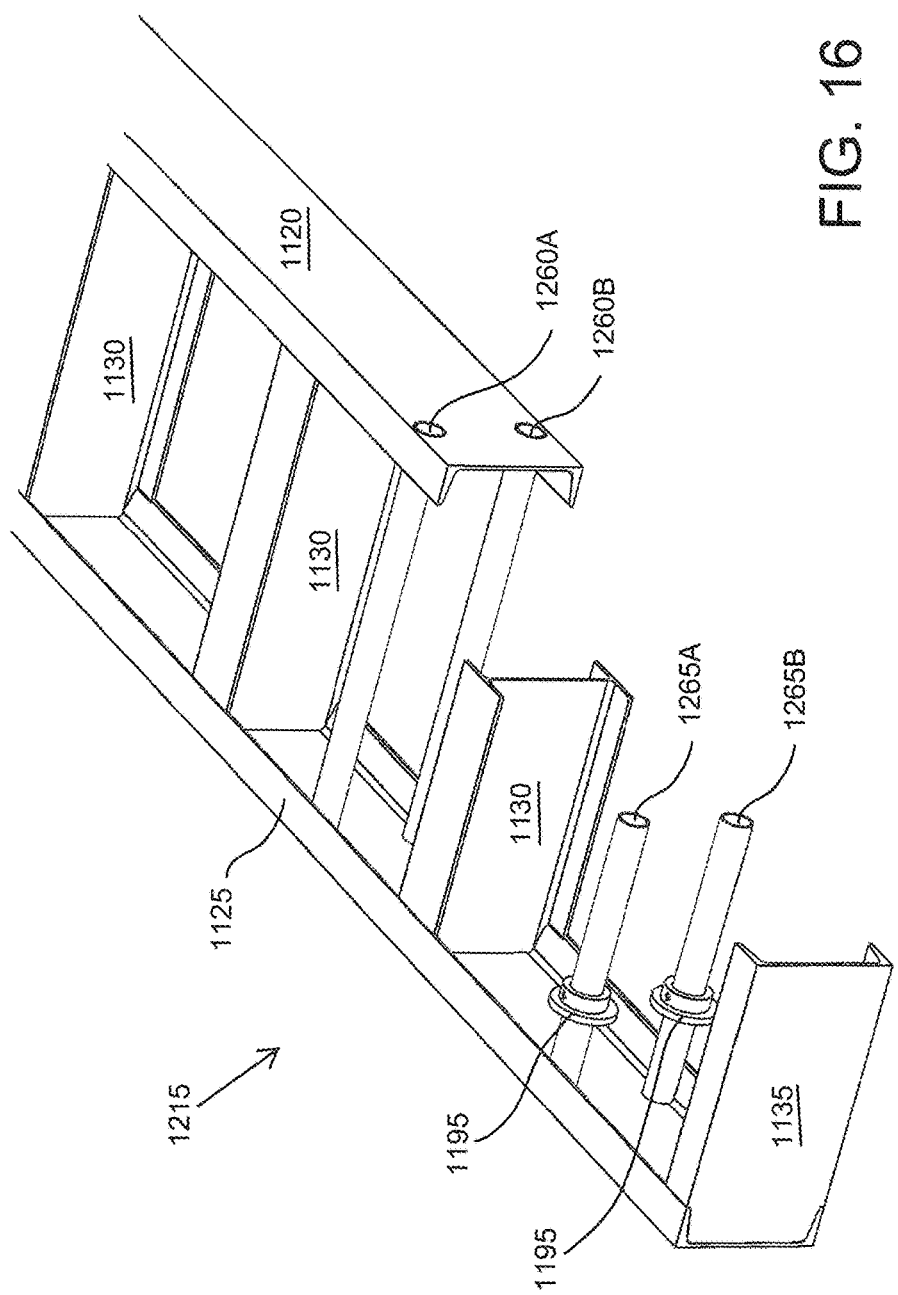
FIG. 16 is a partial sectional view of the support structure for the mat of FIG. 15.

Turning now to FIGS. 15 and 16, an alternative embodiment of the present invention is illustrated, in the form of a mat having side beams configured and dimensioned to allow interlocking of adjacent mats. Where like components are used from the previous embodiment, the same reference numerals will be used in FIGS. 15 and 16 and only the different features of this alternative embodiment will be described.

Mat 1200 includes side beams 1205, 1210 which are configured and dimensioned to represent only one half of the thickness of the mat. On one side of the mat, beam 1205 is attached to the upper portion of the support core 1215. This is done in a manner to extend the upper surface of beam 1205 above the top surface of the support structure 1215. As in the prior embodiment, elongated members 1145A, 1145B can be provided on the top portion of the support structure 1215 so that the top surface of the mat adjacent the side beam 1205 is relatively flat. In a similar manner, side beam 1210, which also has a thickness that is one half the thickness of the entire mat, is mounted to a lower end of the support structure 1215. The lower surface of side beam 1210 extends below the lower surface of the support structure to allow elongated members 1150A, 1150B to be accommodated to form a substantially flat surface for the bottom of the mat adjacent beam 1210.

This structure allows one mat to be initially placed on the ground with an adjacent mat placed such that beam 1205 sits upon beam 1210. This arrangement can be continued for as many mats as necessary to achieve a desired working base for cranes or other equipment.

The top surface of mat 1200 has a step on the opposite side from beam 1205, above beam 1210, while there remains an open space or step below beam 1205 adjacent the lower surface of the matt opposite beam 1210. While these surfaces allow interlocking of adjacent mats, it does not provide a stable mat surface on the outermost sides of the working base. To compensate for this, modified mats can be provided wherein the outermost end mats on one side of the working base can be made with beam 1105, which is the full thickness of the mat, on one aside and with beam 1210 on the opposite side to allow interlocking with adjacent mats that are configured like mat 1200. Similarly, the outermost end mats on the opposite side of the working base can be made with beams 1110 instead of 1210 on one side beam 1205 on the opposite side.

Alternatively, when the full extent of the entire working base is not known, of if an insufficient number of modified mats are not available, the mats on the outermost sides of the final working base can be provided with stabilizing beams of the same size and dimensions as beam 1205 provided in the space below attached beam 1205 so that the side of the mat can be stabilized. The same thing can be done for the outermost mats that have a step above beam 1210. A separate stabilizing member can be provided of the same size as beam 1210 to finish the upper surface of the mat at those locations. The stabilizing members can be attached to the beams of the mat if desired.

Mat 1200 requires a different system for connecting the beams 1205, 1210 to the support structure 1215. The connection of beam 1205 to the support structure 1215 will require that the joining rods 1260A pass through an upper portion of the support structure, whereas beam 1210 is connected to the support structure with joining rods 1260B passing through the beam and a lower portion of the support structure 1215. This is best shown in FIG. 16 where the relative positions of the joining rods 1260A, 1260B are illustrated, along with sleeves 1265A, 1265B.

FIGS. 15 and 16 illustrate a lifting element in the form of a lifting chain 1190 for a stepped mat 1200 which is used to provide an interlocking configuration with adjacent mats. The connection of chain 1190 to the joining rod is the same as shown in FIGS. 12-14, with the exception that the joining member 1160A on the top portion of the mat would be used when the chain or hook is accessing the mat from the top surface, while joining member 1160B would be used when the chain or hook is accessing the mat from the for the bottom surface. As in the other figures, the joining rod would include a flange or ring element 1195 to assist in positioning the terminal chain links in the proper location on the joining rod for lifting of the mats.

Figure 17:
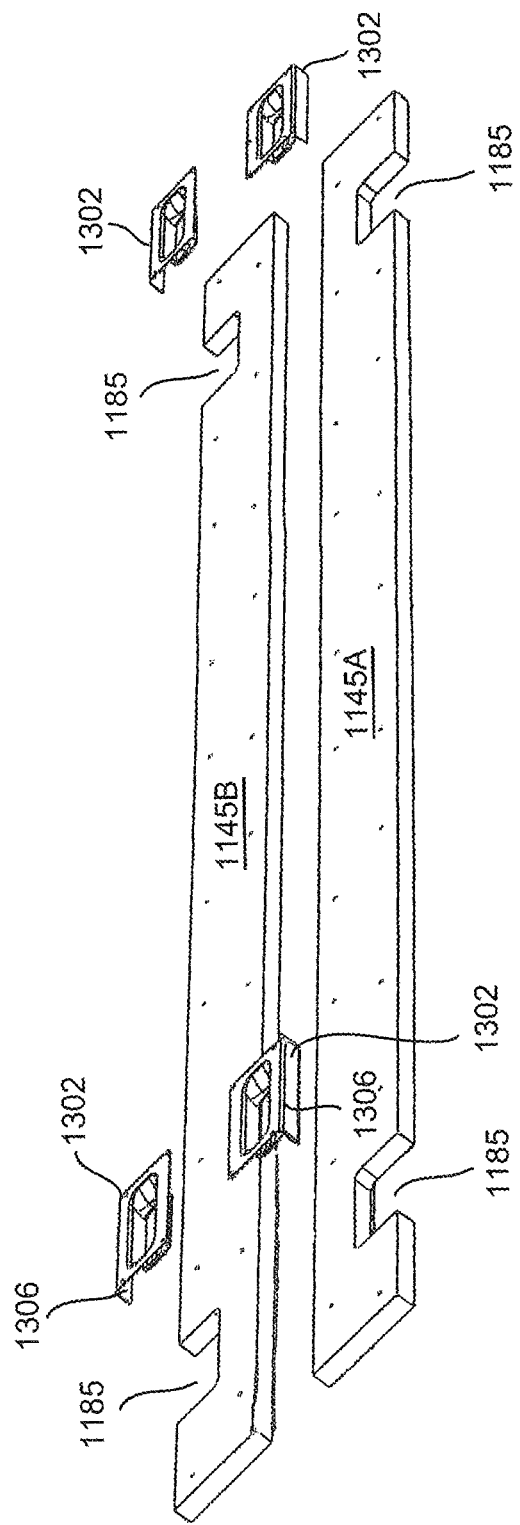
FIG. 17 is an exploded view of the collar members for the openings in the elongated members.
Figure 18:
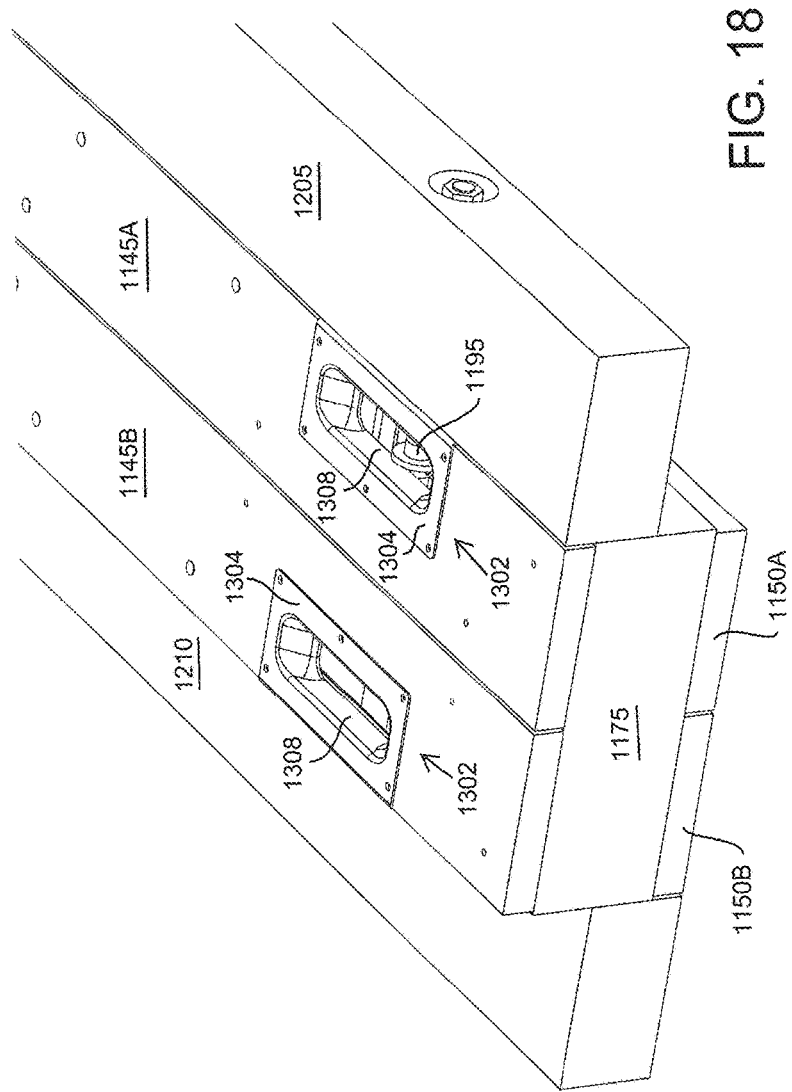
FIG. 18 is a perspective view of the collar members in place on a mat.

FIGS. 17 and 18 illustrate a metal collar 1302 that can be used to protect opening 1185. As shown, the collar 1302 has a flat upper plate 1304 that protects the surface of elongated members 1145A and 1145B adjacent opening 1185. Collar 1302 also includes a side plate 1306 which closes the side of opening 1185 and also protects the inner cut edges of opening 1185 in elongated members 1145A and 1145B. The metal collar is preferably rectangular, and has top or upper plates and side plates. The collar 1302 is placed in a cut-out opening in an elongated member, and is secured to that member by appropriate fastening elements such as screws or nails as shown in FIG. 18. This allows the collar 1302 to be removed and replaced if it is damaged as well as to allow an undamaged collar 1302 to be removed and reinstalled on a new elongated member that replaces a removed damaged elongated member. The upper or top plate 1304 of the collar 1302 extends onto the surface of the beam or beams surrounding the opening protects that surface. In addition, the inner cut edges of opening 1185 are protected by an inwardly extending wall 1308 which is bent from the top plate 1304 of collar 1302. This wall 1308 protects against contact and abrasion from the chain when lifting the mat. The collar member is positioned in the elongated member above a joining rod such as 1160 in order to provide access to that rod for a lifting element such as a chain or cable. The side plates of the collar member preferably extend into the opening but not to the depth where the lateral rod passes through the opening. The collar member may also be designed to be in contact with the lifting member (1332 or 1328) to add stability to the assembly when the mat is being hoisted or moved. In addition to being used with a chain that can be attached to a joining rod of the mat through the two openings, the collar also facilitates attachment of a hook or other elongated member from a crane or other heavy equipment vehicle to engage joining rod 1160 for lifting or installation of the mat.

Figure 19:
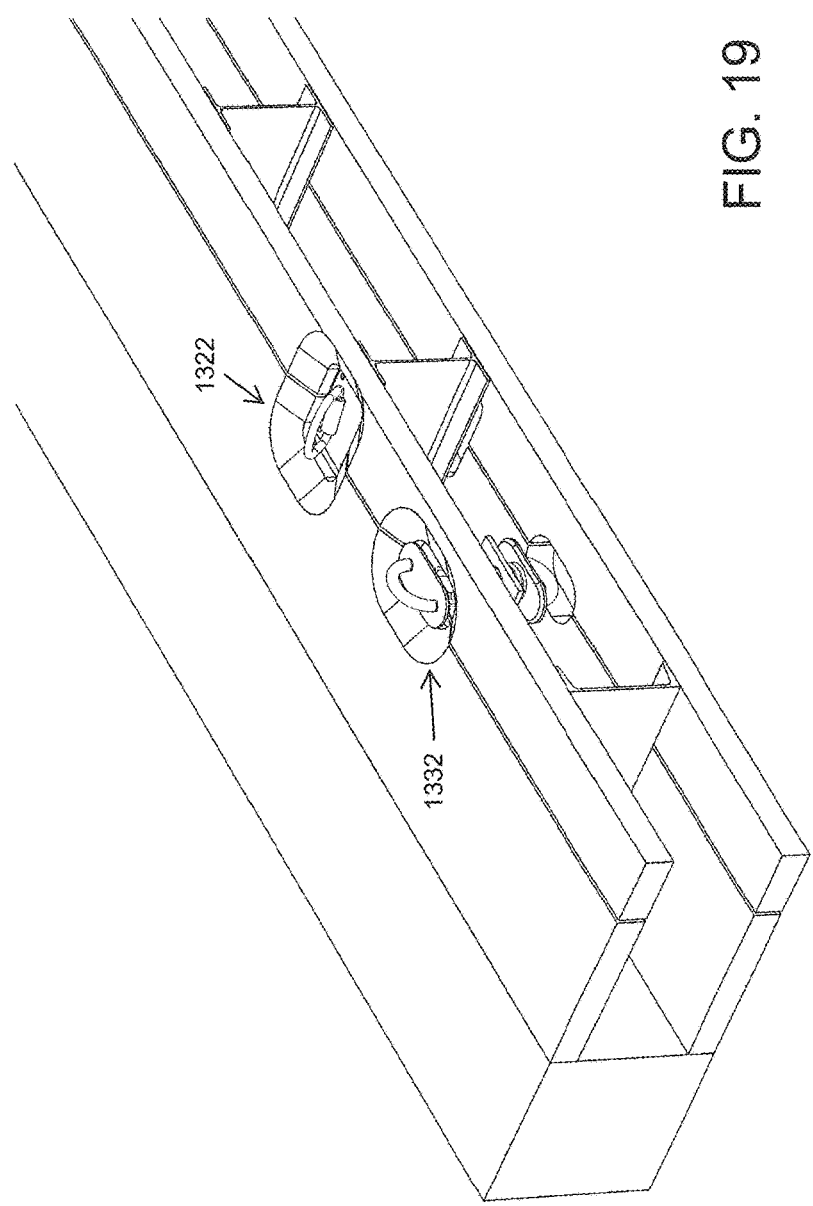
FIG. 19 is a perspective view of two alternative lifting members.
Figure 20:
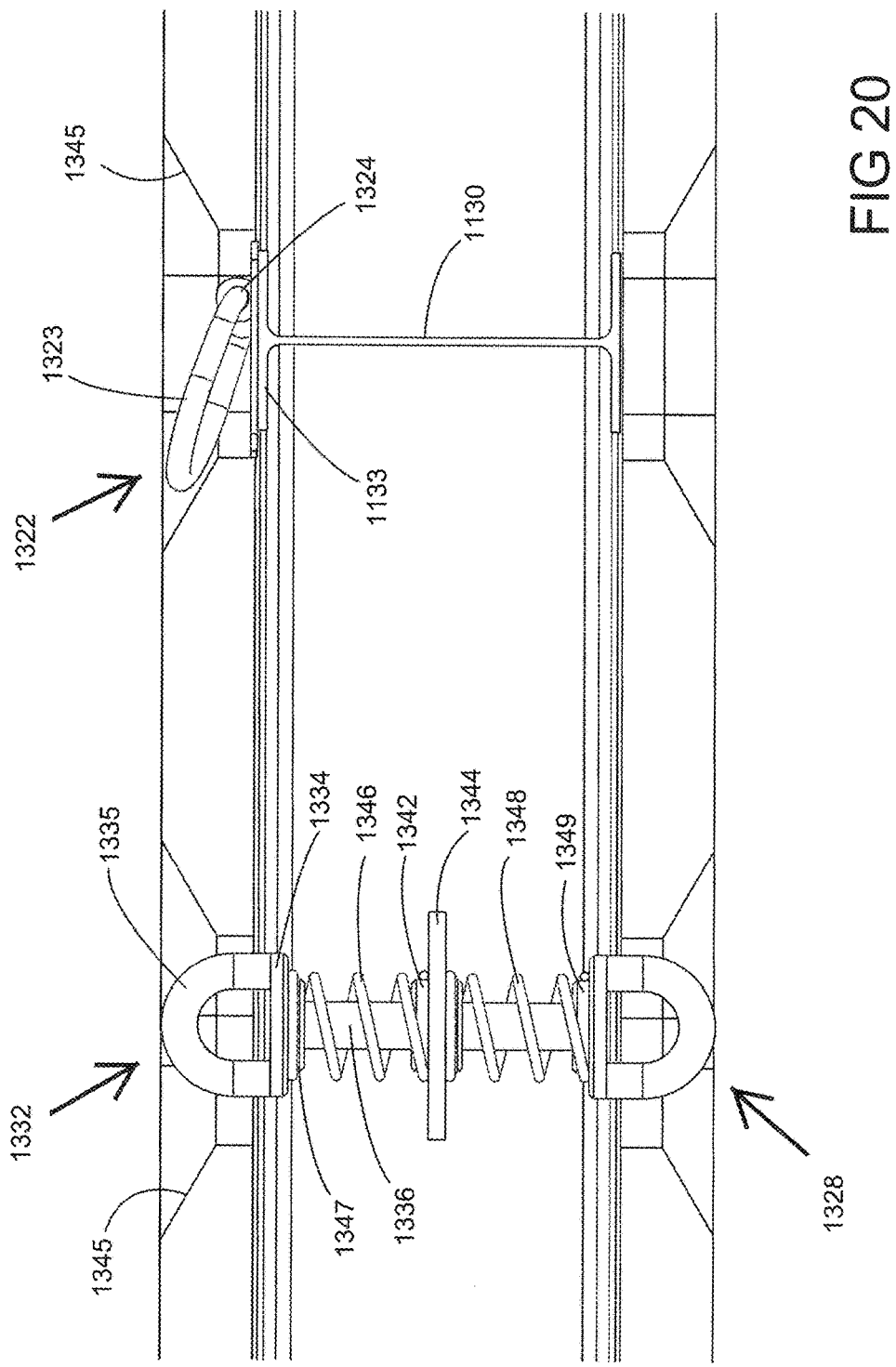
FIG. 20 is a side cross-sectional view of the lifting elements of FIG. 19 in their normal, non-use position.
Figure 21:
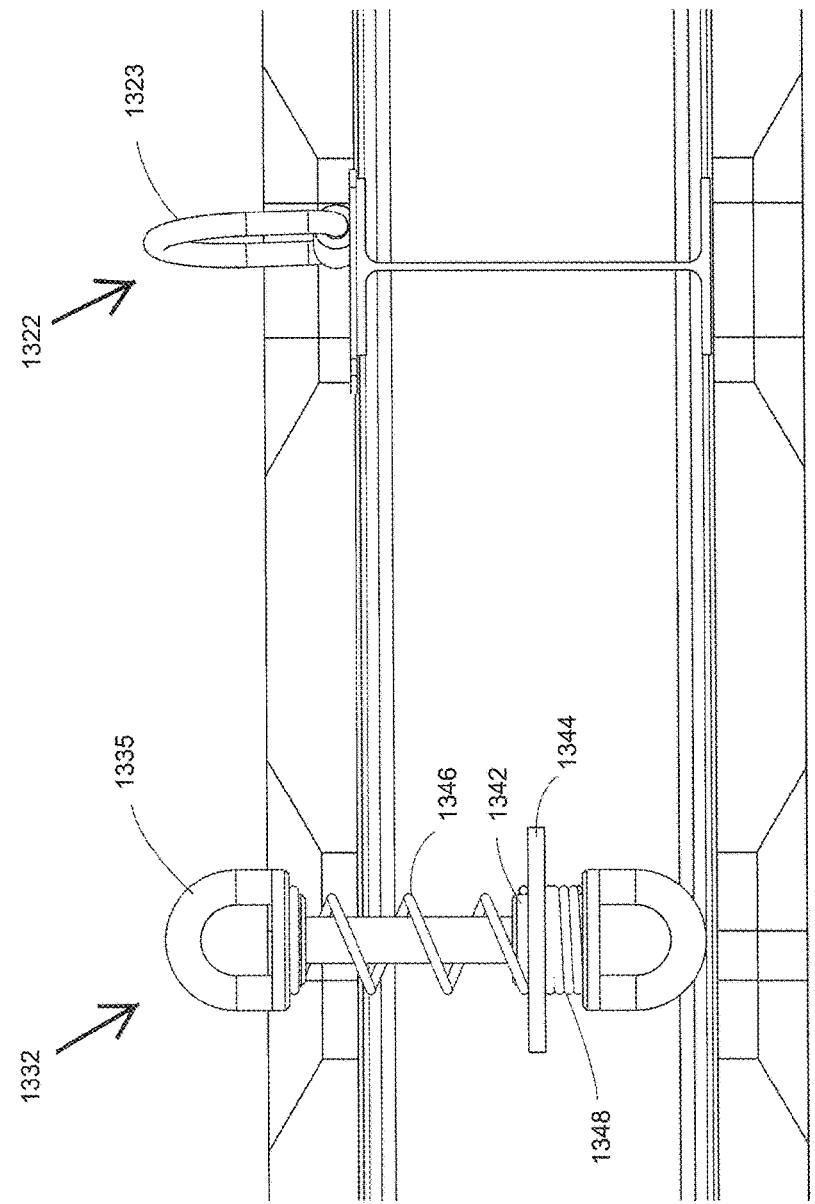
FIG. 21 is a side cross-sectional view of the lifting elements of FIG. 19 in their operative position during lifting of the mat.

FIGS. 19 to 21 illustrate additional lifting elements for the mats of the invention. These are shown schematically in FIG. 19 side by side although in practice these elements would most likely be used separately or at least in different areas on the mat.

One preferred element is a D Clip 1322, having a D-shaped ring 1323 the ends of which engage a metal tube 1324 that is welded to the top plate 1133 of one of the crossing members 1130. This structure allows the clip 1322 to be rotated to the position where it is perpendicular to the crossing member top plate 1133 so that it can be engaged by a hook of a crane or other heavy equipment vehicle. After the mat has been placed for service, and the hook removed, the clip 1322 can rotate so that it lays flat against the angled side wall 1345 of the opening in the elongated member, as shown in FIG. 20. This opening does not have to be deep and simply allows the clip 1322 to be pivoted through an angle of between 90 and 180° to facilitate access to and movement of the clip as the mat is being lifted. As in the other designs, the D clip can be provided in multiple locations on the mat, such as near the forward and/or rear ends or both on either or both of the upper and lower surfaces of the mat so that the mat can be lifted no matter how it is located on a transporting truck or train or after being installed. If desired, depending upon the width of the mat, a plurality of these lifting elements can be provided. They generally are provided about 10 to 24 inches away from the front or back end of the mat and preferably on the top and bottom surfaces. Typically, one or two clips near each end of the mat are all that would be necessary for manipulation of the sizes of the mats of the present invention, but a skilled artisan can determine whether more or less lifting elements are needed for any particular mat size and design.

And for certain mats, it is possible to use a ring instead of a D clip. The ring would be made of a metal, preferably steel, bar of cylindrical or rectangular cross-section that is configured in the shape of a ring with the ends of the bar welded together. The ring configuration can made oblong, oval, elliptical or circular. These non-linear shapes are preferred as they are easy to manipulate with respect to removing a portion of the ring from the slot for use when the mat is to be moved, as well as to allow the ring to fall back into the slot into the storage position after the mat is installed and in use. A shape other than circular is preferred, however, as it will more easily fit within the vertical recess. The shape of the ring would be selected based on the thickness and overall weight of the mat. This will also be used to determine a suitable thickness for the plate embodiment or for the diameter or circumference of the cylindrical or rectangular rod that is shaped as a ring.

FIGS. 19 to 21 also illustrate an alternative embodiment of a U-shaped member 1332 that is attached to the support structure in a way that the U-shaped ring 1335 does not protrude above the elongated members on either the top or bottom surfaces of the mat. The hook 1332 is welded to a plate 1334 that is mounted on a rod 1336 that passes through the support structure. While only one U-shaped member is often suitable for lifting the mat from one side, it is advantageous to provide the opposite end of the rod with a second U-shaped member 1328 of the same configuration protruding from the lower surface of the mat as this allows the mat to be lifted from either the top or bottom surface. In a normal or non-operative state, as shown in FIG. 20, each U-shaped member sits in an opening in the elongated member that has angled sides 1345 with its upper member approximately uniform with the top surface or bottom surface of the elongated members of the mat. The angled holes 1345 are essentially the same regardless of whether clip 1322 or U-shaped member 1332 are used and allow greater access to the lifting member.

Rod 1336 is mounted for reciprocal motion through a bushing 1342 that is located in a plate 1344 that is welded to a central portion of the support structure, typically to one of the cross members. Rod 1336 is also capable of rotating in bushing 1342 as well as in the bushings that re provided in the upper and lower portions of the support structure so that U-shaped portions 1322, 1328 can rotate 360 degrees to facilitate attachment of a crane hook or manipulation of the mat during lifting or movement. Plate 1344 is preferably attached to cross members or side beams of the support structure. Additional bushings 1347, 1349 are provided in the upper and lower plates of the cross members or side members of the support core. The U-shaped portions 1322, 1328 are each maintained in a static position by springs 1346, 1348. When the mat is to be lifted, the ring 1335 is engaged with another hook from a crane or heavy equipment vehicle and as it lifts the mat, spring 1348 is compressed with ring 1335 being pulled partially out of the angled hole. This arrangement allows the hook on either U-shaped member on either side of the mat to be accessed and pulled for lifting the mat. After the lifting operation or placement operation is complete, and the hook is removed, the U-shaped member would return back to its normal unhooked position.

As above with the D-shaped lifting element, each U-shaped member is provided in an opening 1345 which is beveled or otherwise angled or widened to allow access to the U-shaped member by the crane hook.

For certain mats, the U-shaped member can be simply welded to a plate on the top of the of one of the cross members, but in this embodiment the U-shaped member must extend sufficiently above the top surface or bottom surface of the mat to allow access by a crane hook. For this reason the spring mounted lifting elements are preferred.

A number of additional features may be provided in the mats of the present invention.

Figure 22:
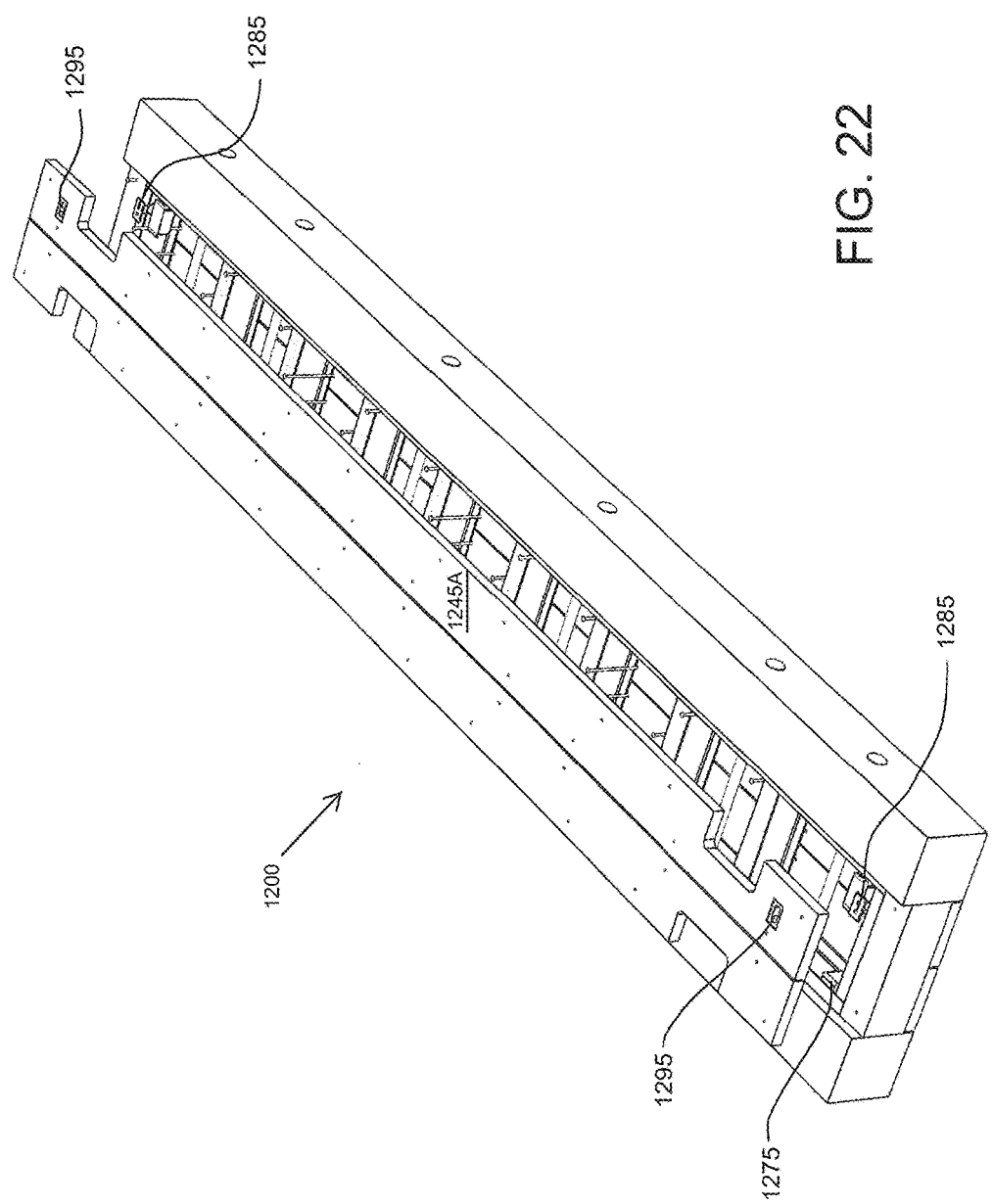
FIG. 22 is a view of certain peripheral components for the mats of the invention.

FIG. 22 illustrates a further variation of the invention, wherein mat 1200 includes a radio frequency identification (RFID) tag 1275 which is located in the core. Alternatively, this RFID tag 1275 can be embedded in an outer layer in an opening or a routered pocket is essentially any of the mats disclosed herein to enable the mat to be monitored in an inventory system or when rented for use. The tag provides a unique identification serial number for each mat, such that the mats which are being used or rented can be tracked and accounted for as to location of use. The mats can be scanned when in a warehouse, when loaded on trucks for delivery, when delivered to a job site, or when collected from a jobsite after use. The RFID tags can be active or passive and if desired, other tracking devices such as barcodes could similarly be for the same purposes. It is preferred, however, that the RFID tag be embedded in the outer layers or core of the mat so that it is protected from damage during use. When a barcode or other surface mounted tag or indicia is used, it should be placed on a surface portion of the mat that is less likely to experience wear or abuse. Thus, the tag may preferably be applied onto the side of the mat so that it is not directed exposed to traffic on the mat. It also may be covered with a plexiglass film to prevent its removal by abrasion.

To assist in the use of the mat during the night or on days that are dark due to poor weather conditions, the mat may include one or more lighting elements, such as those disclosed in International application WO 2006/048654. These lighting elements would preferably be embedded in the outer layer. FIG. 17 illustrates the locating of LED lights 1285 in the support structure beneath elongated member 1245A. The lighting is covered with a clear material 1295 of plexiglass, so that the lighting element may be better protected against damage during use. To achieve the desired lighting brightness, the skilled artisan can provide the necessary number of lighting elements, or can include lighting elements of larger size.

Yet another embodiment of the invention relates to an encapsulated mat that includes an outer environmentally resistant plastic or elastomeric layer to protect the core components from impact and environmental conditions which cause deterioration during use of the mats. The encapsulation can be a skin that is applied to the mat in upper and lower sections, or the entire mat can be immersed or coated with the appropriate plastic or elastomeric materials. These mats possess unexpected benefits over the art in that the outer layer(s) can provide resistance to abrasion and abuse of the construction core while the core is resistant to moisture, water or even certain chemicals encountered from the surrounding environment. This enables the core to provide a much longer service life than when conventional wood components are used since the core is resistant to rotting or other chemical degradation that would otherwise affect wood components of the core. Finally, to the extent that any of the components of the upper or lower outer layers are damaged, they can be replaced so that a new mat can be made with the reuse of all of the support structure.

The invention thus provides an improved mat that possesses structural integrity based on the properties and configuration of the core construction as well as abuse and abrasion resistance provided by the encapsulating skin. The skin, also referred to as the encapsulation or encasement, typically includes two pieces, an upper portion and a lower portion, each generally representing half of the encapsulation. The encapsulation will be formed to allow the core construction to be completely accommodated therein, with half of the core being fit within the upper portion and half fit in the lower portion. The tolerance variation for the core construction is +$\frac{1}{8}$" and preferably +$\frac{1}{16}$" for all dimensions so that it will easily be received within the encapsulation. Once the core is placed inside the encapsulation, the top and bottom portions will be sealed or joined together to completely enclose the core therein.

The encapsulation material is most preferably a high density polyethylene made by a manufacturing process known as sheetless thermoforming technology (STF). The resulting mat is most preferably an engineered wood product mat encapsulated in a sealed thermoplastic encasement. The primary advantage of this product is preservation of the wood structure contained inside as it is sealed off from the elements prior to experiencing environmental conditions during use at a jobsite.

The encapsulation is preferably a skin made of an environmentally resistant material to protect the core construction from degradation due to weather conditions, typically moisture or water from rain or snow, as well as contact with oil, gas or other chemicals. If the mats are to be used in a particular chemical environment, the skin materials can be selected for resistance against that environment. Generally, however, the skin material is one that can provide water and moisture resistance for the materials that are used for the core construction. Also, the skin material shall be chemically resistant to typical liquids found in the construction site. Thus, the mat will not absorb water or other liquid contaminates so that after cleaning or washing, the mat can be removed from the work site without transporting the liquid contaminates.

A wide range of polymeric materials can be used for the skin or encapsulation of the invention. These materials include any of the elastomeric, thermoplastic or thermosetting plastic materials described herein.

The preferred materials are those that are moldable to form the upper and lower portions of the skin, as well as those that can be welded or otherwise capable of being adhered, sealed or merged together so that the core construction can be fully encapsulated and sealed from water penetration or other environmental conditions.

The skin is molded into upper and lower portions, which are preferably identical. These portions are configured to be placed upon the upper and lower layers of the core construction. To facilitate placement of the upper and lower portions on the core construction, the components used for constructing the core are made of engineered lumber or processed white oak in order to provide close tolerances of around +$\frac{1}{8}$th of an inch or less and typically around $\frac{1}{16}$th of an inch. This assures that the upper and lower portions of the skin will fit properly and snugly on the core construction with the peripheries of the upper and lower portions in contact so that they can be joined together by welding, adhesives, additional molding material or other techniques that join and seal the portions together. In general, these processes unite softened surfaces of the materials, generally with the aid of heat or a solvent, after appropriate surface preparation. When heat is used it can be applied externally and internally. These joining and sealing methods assure the complete encapsulation of the construction core in order to prevent egress of water, moisture, chemicals or other solutions that will over time cause degradation of the wood or other materials used for the core.

Alternatively, the skin can be provided in other ways, including but not limited to immersion coating of the entire core construction or by painting, coating or otherwise depositing skin material to completely encapsulate the core construction. The skin material is typically a thermoplastic polymer, a thermosetting resin or an elastomeric material. For example, the entire core construction can be coated with a thermosetting resin to form a solid unitary mat structure.

Certain of these encapsulating techniques provide a single encapsulation that forms a unitary structure. In use, however, it is envisioned that the skins will eventually experience damage due to handling, installation and use in supporting heavy equipment or vehicles. In some cases it will be possible to patch or otherwise repair the damaged areas while still retaining a sealed structure that will resist moisture penetration. In some cases, however, it will be necessary to completely remove the damaged skins such that a knife or hot wire can be used to cut through the encapsulation for complete removal and replacement when necessary to remediate damaged skin material. To facilitate such an operation, the preferred construction utilized symmetrical top and bottom skins that joined together at peripheral flanges that surround the core of the mat. This facilitates removal of the skins by cutting through or otherwise removing the joined flanges. Thereafter, if the core construction is intact, new upper and/or lower skins can be provided and the mat can be returned to service. In another embodiment, the flanges can be joined by an adhesive that is not as strong as the strength of the flange material. This would allow the flanges to be separated from each other in the event that one or both of the skin portions need to be replaced.

As mats are generally designed with water channels on the upper and lower surfaces or layers to drain water from the mat, the skins must also be configured with the same design to achieve that purpose. Accordingly, the surface of the upper and lower skins are not flat but instead are configured to match the surface provided by the core construction. Alternatively, the core construction can be configured with a flat upper surface, and the upper and lower portions of the skin can be provided with water channels or other non-flat surfaces to facilitate water drainage. In fact, the upper portion of the skin can be configured to provide molded material in place of the upper layer of elongated members of the core construction. The same can be done for the lower layer. Often only the upper later is provided with such channels but when the mater are provided with an interlocking structure, it is typical to provide both the top and bottom surfaces with this feature. Of course, the skilled artisan can determine for any particular application how to configure the upper and lower surfaces of the mat which in some cases could certainly be flat if desired.

The core construction housed within the encapsulation comprises two or three layers: a central layer for strength and rigidity; and a layer of elongated members positioned above or below the central layer. Preferably, three layers are present. Suitable materials for the components of the upper, center and/or lower layers of the core construction include any of the materials mentioned in this application. Wood, preferably engineered wood, is the most preferred due to the balance of a cost and desirable properties. Engineered wood is a material that is constructed of multiple smaller boards rather than one solid board and is beneficial for maintaining reproducible control of dimensions such as when manufacturing a large number of mats. Single sold boards are subject to some warping and dimensional changes during preparation such that additional fine tuning is needed to achieve the tight tolerances described herein.

In addition to wood, the core may be made of metal, thermoplastic and thermosetting materials, elastomers or combinations thereof as described herein.

The core can be made of a frame, including a shell or ladder structure, of steel, wood or fiberglass reinforced plastic with the open portions of the frame filled with an additional material that provides greater crush resistance to the shell while also contributing to the weight of the mat. The filler materials may be loose particles or solid structures as desired and can be added to increase the weight of the mat or as a lesser weight material compared to the weight of the frame.

The core components can be separate components or can be a single component. When made of a single component, in particular of a molded or vacuum formed plastic or elastomer, that has a thickness of up to 0.6" or greater. As noted herein, the core can be made of upper and lower sections that are joined together. Also, the core can be made of sections or smaller portions that are joined together to form the overall desired size of the core. As an example, for a thermoplastic core of HDPE, multiple sections may be welded together to provide the desired size, e.g., four HDPE 4'×8' sections can form the core of a mat that is 8'×16'. Similarly, eight 4'×4' sections can be joined by welding or by a side interlocking structure that is adhered together with an adhesive to form the same 8'×16' mat. The same is true of wood, metal or elastomeric components, which can be joined mechanically, by adhesives or where applicable by welding. The core can also be made of upper and lower half sections that can be joined together by welding, a mechanical interlocking structure, by fasteners or by adhesives. Open areas can be provided within the core for filler if desired.

For certain open cell core construction materials, reinforcement with wood, metal or plastic, the cells can be filled with other materials to provide the desired weight to the mat. Also, reinforcements of fabrics, sheets or other cell closing materials can be used to improve stiffness and strength of the layer and if necessary to retain the filler in the cells or openings in the construction core material.

It is also possible to use a metal plate or open metal structure as the center layer, either alone or with upper and/or lower sheeting or even as a reinforcement of a thermoplastic, thermosetting or elastomeric pad. Thus, the central layer can include multiple components that are assembled together to form the structure to which the upper and lower elongated members or boards are attached.

When metal central layers are used, the metal structures may include metal lath or metal sheet or structures that include cells or openings therein to reduce the overall weight of the mat. Steel, aluminum or stainless steel are typical metals for this use. To reduce the weight of the mat when the construction core it is made of metal, a honeycomb or lath structure is used, or the construction core is provided with a plurality of openings. For very open structures, the cells or openings can be filled as noted above with a material that is lighter than the metal to maintain the weight at a desired level. The openings can be covered with upper and/or lower sheeting to retain the filler therein. Any material can be used for the sheeting as the metal core is providing the necessary strength and rigidity to the mat. Typically, the sheeting may be plywood, plastic, metal or composite material, and can be solid or in mesh form. The sheeting can be attached to the mat by bolting or by an adhesive. The sheeting and core can be maintained in position be being sandwiched between the outer layers, with the entire structure held together by bolting. If necessary, holes for the bolts can be drilled through the metal plate or sheeting to facilitate assembly by allowing passage of the bolts therethrough.

Preferably, the upper, central and lower layers are nailed and/or bolted together to form the core construction. For a core construction where the interlocking boards (boards 3, 6 and 9 of the single width construction and the three 6" boards of the double width construction) are not included, these may be provided on top of the skin. They can be bolted or nailed onto the core construction through the skin, but with appropriate sealing of the skin with additional material to prevent water or chemical penetration into the core construction. This arrangement provides two additional benefits. First of all, the boards placed outside of the skin are easily replaceable if damaged while the protected core remains intact. Also, this arrangement facilitates the placement of lifting elements included in boards 3 and 9 of the single width construction or in the first and third 6" boards of the double width construction.

The most preferred construction includes three layers of engineered lumber as this provides the best combination of cost and strength. Such constructions have been used in the past without encapsulation so that the industry is very familiar with their use and the benefits that they provide. Engineered lumber, also known as composite wood, man-made wood, or manufactured board, includes a range of derivative wood products which are manufactured by binding or fixing strands, particles, fibers, or veneers or boards of wood, together with adhesives, or other methods of fixation to form the composite material known as engineered lumber. As noted above, these products are engineered to precise design specifications and tolerances which are much more controlled than ordinary wood products and meet various national or international standards. Typically, engineered wood products are made from the same hardwoods and softwoods used to manufacture lumber.

A particular preferred type of engineered lumber is laminated strand lumber (LSL). The thickness of the lumber beams will be approximately 1.75 inches but may be between 1.5 and 3 inches. Length can be as desired but will preferably be 12, 14 or 16 feet. The width of the LSL boards will vary depending upon location within the three layer mat. That is, width of the top and bottom layer boards will be approximately 8 inches (single width) or 16 inches (double width). Approximately means they may be slightly less such as 7.5 to 8.5 inches or 15 to 17 inches. Of course, as the LSL is manufactured, any particular thickness, width and length can be selected, but the preferred dimensions disclosed herein approximate those of conventional white oak mats which are in extensive use in the industry. A typical thickness for the mat is approximately 6", with the central layer providing a thickness of about 1" to 4" and the upper and lower layers providing a thickness of about 1" to 3". Of course, the dimensions can vary depending upon the specific end use intended for the mat.

The center layer for this embodiment will be approximately 8 feet by 12, 14 or 16 feet. The center layer may be made of LSL or other boards that are oriented perpendicularly to the boards of the top and bottom layers. The number of top, bottom, and center boards will be dictated by the final dimensions of the mat for the particular application or end use. When the center layer is a sheet or plate, the boards of the upper and lower layers can be oriented in the same or a different direction. Generally, for manufacturing simplicity, the boards of these layers are oriented to be parallel or perpendicular to each other. Other more complex angled board arrangements may also be used without departing from the teachings of this invention.

In a most preferred embodiment for the wood board construction, the mat includes a core construction comprising a central layer, an upper layer positioned above the central layer and a lower layer positioned below the central layer, wherein each layer includes a plurality of elongated members each having a modulus of 1.6 MM+20% and with the elongated members of the upper and lower layers oriented parallel or perpendicular to each other. Also, the core construction is made of materials that provide a load bearing capacity that is able to withstand a load of at least 600 to 800 psi to as high as 1000 psi without damaging or permanently deforming the core construction.

The core construction can include one, two or three layers as desired or necessary for a particular installation. The most preferred construction includes three layers as noted herein.

When elongated members are used for the upper and/or lower layers of the core construction, they provide additional weight to the mat and can be configured in different ways:
  a single width construction may be used where eleven 6" wide (by 12' 14' or 16' long) boards are provided in the upper and lower layers with three boards (Nos. 3, 6, and 9) in the lower layer offset for interlocking; or
  a double width construction may be used where four 12" wide (by 12 or 16' long) boards are provided in the upper and lower layers: each one separated by a 6" board with the three 6" boards in the lower layer offset to provide interlocking.

The boards can be made of wood or engineered lumber (preferably with a tolerance of +1/16") or they can be made of tubes of metal of a thermoplastic or thermosetting material, with pultruded thermosetting tube being one example of a preferred alternative material.

The core constructions may include those made of white oak as disclosed in U.S. Pat. No. 4,462,712 (three layer) and U.S. Pat. No. 5,822,944 (two layer), the entire content of each of which is expressly incorporated herein by reference thereto. Additional processing of the wood will ordinary be required to achieve the desired tolerances for optimum fitting of the construction core in the encapsulation pieces.

The wood mats typically include three (3) layers of individual wood or engineered wood boards having cross section dimensions of 1.75" by 8". The spacing between individual boards or components in the upper layer is preferably approximately 1.25" to allow water to drain from the mat. This spacing is retained in the encapsulation. The slip resistance of the mat is improved by the draining of the excess water, especially when use in locations that experience heavy rain or snow conditions.

Figure 23:
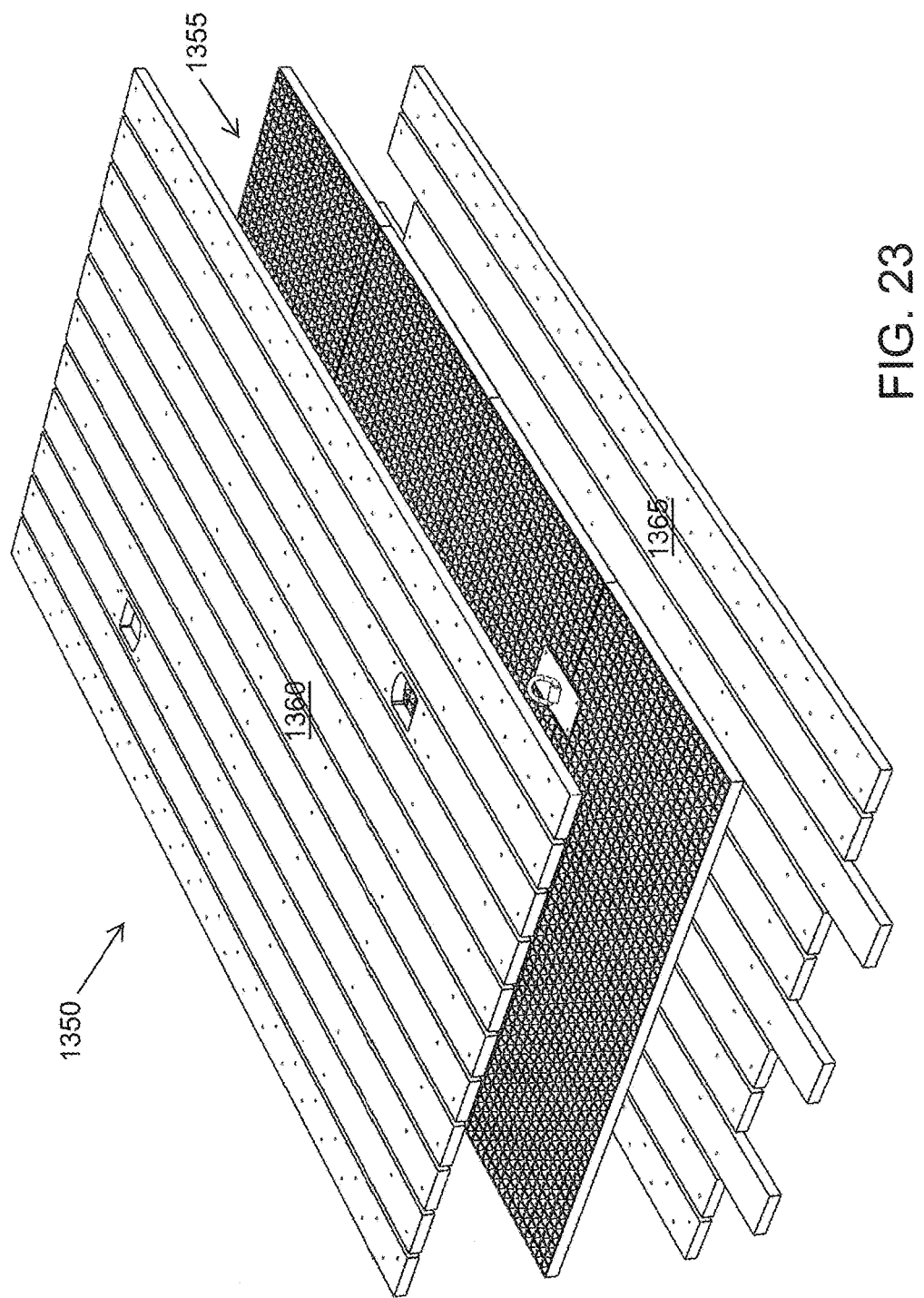
FIG. 23 is an exploded view of an interlocking mat having a grating of a fiberglass reinforced thermosetting material.
Figure 24:
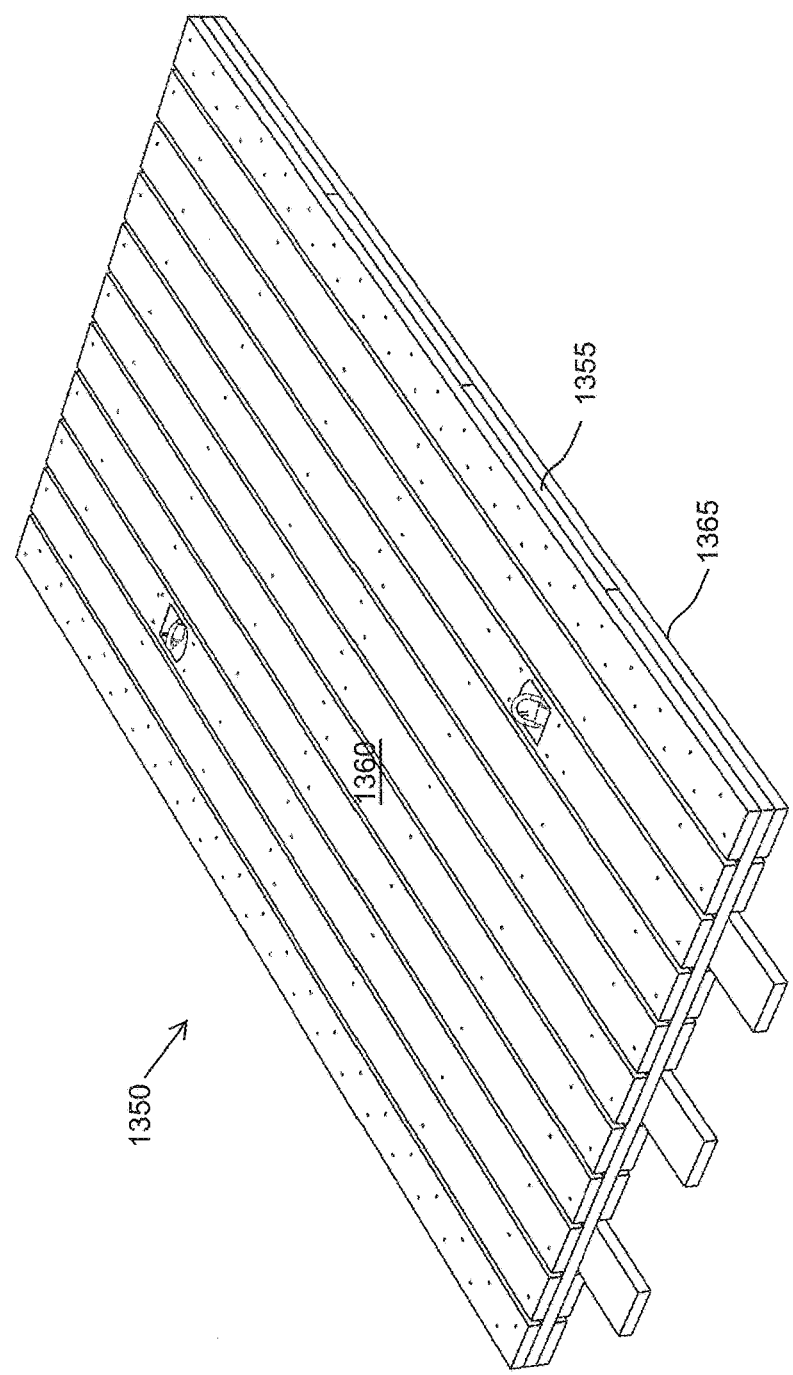
FIG. 24 illustrates the assembled mat of FIG. 23.

FIGS. 23 to 24 illustrate a preferred embodiment of the invention wherein the environmentally resistant core of the mat 1350 is a fiberglass reinforced polyester or epoxy grating 1355 having a thickness of 3 inches and with grating openings of 2×2 inches. The same upper 1360 and lower 1365 wood structures of FIGS. 20-21 can also be used for this mat, with all of the components bolted together. As noted herein, the grating can have a greater or lesser thickness ranging from about 2.5 to 4 inches in thickness with openings of between 1.5×1.5 inches and 3×3 inches. Of course, it is also possible to utilize a solid fiberglass reinforced thermosetting resin sheet of the thicknesses mentioned herein either by itself or with apertures or openings cut therein. As shown, the bolting would pass through the entire construction in order to provide the greatest strength and are placed in recessed holes so that the bolts and nuts do not extend past the upper and lower surfaces of the mat.

For alternative embodiments to FIGS. 23 to 24, the grating can instead be a metal sheet with apertures therein to reduce the weight of the mat. The metal sheet can be 2 inches thick with openings both for the bolts that are used to join the mat components together as well as with additional openings to reduce the weight of the sheet. The openings can be random or uniform and can range from 1 to 6 inch in diameter for circular openings and from 2×2 to 4×4 inch rectangular or square openings. A metal grating or welded rod arrangement can also be used if desired.

Figure 25:
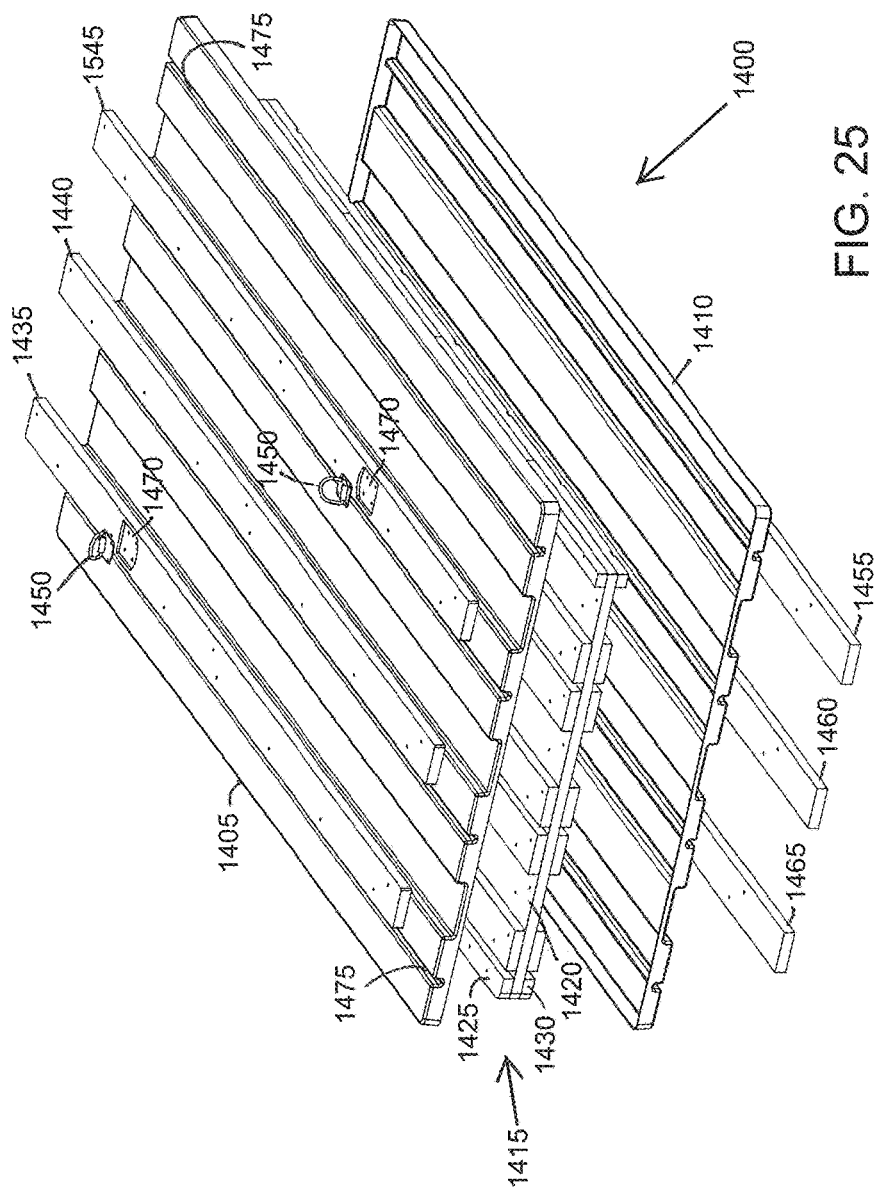
FIG. 25 is an exploded view of the mat of the invention showing the use of single width boards for the upper and lower layers, the skin upper and lower portions and the core construction that is encapsulated by the skin.

FIG. 25 illustrates another embodiment of the invention where mat 1400 that includes an upper skin 1405 and lower skin 1410 which are used to surround and encapsulate core construction 1415. The core construction includes a rectangular sheet 1420 of wood, plywood, or non-wood material. On the top surface of sheet 1420, boards 1425 are applied to the sheet 1420 by nailing, screwing, bolting or combinations thereof. On the bottom surface of sheet 1420, boards 1430 are also applied by nailing, screwing or bolting of boards 1430 to the sheet 1420. Preferably LSL boards are used for the upper and lower boards to obtain a good balance of dimensional tolerance, cost and performance.

When bolting is used, the bolts can extend from the upper boards 1425 to the lower boards 1430 through the sheet 1420. The nails, screws or bolt heads and nuts are recessed below the top surface of boards 1425 and below the bottom surface of boards 1430 to present relatively smooth upper and lower surfaces of the core construction 1415.

Alternatively, the boards can be attached to the sheet 1420 by an adhesive or other means that provide a secure attachment. For example, when the core construction is made of a thermosetting material, the sheet and boards can be made of the same material in a unitary component. The same is true of a welded metal core construction.

As shown in FIG. 25, eight (8) boards are used, with each two board pair separated by a space that would accommodate another board. Both the upper and lower boards that are attached to the sheet 1420 are arranged in the same way so that the same size skin portions can be used to encapsulate the top and bottom of the core, thus allowing a single mold to provide moldings that can be used as either the upper or lower skin portions.

Spaces are provided for the third, sixth, and ninth boards (1435, 1440, 1445, respectively) of the upper skin portion of the mat to allow such boards to be applied to the skins after encapsulation of the core construction 1415. Similarly, space is provided for the third sixth and ninth boards (1455, 1460, 1465, respectively) of the lower portion of the mat to allow interlocking of the mat to an adjacent mat. The boards 1455, 1460 and 1465 are applied to the lower skin portion in order to extend outwardly from the end of the mat to be received in a space in the lower skin of an adjacent mat. Although these additional boards are attached to the mat by screwing or bolting, any holes made through the skin are also sealed to prevent introduction of water or moisture into the core construction.

Lifting elements 1450 are provided on the third and ninth boards of the upper skin portion. These lifting elements 1450 are configured as D shaped rings which are securely attached to the boards in recesses 1470 by bolting or riveting so that the lifting element 1450 can remain flat when the mat 1400 is in use. Two lifting elements are shown but a skilled artisan can determine how many elements are needed for lifting of any particularly sized mat. If desired, lifting elements can also be provided on the boards attached to the lower skin portion 1410 for versatility in the handling and transportation of the mat. The lifting elements are provided on the boards that are attached to the skin portion so that if the lifting elements or boards are damaged they can be easily removed and replaced. Also, if desired, the other lifting elements disclosed herein can be used in this embodiment. In particular, those of FIGS. 19-21 are desirable when the core includes a steel structure.

The provision of single width boards enables the upper and lower moldings to have water channels 1475 on the upper surface of the skin to drain water from the mat.

Figure 26:
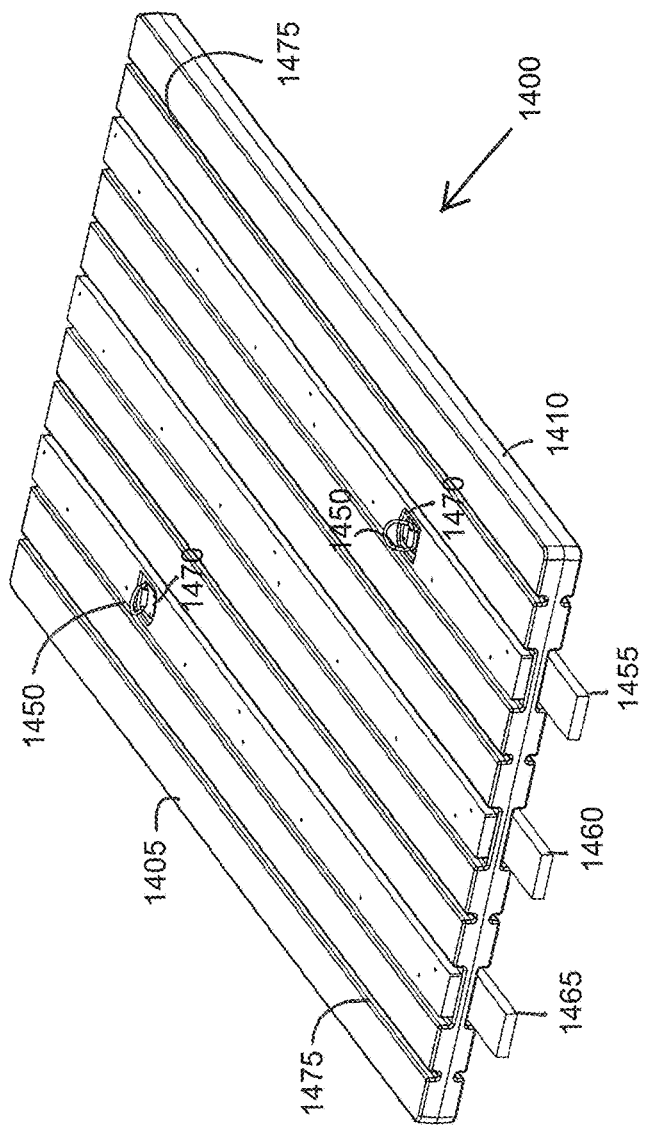
FIG. 26 is a view of the assembled mat of FIG. 25.

FIG. 26 illustrates the final shape and configuration of the mat 1400 after assembly.

Figure 27:
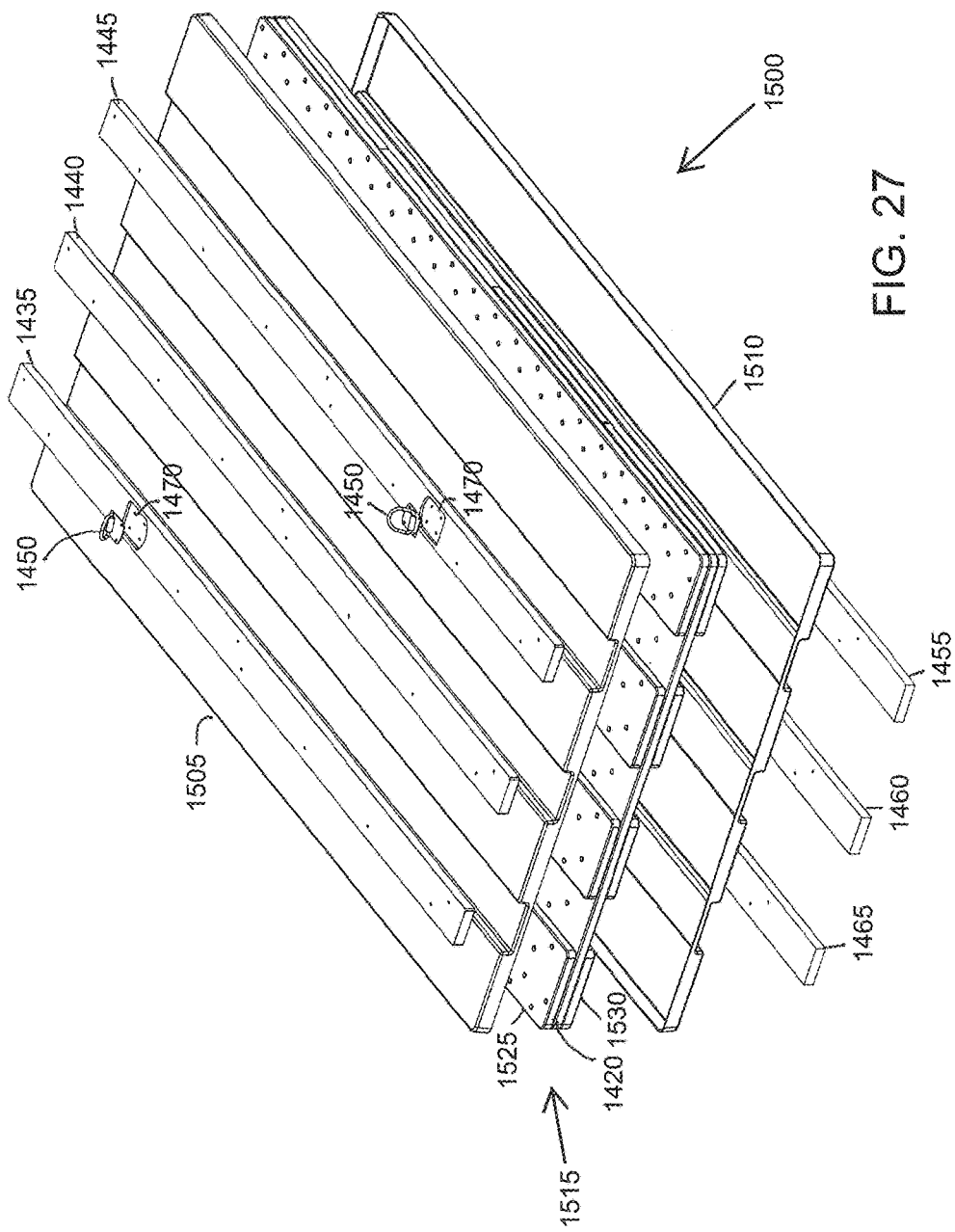
FIG. 27 is an exploded view of a mat according to the invention showing the use of double width boards for the upper and lower layers, the skin upper and lower portions and the core construction that is encapsulated by the skin.

FIG. 27 illustrates a second mat 1500 according to the invention. In this mat, double width boards 1525, 1530 are used in place of the single width boards 1425, 1430 of FIG. 25. This results in upper 1505 and lower 1510 skin portions that have a wider molded segments to accommodate the double width boards. As in the embodiment for FIG. 25, space is provided for the additional boards that include the lifting elements and that provide interlocking. As a number of the same components are used, the same numerals used in FIG. 26 are used to designate the same components for the mat of FIG. 27.

Figure 28:
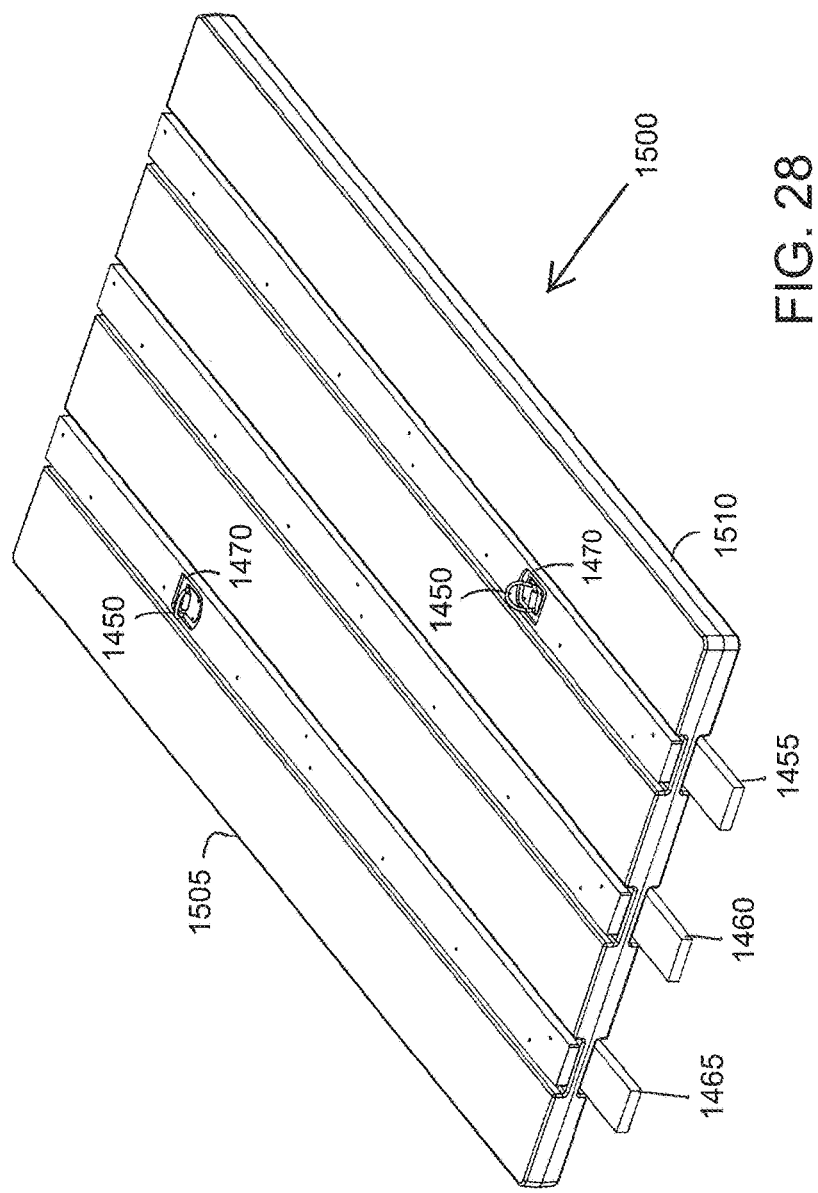
FIG. 28 is a view of the assembled mat of FIG. 27.

FIG. 28 illustrates the final mat 1500 after assembly. The drainage channels 1475 provide an advantage for mat 1400 compared to mat 1500 when the mats are to be used in an environment that will experience rainy or snowy weather conditions. For application of the mats in a dry environment, mat 1500 is preferred because it is easier to manufacture. And as noted herein, mats can have a flat surface without drainage channels for certain applications.

Figure 29:
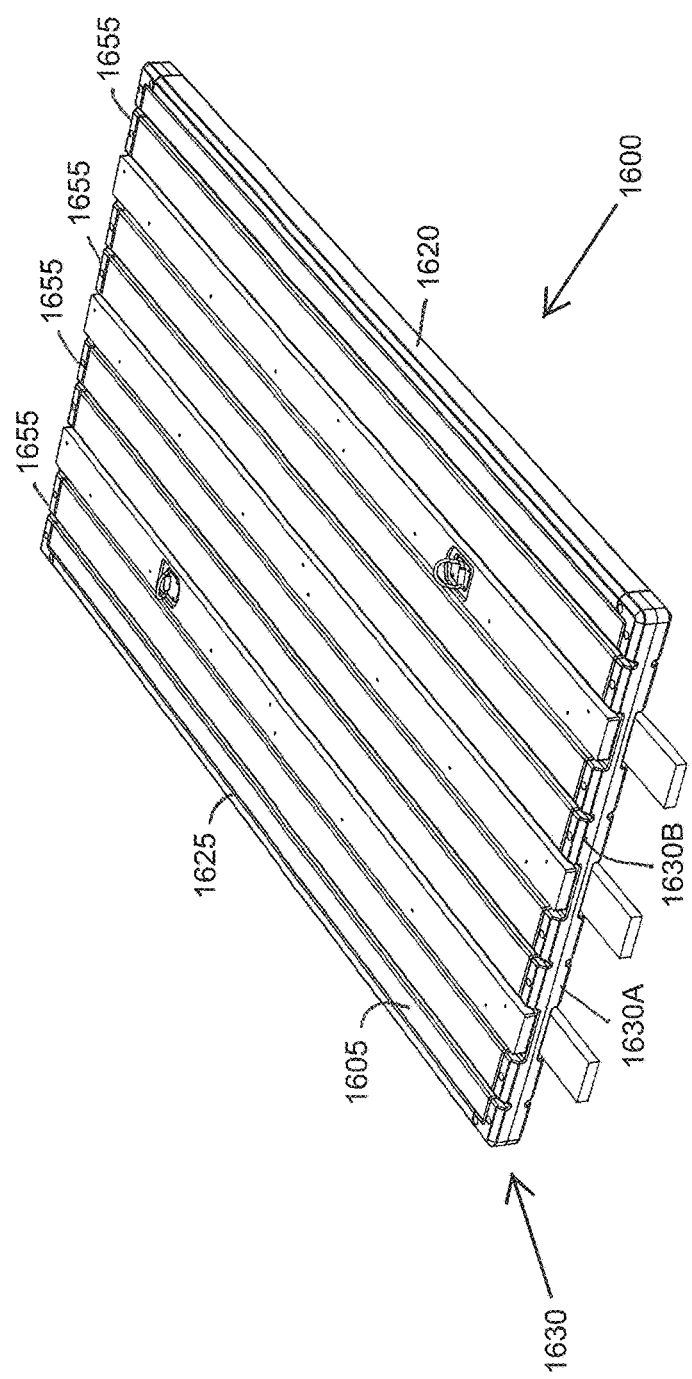
FIG. 29 is a perspective view of an encapsulated mat that preferably includes bumpers on all sides of the mat.
Figure 30:
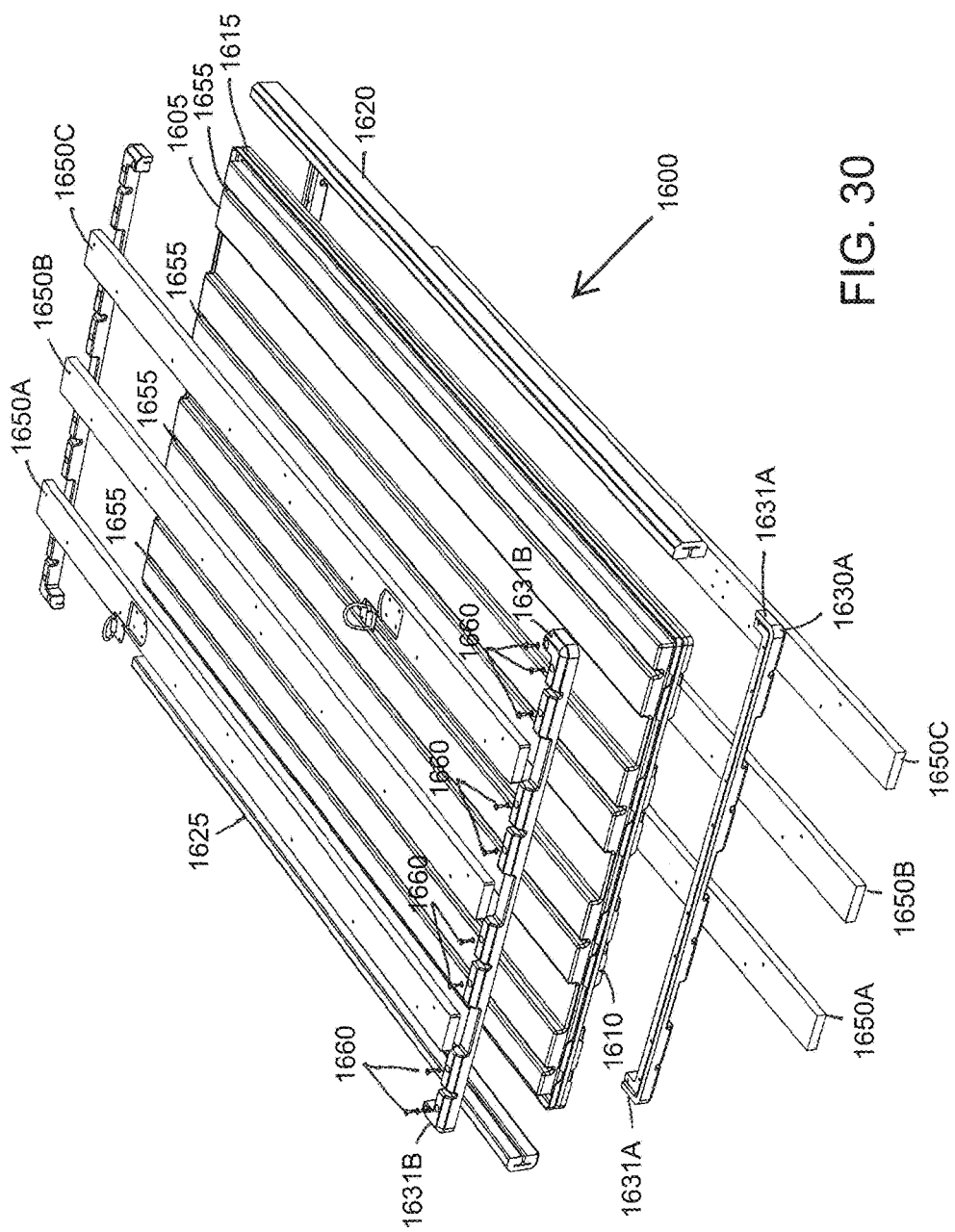
FIG. 30 is an exploded view of the mat of FIG. 29.

FIGS. 29 and 30 illustrate a preferred embodiment of the invention, wherein the encapsulated mat includes bumpers which protect the sides of the mat from damage during transport and installation. These bumpers are generally configured as a rails, rods or beams, preferably of a resilient durable material that protects the sides and core of the mat from damage when being moved around from warehouse to truck to jobsite. As the mats are relatively heavy, around 2000 pounds, they are moved by heavy equipment such as front end loaders or cranes, and are typically dragged or dropped into position. As the sides of the mat of the invention typically include a seal between the upper and lower skins, the bumpers provide protection from damage to the seal and side edges of the mats due to such movements and manipulation as well as some resistance to penetration by teeth or tines of the moving equipment. The bumpers are made of a durable, tough and resilient material such as a plastic or elastomer. In particular, HDPE or a rubber material having a Shore D hardness of 10 to 50 is preferred. The bumpers are preferably molded or extruded into the desired shape or shapes for releasable attachment to the mat.

As shown in FIGS. 29 and 30, the encapsulated mat 1600 is constructed the same way as the other encapsulated mats disclosed herein. The upper skin 1605 and lower skin 1610 are joined together at a seal 1615 to encapsulate the core of the mat. The seal is made by providing the upper and lower skins with flanges that are configured to contact each other and be joined together to form a sealed encapsulation about the core of the mat. Each of the sides of the mat are protected by side bumpers 1620, 1625, front bumper 1630, and rear bumper 1635.

The flange connecting upper skin 1605 and lower skin 1610 may be in the form of a ledge, shoulder, ridge or recess which protrudes sufficiently from the periphery of the skins to allow sufficient contact to facilitate heat sealing, welding or adhesive or mechanical bonding using clips or other mechanical fasteners. Welding or heat sealing is preferred to form the optimum seal for prevention of moisture or water penetration into the core of the mat. Alternatively, the skin peripheries can be configured with a tongue and groove arrangement wherein one skin has the tongue that is received by the groove on the other portion, so that the joining can be made by applying adhesives into the groove or by welding to form a secure seal. And in another arrangement, the flanges can be designed to protrude with a terminal bead or larger portion, so that the flanges can be placed in contact together with one or more clips engaging the bead and applying force to flanges to squeeze them together and form a relatively water tight seal. If the clips are designed to be removable, they could enable replacement of the upper or lower skin if damaged during use. For clamps of a more permanent nature, or in that case for any of these embodiments, an area or line can be provided on or adjacent to the flange is relatively flat to allow penetration by a blade to cut off the joined flange portion to enable the upper and lower portions to be separated and removed, such as when damaged or worn to the extent that moisture penetration resistance is compromised to thus allow replacement of the upper and lower portions along with any damaged components of the core structure.

Figure 31:
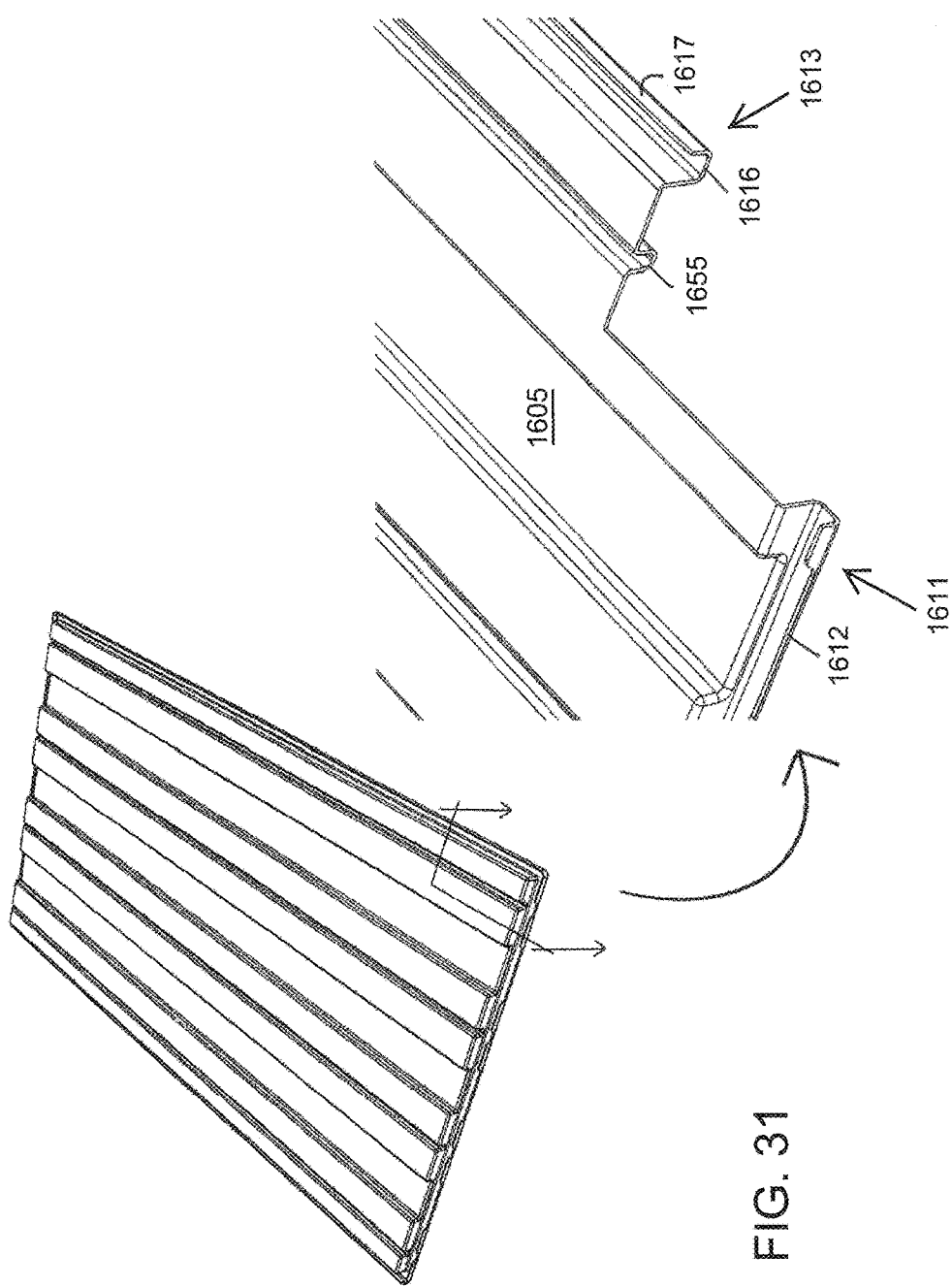
FIG. 31 is a view of the upper skin of the mat with a corner cutout to illustrate the construction of the flange for mounting the bumpers thereon.
Figure 32:
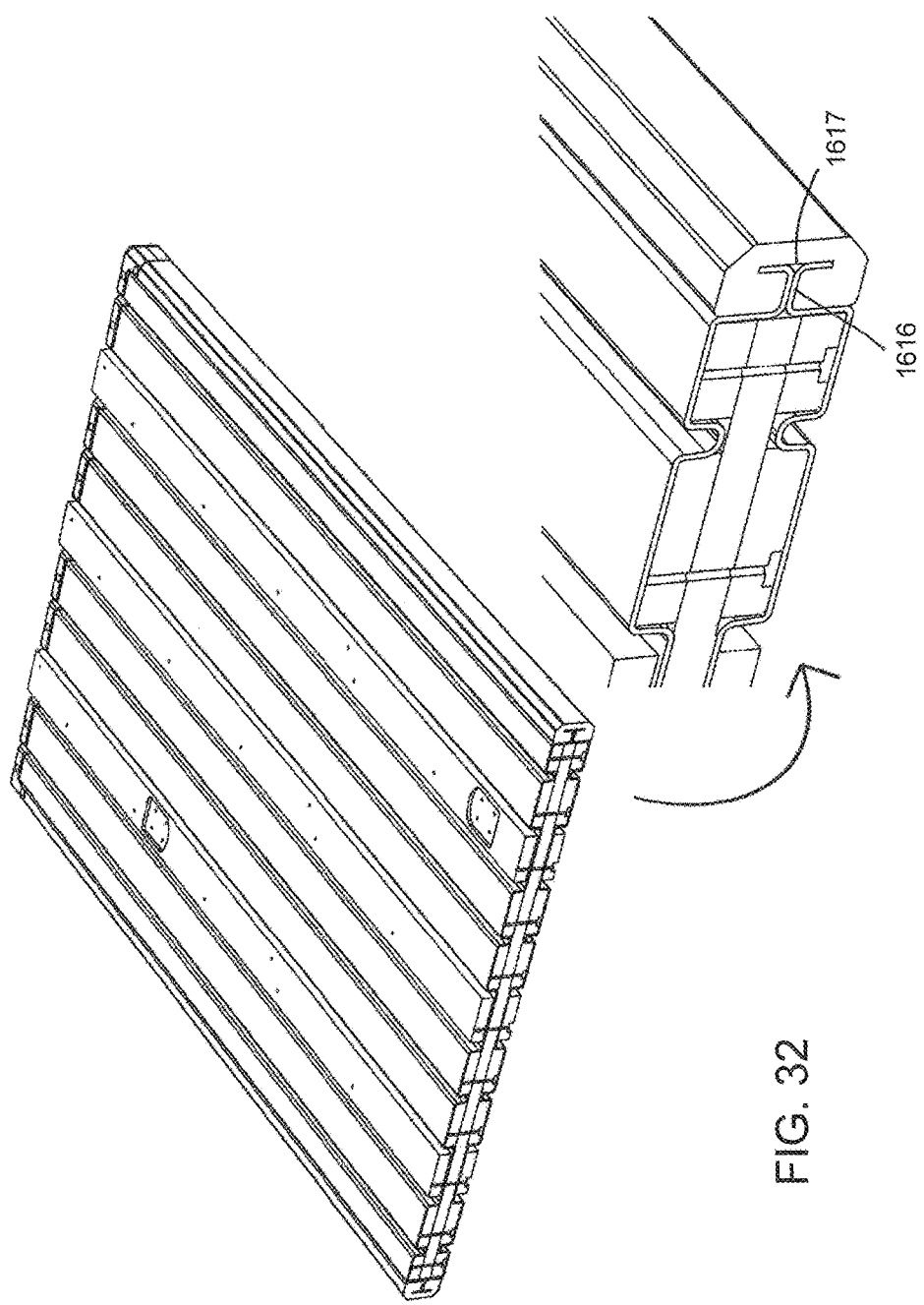
FIG. 32 is a cross-sectional view taken at a corner of the end of the mat of FIG. 30 to show a cross section of the width of the mat.
Figure 33:
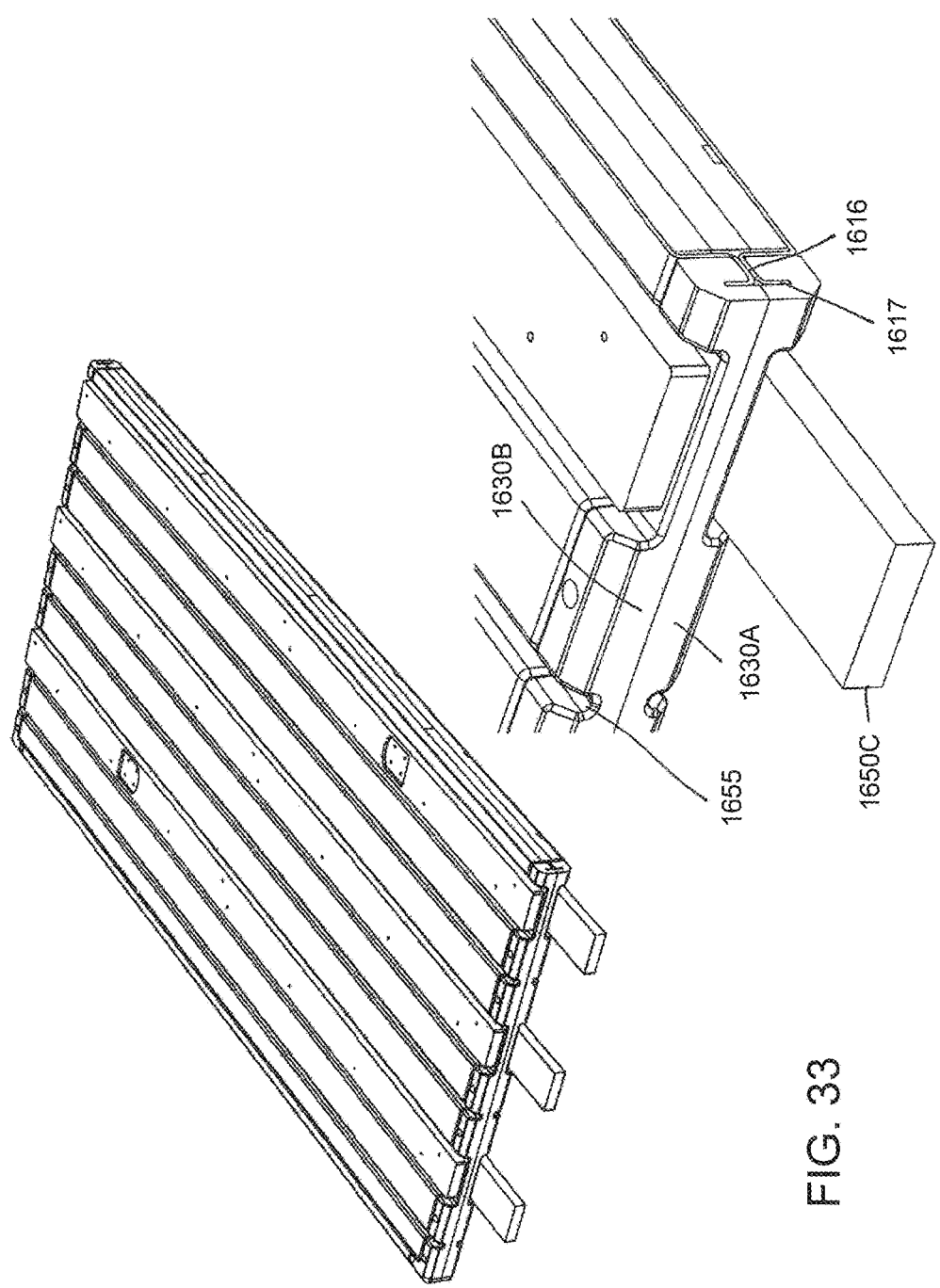
FIG. 33 is a cross-sectional view taken at a corner of the mat of FIG. 30 to show a cross section of the length of the mat.

FIG. 31 is a view of the upper skin of the mat with a cut out corner to illustrate the construction of a preferred flange which has a "T" shape. Advantageously, the flange has a flat perpendicular extension 1616. Optionally and preferably the end of the flange may have a terminal portion 1617 that extends away from the opposite upper or lower portion to form a "T" or "J" shape when viewed in cross section. A "T" shape as shown in FIGS. 32 and 33 is preferred. The upper skin forms half of the T shape by extension 1616 and perpendicular terminal portion 1617. The lower skin has a similar configuration. Thus, when the upper skin mates with the lower skin of the mat, extensions 1616 of each skin come into contact with terminal portions 1617 forming the upper part of the "T" shape. A seal is made between the upper and lower skins by joining the flanges together by welding or with an adhesive. In particular, a hot plate can be used to contact the flanges to soften or melt them partially so that they can be joined together upon contact with some pressure applied to hold the flanges together until they cool and bond. This provides an encapsulation about the strength core of the mat to avoid or at least minimize liquid permeation which could eventually deteriorate the core components in particular when wood is used. Preventing moisture from entering the core of the mat also allows steel components there to not be subjected to rusting. And although steel or wood could be treated or painted to combat moisture penetration, the encapsulating skins eliminate or at least significantly reduce the need for such additional manufacturing steps. Of course, if desired, these additional steps can be used to further lengthen the service life of the mat.

On the front portion of the skin, the flange 1611 has cut out portions 1612 to allow the boards to pass above the flange to form the interlocking structure described herein. On the sides of the mat, flange 1613 is uniform unless the mat has interlocking boards oriented on the sides of the mat, in which case it will also be configured with a cut out portion 1612 to allow boards to pass over the flange. In addition to facilitating the joining of the upper and lower members, the flange is preferably used to mount bumpers which protect the side edges of the mat from damage during transport and installation. Also, the terminal portion 1617 functions to help hold the side bumpers 1620, 1625 in place against the side edges of the mat.

As shown in FIGS. 29 and 30, the bumpers are configured as a rail or rod that protects the sides and upper and lower corners of the mat. Generally, as best shown in FIG. 30, the bumpers are made in two pieces. In particular, as shown for front bumper 1630, lower 1630A and lower 1630B rails or rods are provided and joined together to form the bumper 1630. The rails or rods are made of a durable, tough and resilient material such as a plastic or elastomer. In particular, HDPE or a rubber material having a Shore D durometer hardness of 10 to 50 is preferred for the bumpers. The same material can be used for the side bumpers 1620, 1625.

The side bumpers 1620, 1625 are preferably made as a single piece with an appropriate cut out central opening that would receive the flange and terminal portion, so that the side bumpers can simply be slid along the flange and terminal portion from the front or back of the mat. This is a preferred construction for the side bumpers but it also can be used for the front or rear bumpers, but the front and rear bumpers are configured differently because they must be shaped to all areas for certain top and bottom boards 1650A, 1650B, 1650C to protrude past the end of the mat to provide a structure that interlocks with an adjacent mat. Advantageously, however, the front and back bumpers are configured in two pieces to facilitate joining of those bumpers to the mat after the side bumpers are attached.

An alternative construction would be to make the lower 1630A and upper 1630B rails on the front and rear of the mat instead as a single bumper component like the side bumpers 1620, 1625 rails. For this, the single bumper piece 1630, 1635 would include a cut out interior portion that would allow the bumpers to be slid onto the front and rear flanges from either side of the mat with the flange received in the cut out portion. To retain all bumpers in position on the flange about the periphery of the mat, bolting or other fasteners passing through the bumper and flange in periodic locations can be used. As can be appreciated, however, when the front and rear bumpers are configured as shown in FIGS. 29 and 30, the side bumpers can simply be slid onto the flanges and retained in place by the front and rear bumpers.

Figure 34:
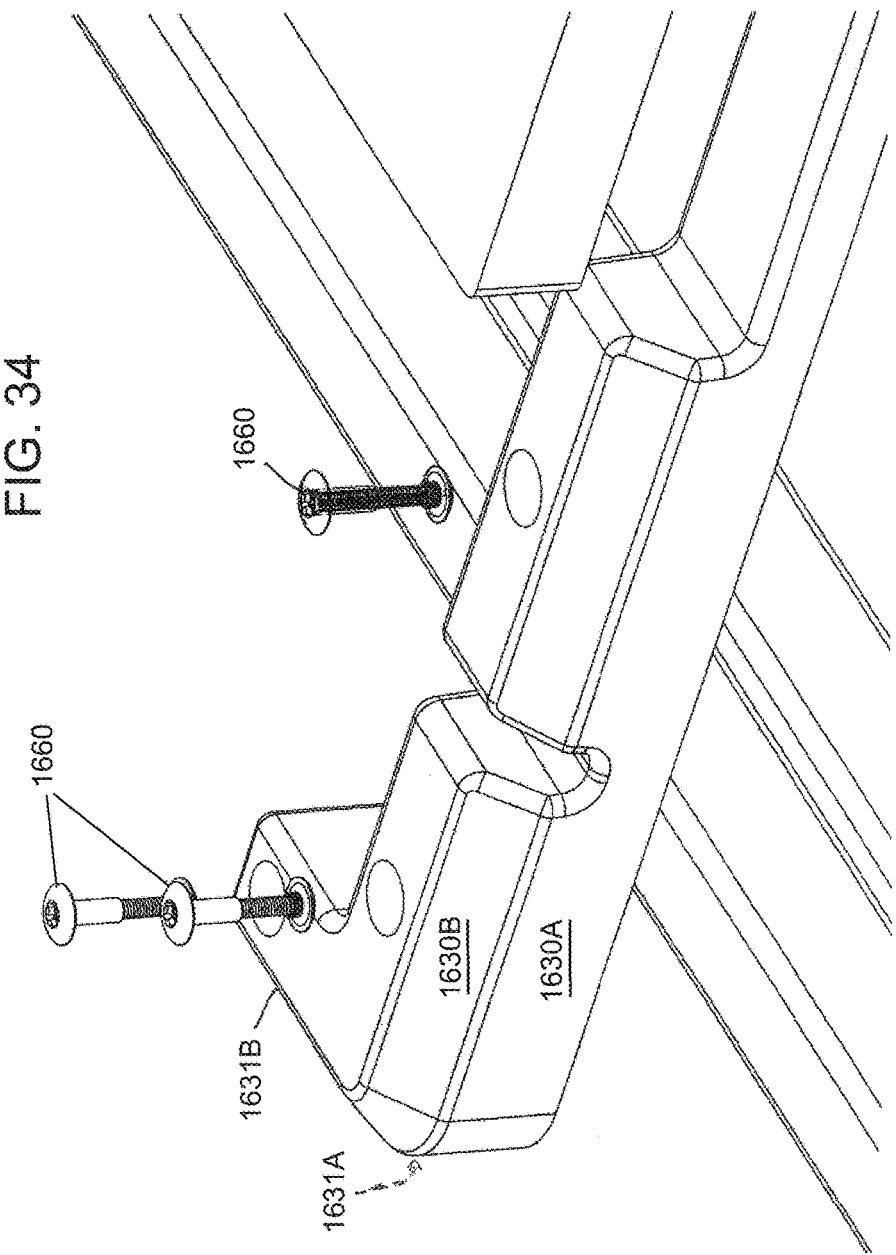
FIG. 34 is a detail of the assembly of an end bumper for the mat of FIG. 30.

With the two piece front and rear bumpers are used, the first step in attaching the bumpers to the mat is to slide the side bumpers 1620, 1625 onto the flanges. After the two side bumpers are slid onto the flanges, the front and back end bumpers can be installed. As noted, the end bumpers are configured with non-uniform upper and lower surfaces to accommodate the protruding boards for the interlocking structure. In addition, the upper and lower encapsulation portions include channels 1655 that permit water to flow and be removed from the mat. The upper and lower surfaces of the lower and upper bumpers are configured to match the shape of these channels so that they do not block them. The end bumpers also terminate on their left and right sides with portions 1631A, 1631B that surrounds the corner edges of the mat and extends to the ends of the side bumpers 1620, 1625. This is best shown in FIG. 34. The lower 1630A and upper 1630B rails are placed in contact with each other and then are bolted or riveted together to be secured to the mat, with pop rivets 1660 being preferred for connecting these pieces. The rear bumper 1640 is configured in the same way as the front bumper so that the side bumpers are maintained in position in between the front and rear bumpers.

In one embodiment, the bumpers may be provided only upon the front and rear ends of the mat since these ends experience more damage due to the extra handling needed to interlock one mat with another. For mats that are configured and designed to interlock on all four sides, bumpers on all four sides are advantageous. Even when the mats have sides that do not interlock, bumpers on all sides are desirable. These bumpers provide protection from damage to the seal and edges of the mats during transport and installation due to movement and manipulation as well as some resistance to penetration by teeth or tines of the moving equipment.

In another embodiment, the upper and lower skins can be joined together in a configuration that provides a ball or rectangular shaped protrusion with the bumpers configured with an opening along the center of body of the bumper so that the bumpers can be snapped upon the protrusion and help in place thereon. This design facilitates replacement of the bumpers when damaged. Alternatively, the flange can be designed to receive bolts or pop rivets to join the bumpers to the flange as shown in FIG. 34.

If desired, the bumpers can be molded as part of the design of either the upper skin, the lower skin or both. Instead of a flange, the skins can be designed with bumpers that can be welded together where they contact each other to both seal the mat and provide the additional protection to the core. This situation is not as preferred as the others wherein either the front, back or side bumpers can be more easily removed separately such as when only one of the bumpers is damaged and requires replacement.

And while offsetting of certain boards is shown for providing an interlocking with adjacent mats, this is not always needed such that interlocking can be considered to be an optional yet desirable feature. Interlocking is often preferred to avoid staking of the mats to the ground or to avoid including other more complex components for use in connecting adjacent mats together. As noted, interlocking is generally provided on the front and rear ends of the mat but in certain situations interlocking can be provided on all four sides of the mat to obtain a wider interlocked base structure.

Another feature of the invention is the use of color coding to identify the core construction of the mat. As the encapsulation is opaque, it is not possible to visually determine how the core is made. Thus, a color coding system can be used to identify the specific core construction. This can also be used to identify mats for a particular customer or end user. When mats are rented or leased, the color coding can be used to identify which mats belong to the leasing company compared to mats provided by others. The color coding can be of a single color or of certain stripes, patterns, dots or other indicia that provides a "signature" that identifies the specific core that is present in the mat or a particular end user or owner of the mat.

All of the mats according to the invention are to be installed on a prepared ground surface so that they will perform acceptably. Ground preparation is typically upon a material of uniform flatness (e.g., within +/−12" over an 8'×14' surface). Crushed stone or rock generally no larger than 4" diameter is acceptable for preparing the ground as a substrate for supporting the mats.

All mats according to the invention that include the most preferred core construction or alternatives thereof are designed to meet the following product specifications for preferred implementations as temporary roadways, equipment support surfaces, platforms and similar applications. A further benefit of the mats of the invention is that they do not cause contamination of the ground surfaces upon which they are applied.

Preferred overall mat dimensions are approximately 8' wide×6" tall and are either 12 ft, 14 ft or 16 ft in length. The interlocking feature will extend the length of the mats by about 1 ft at three locations at one end of mat. U.S. Pat. No. 4,462,712 discloses mats which contain interlocking fingers and recesses which are preferred for use in the present invention.

The mats typically include three (3) layers of individual wood or composite boards, having cross section dimensions of 1.75" by 8".

The spacing between individual boards or components in the upper layer is preferably approximately 1.25" to allow water to drain from the mat. This spacing is retained in the upper portion of the skin. The slip resistance of the mat is improved by the draining of the excess water, especially when use in locations that experience heavy rain or snow conditions.

The preferred mats have physical properties that meet or exceed the physical properties of a conventional white oak mat.

The mat must also provide sufficient load bearing capacity: a fully supported mat (one that is properly installed on an approved ground surface preparation) must withstand a 10 ton load, spread over a 12" diameter surface without degradation of mat properties or permanent deformation of core construction of the mat. The core would have a crush resistance of between about 600 and 800 psi depending upon the application. This provides resistance against compression while not detracting from providing resistance to torsion forces that applied to the mat by vehicles passing thereover.

Optionally and preferably, the perimeter edges of the mat may be provided with additional protection to prevent or reduce damage to the core construction of the mat from side entrance or egress onto the mat from large vehicles with steel tracks. The edge material helps protect the core construction and may be removable. The edge material may be made of wood, metal, or a plastic or elastomeric material.

Preferably, the skin is relatively non-flammable. Flammability of mat is defined as Class 2 (B) flame spread when measured by ASTM E84 test criteria. The flammability properties of the skin materials can be significantly reduced by adding the appropriate conventional flame retardant or other additives that are known to impart such properties.

The skin should also allow dissipation of static electricity. For this purpose, the skin can include carbon black, metal particles or other conductive fillers.

To prevent premature deterioration of the skin, the material for the skin should contain UV inhibitors as necessary and in an amount sufficient to reduce deterioration of physical properties or color.

To assist in gripping of vehicle or personnel traffic on the mat, a non-slip or textured surface can be applied to the exposed surface of the upper portion of the skin. This can be sand or other grit material that is embedded in the skin during preparation or molding or that is later added with an adhesive or a coating.

For ease in moving of the mats, attachment points can be provided that allow for lifting and handling of individual mats. Lifting hardware preferably includes D rings, O-rings, chain, or cables at 2-4 locations on the upper surface of the mat. The exact position and attachment of lifting hardware is designed based on the size and weight of the mat and is intended to avoid damage to the encapsulating skins or the internal structure of the mat.

The core construction of the mat preferably is not hollow. If hollow components are used for the various layers of the core construction, such as metal lath, metal sheets with openings provided therein, thermoplastic or fiberglass reinforced thermosetting plastic structures with open cells, or the like, the cells or openings may be preferably filled with a non-absorbent material. A wide variety of different plastic, elastomeric or foam materials can be used for this purpose. The hollow portions can be used as is or can be provided with filler or other materials to increase or decrease weight as needed. Fillers of glass, ceramic or metal particles can be included to provide additional weight or strength to the mat. Other materials such as recycled rubber tire material or other environmentally friendly materials can instead be used. Preferably, the mat has a weight that is on the order of a white oak mat of similar size.

For a more advanced product, the core construction layer may be made of environmentally resistant material to further prevent against degradation due to weather conditions in the event that the skin becomes damaged or otherwise compromised to allow liquid to enter into the core construction.

The encapsulated mats provide unexpected benefits over the art in that the skin provides resistance to abrasion and abuse of the core construction while also preventing moisture, water or chemicals from the surrounding environment from penetrating into the core construction. This enables the core construction to provide a much longer service life when wood components are used since the skin prevents rotting or other chemical degradation of the wood components of the core construction. Further enhancements in service life can be expected by providing a core construction made of thermosetting or thermoplastic materials or plastic coated metal. Finally, when the service life of the skin is being approached, the skin can be cut off or otherwise removed from the core so that a new skin can be applied. To the extent that any of the components of the upper or lower layers are damaged, they can be replaced so that a new mat can be made with the reuse of a substantial part of the core construction. In some situations, such as where the core construction remains in relatively good condition from, e.g., the use of non-wood core components, only a portion of the skin can be removed and replaced, thus providing further savings in recycling rather than replacing the mat.

Figure 35:
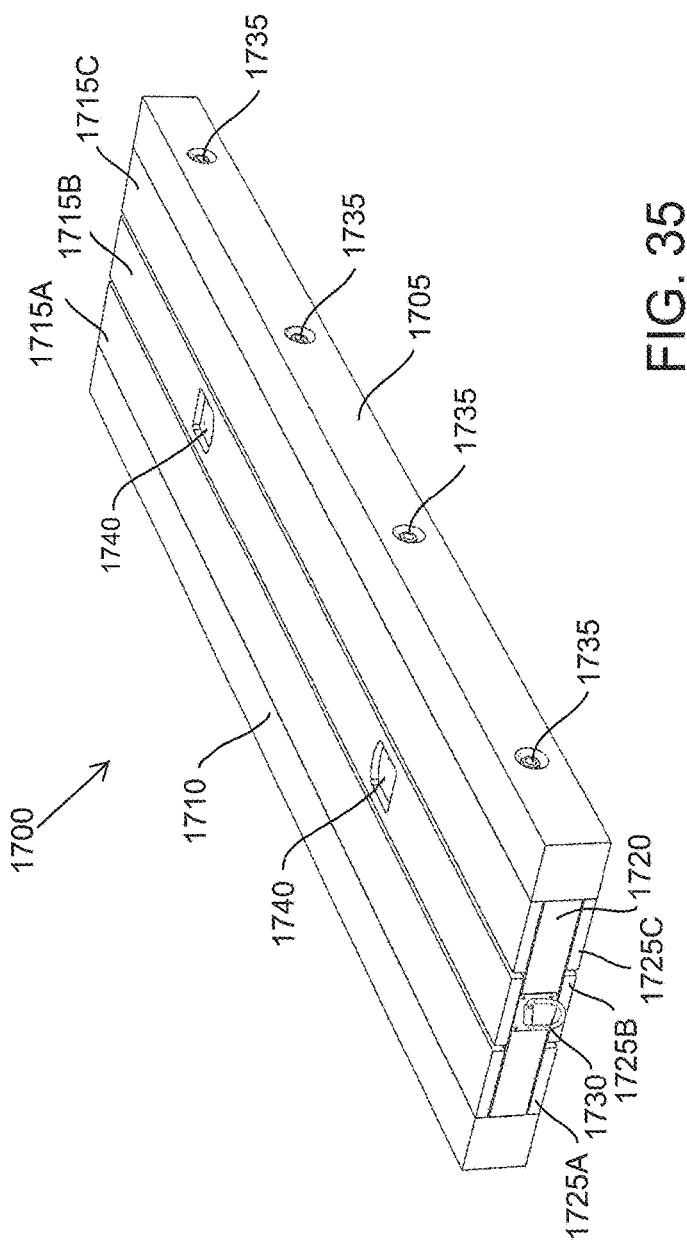
FIG. 35 is a perspective view of a crane or pipeline mat according to the present invention.
Figure 36:
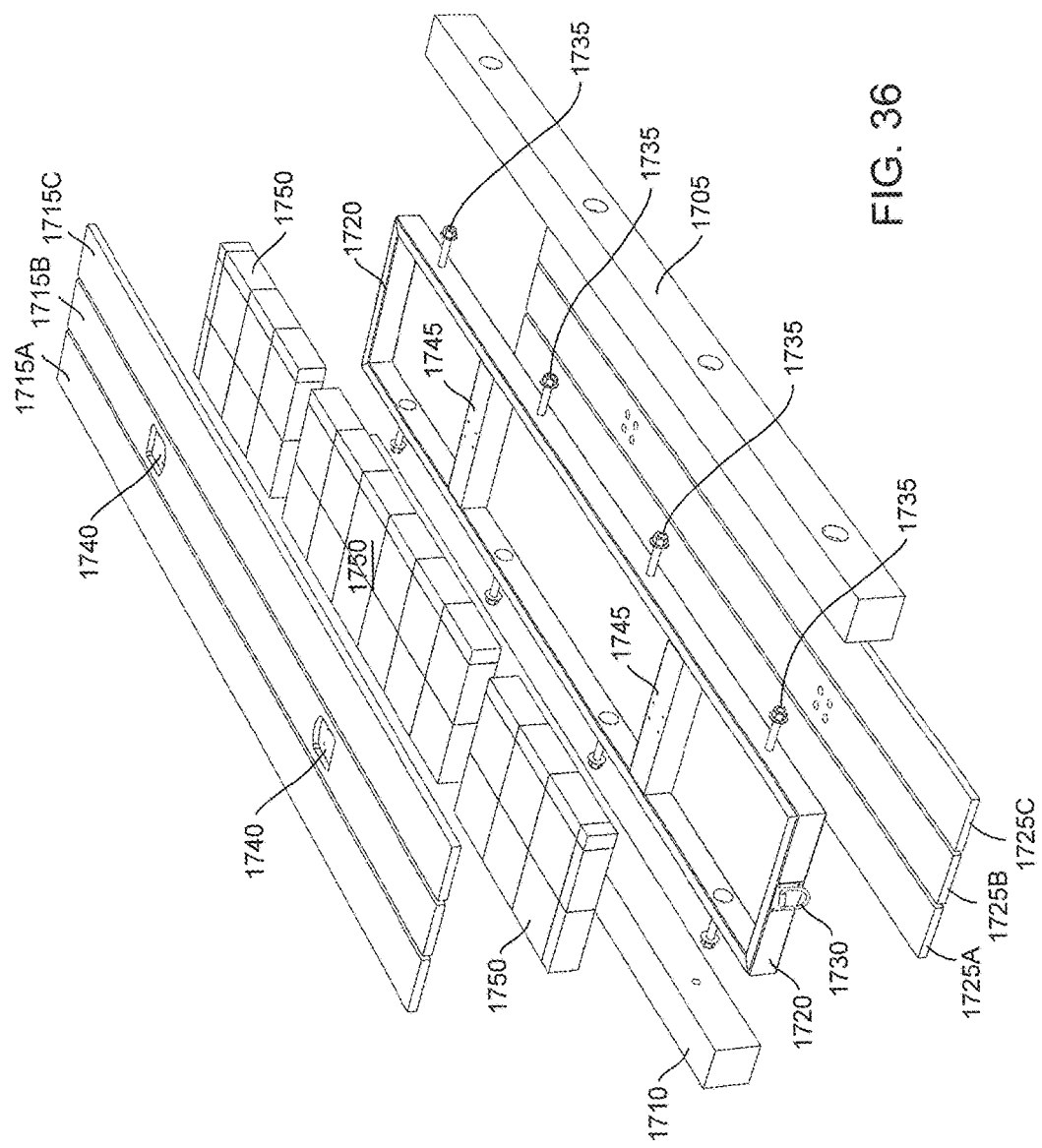
FIG. 36 is an exploded view of the crane or pipeline mat of FIG. 35.

FIGS. 35 and 36 illustrate another embodiment in the form of a crane/pipeline mat 1700 that has a typical thickness of about 8 to 12 inches, a typical width of about 4 feet and a typical length of between 12 and 20 feet. The mat 1700 includes two side beams 1705, 1710, a steel box frame 1720, an upper layer of elongated members 1715A, 1715B, 1715C, and a lower layer of elongated members 1725A, 1725B, 1725C. The core structure can be between 2 and 3 feet wide depending upon the width of the side beams. The upper or lower layers can also be a single sheet or plate of wood or metal of various thicknesses depending upon the size of the mat and the supporting properties that are needed for the intended. As noted herein, multiple plates or sheets can also be used if desired.

The steel frame 1720 includes a forward lifting element 1735 and two upper side lifting elements 1740. If desired, a rear lifting element and two lower side lifting elements (not shown) can also be provided. These lifting elements allowed the mat to be lifted overhead by a crane having a suitable lifting capacity to facilitate loading, unloading, and installing of the mats.

The lifting elements can be constructed as desired. If cables or chains are to be used, any holes made in the mat for such cables or chains must be drilled through the entire mat, and not just looped in between board or component spacings. The chains or cables must have at least three drop forged clamps. Cable must be new ¾ inch steel core, extra improved plow (EIPS), right regular lay wire rope, having a minimum breaking strength of over 29 tons. Chains should be ⅜" high test chain, having a working load limit of 5400 lbs. and a minimum breaking strength of 16,200 lbs. with ⅜ inch double clevis links, in order to provide a safe working load limit of about 5400 lbs.

Other lifting elements may be used as described herein. The lifting elements can be used with any of the mats disclosed herein provided that the appropriate core structure is present.

The components of mat 1700 are more clearly shown in the exploded drawing of FIG. 36. The steel frame 1720 is shown as having a plurality of components including two elongated side components, a front end component, a back end component and two cross members 1745, all of which are welded or bolted together to form the frame 1720. Side beam bolting members 1735 are also welded to the box frame 1720. These bolting members are configured to pass through openings in the side beams 1705, 1710 to secure the side beams to the steel box frame 1720. This is done by tightening nuts onto the ends of the bolting members 1735 after they pass through the holes in the side beams. The side beam holes are recessed so that the bolting and nuts do not extend beyond the sides of the beams.

The lifting elements 1730, 1740 are preferably in the shape of a D ring which is welded or bolted to the box frame 1720 or its cross members 1745 as best shown in FIG. 36. The upper layer elongated members 1715A, 1715B, 1715C, and lower layer elongated members 1725A, 1725B, 1725C are also bolted to the box frame 1720.

As the box frame 1720 defines open areas therein, it is best to fill those open areas with material that will contribute to the ruggedness and weight of the mat. In particular, a filler of wood members 1750 that either are scrap pieces from the production of other mats or are end grain or engineered wood can be used. It is also possible to use a less expensive wood material such as treated pine because the purpose of these filler materials is simply to add weight to the mat and they are not exposed to wear or abuse. And instead of wood material, the open areas of the core may be filled with other materials of the types disclosed elsewhere herein.

Figure 37:
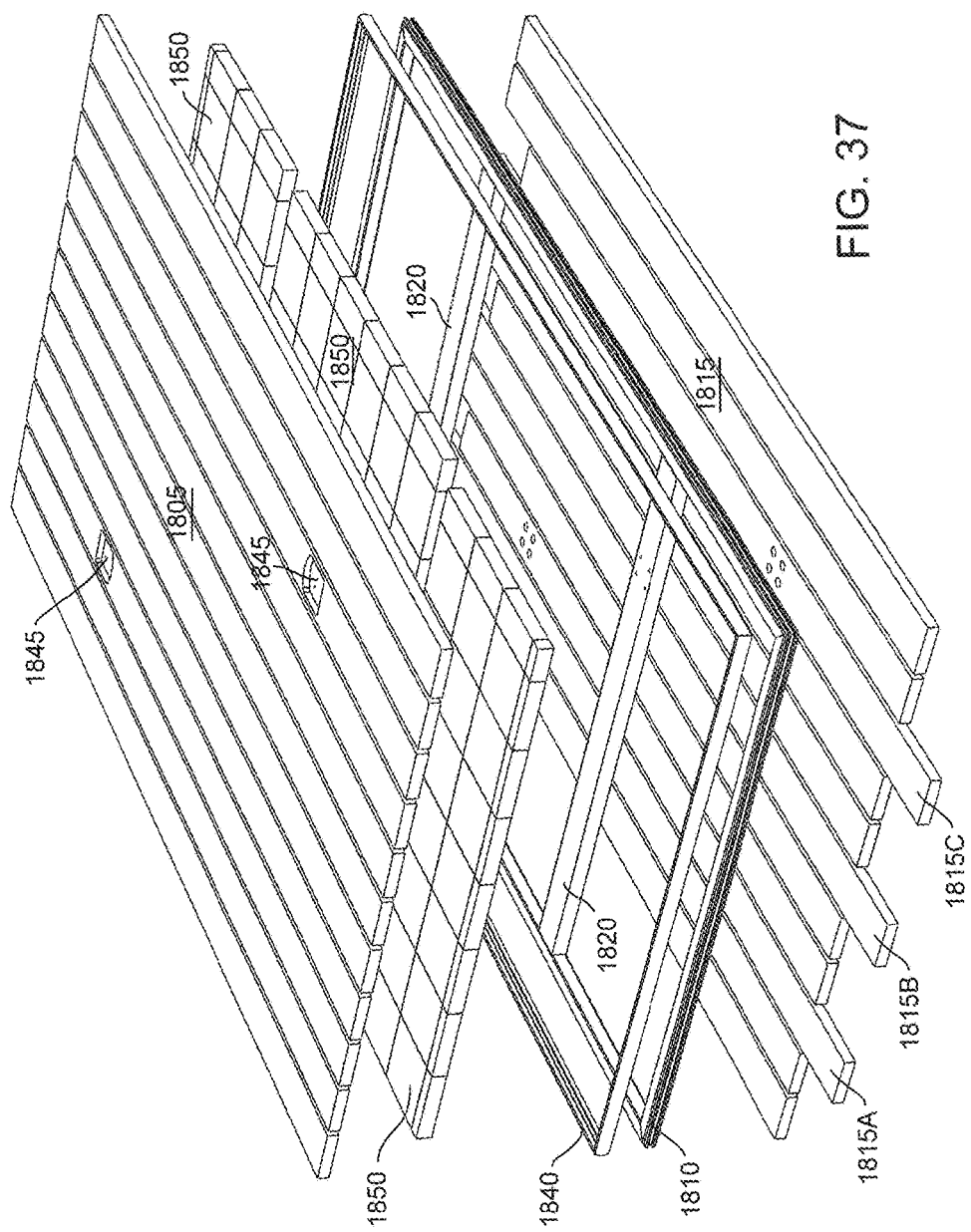
FIG. 37 is an exploded view of an interlocking mat having a steel frame and woodblock core.
Figure 38:
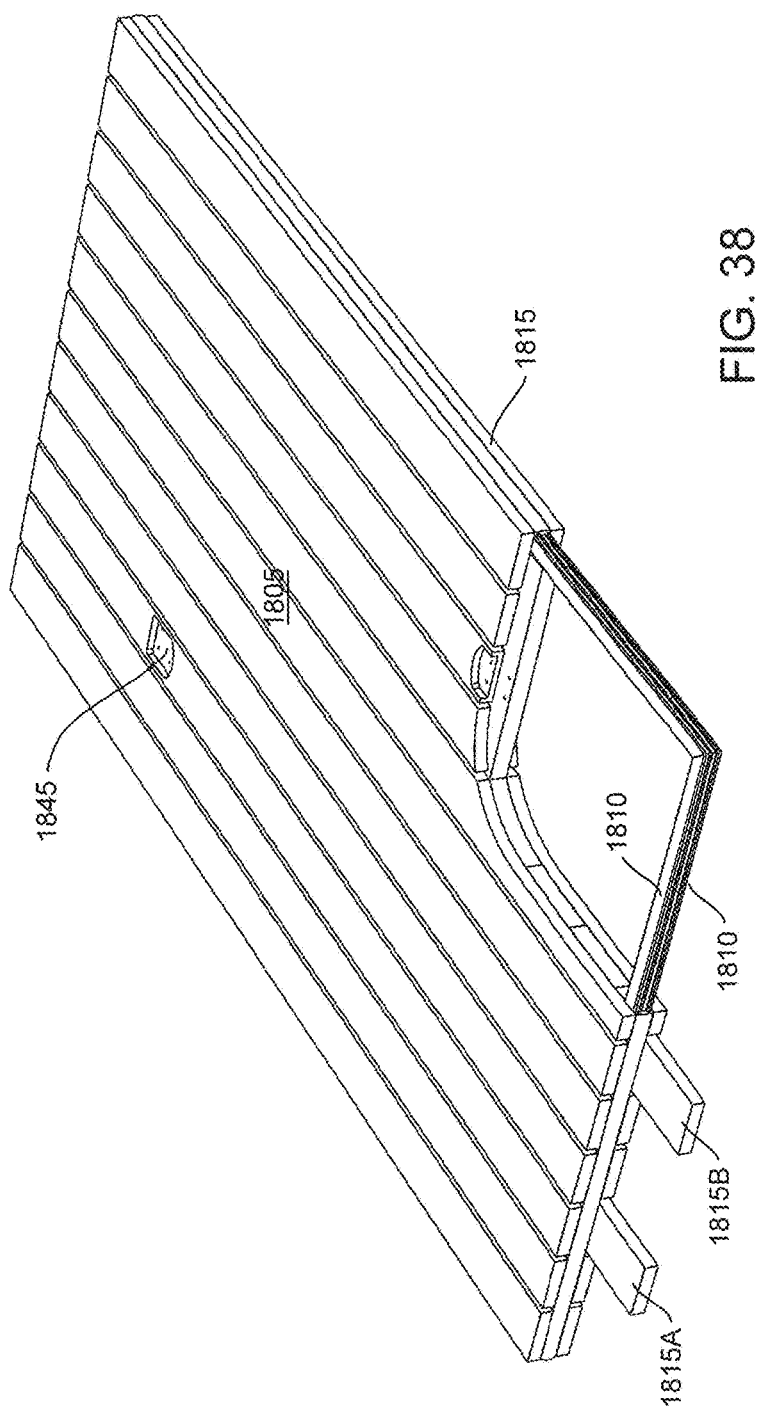
FIG. 38 is a view of the constructed mat of FIG. 37 with a portion of the corner removed to show the welded frame and core structure.

FIGS. 37 and 38 illustrate yet another mat 1800 that includes a steel frame core 1810. The core is used on an interlocking mat that has upper 1805 and lower 1815 layers of elongated members. These elongated members may be made of wood, engineered wood, or of a thermoplastic, elastomeric, rubber, or thermosetting plastic material. The plastic materials can be recycled plastics. The plastic and elastomeric or rubber materials can be used alone or can be reinforced as known in the art to provide additional strength, abrasion or wear resistance or to otherwise improve physical properties. And as noted herein, the upper and lower layers can instead be made of a metal sheet or plate. Preferably, wood is preferred as it provides abrasion and abuse protection to the mat at a relatively low cost. And as shown, three elongated members 1815A, 1815B, 1815C of the lower layer are offset from the others to form a configuration for interlocking with an adjacent similarly configured mat as disclosed elsewhere herein.

Alternatively, the elongated member(s) comprise a sheet or plurality of plates made of metal, the thickness of which can vary depending upon the application or intended use of the mat. The elongated member(s) instead can be one or more sheets or rectangular structures made of a thermoplastic, thermosetting plastic, or elastomeric material. In particular, recycled plastic material is preferred as again these components are configured and designed to be replaceable when damaged. Plastic materials can also be further recycled to reduce disposal of the removed and replaced components. A particular type of recycled plastic material is made of fibers from carpeting and other materials such as rice hulls. The resultant recycled plastic board has a similar appearance to an oak board but with the additional advantage that it does not absorb fluids. This type of board is called Miura board and it is an ideal choice for the external components of any of the embodiments of the invention.

The steel frame 1810 includes four side members and two cross members 1820 which can be welded or bolted together to form the frame. The open space in the box frame can be filled with material that will contribute to the ruggedness and weight of the mat. In particular, a filler of wood members 1850 that either are scrap pieces from the production of other mats or are end grain or engineered wood can be used. It is also possible to use a less expensive wood material such as treated pine because the purpose of these filler materials is simply to add weight to the mat and they are not exposed to wear or abuse. And instead of wood material, the open areas of the core may be filled with other materials of the types disclosed elsewhere herein.

If desired, the mat can be made just of the frame and the upper and lower layers. To protect a steel frame from damage, however, a rectangular bumper configuration 1840 may be provided along all outer side surfaces of the steel box frame.

And as in the other embodiments, D-shaped lifting elements can be 1845 can be provided in various locations on the top and bottom of the mat in positions where they can be welded to the cross members 1820 of the steel frame. These would allow lifting of the mat and transport as well as placement into the appropriate locations during installation.

Figure 39:
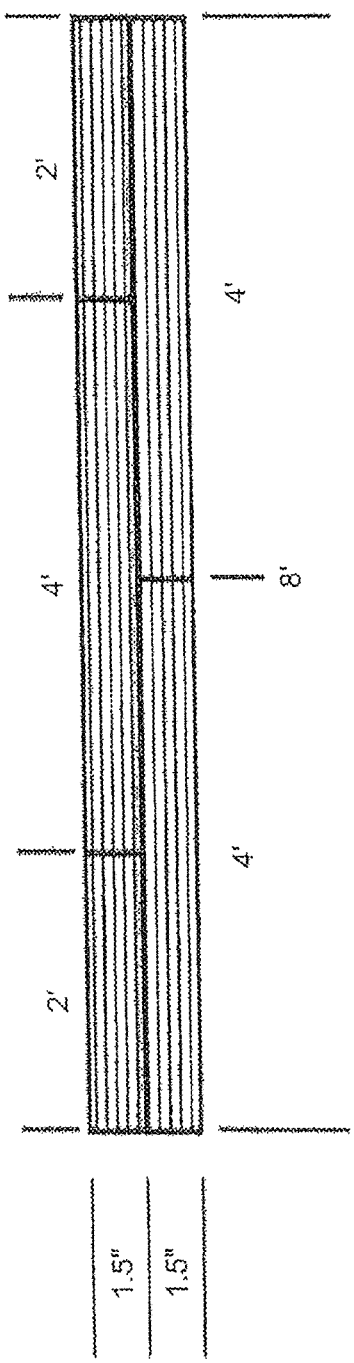
FIG. 39 is a schematic illustration of an engineered wood configuration for use as the core construction.

When engineered lumber is used, there are a number of configurations which are ideally suited for use of that material as the core construction of the present invention. In particular, LVL is used for these embodiments. A preferred embodiment is shown in FIG. 39, wherein the structure of the core construction is a 3 inch thick, 4 foot wide by 8 foot long block that is made by multiple strips of unidirectional veneers that are adhered together to form the block. First of all, two base blocks that are 1.5 inches thick and are 4 foot wide by 4 foot long are prepared. These blocks are joined together along their width to form a 4 foot by 8 foot by 1.5 inch thick combined block structure. This combined block structure is reinforced by adding two 1.5 inch thick, 4 foot wide by 2 foot long sections on the upper surface of the combined block structure: one at the forward end of the mat and one at the rear end of the mat. Between these sections is a middle section that is 1.5 inch thick, 4 foot wide and 4 foot long located between the forward and rear sections.

For greatest strength in any of these embodiments, most unidirectional veneers are oriented in the machine direction with 5 to 30% and preferably 20 to 25% of the veneers oriented in the cross machine direction. That geometry sets up some very impressive physicals for the combined structures. The structure shown in FIG. 39 is a "single board" that would require no fastening mechanisms and that can be just dropped onto the bed of rubber crumbs in the mold. Furthermore, the costs of the structures of these embodiments will be on the order of oak or other hardwoods.

Figure 40:
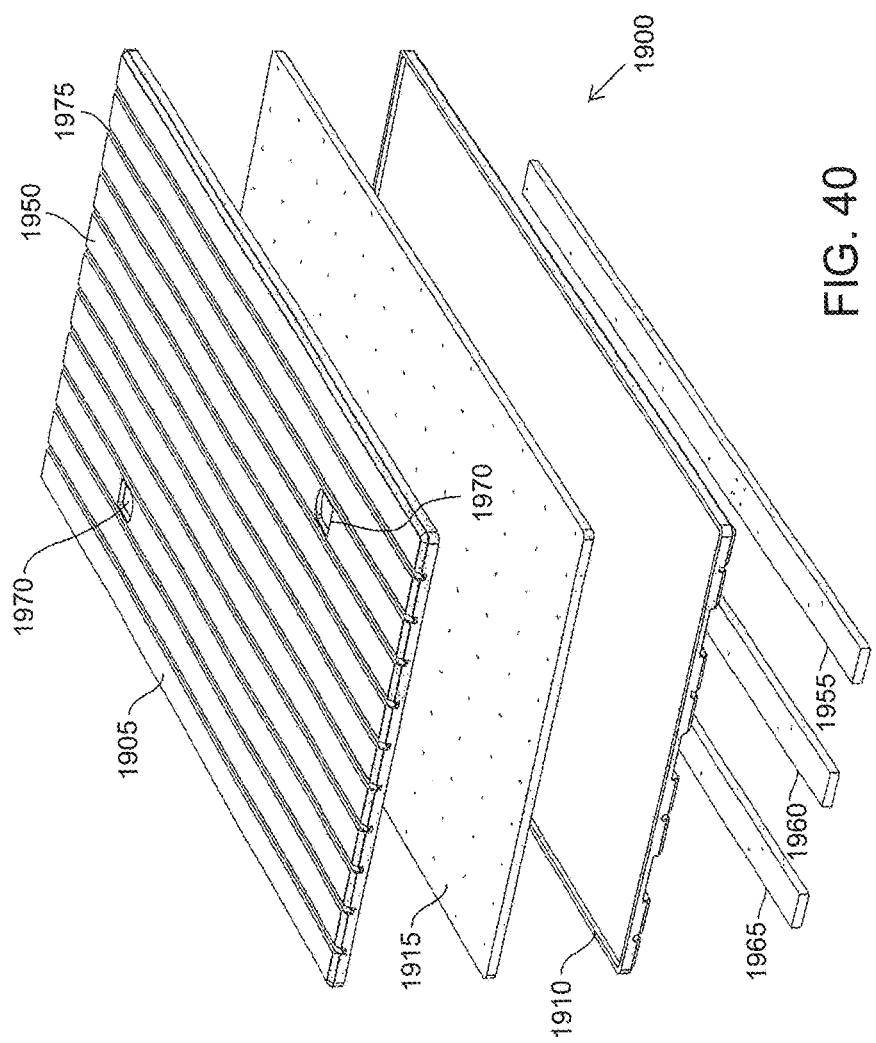
FIG. 40 is an exploded view of an encapsulated mat that utilizes a flat core construction, with the encapsulation artificially separated into upper and lower portions to illustrate its position about the core construction.

FIG. 40 illustrates these additional embodiments of the invention. The encapsulation for the mat 1900 is shown in two artificial sections, namely an upper portion 1905 and lower portion 1910 which are used to surround and encapsulate core construction 1915. For this embodiment the core construction 1915 is shown as a plate or sheet. The material for this plate or sheet can be any one of those mentioned herein including engineered wood, steel or other metals, or a reinforced thermosetting resin (e.g., reinforced with glass or other known material to provide increased strength). The sheet or plate has sufficient properties to provide strength and rigidity to the mat. The sheet or plate may include positioning pins or cones so that it would be properly placed in the mold after the mold is provided with the rubber crumb particles. Space is provided for the boards 1955, 1960, 1965 on the lower portion 1910 of the encapsulation that provide interlocking and openings 1970 are provided for attachment of lifting elements.

The upper and lower surfaces of the mold would be provided with protrusions that impart drain channels 1975 into the top and bottom surfaces of the encapsulation. Unlike the mats of the other embodiments, the upper and lower surfaces are actually made of elongated strips of cured polyurethane matrix/rubber crumb rather than a coating over the boards or elongated members for the core construction. These strips, which are in reality formed when the resin is introduced into the rubber crumb particles, can be as thick as 2 to 4 inches on each of the top and bottom services and of the same length as the elongated members of an upper or lower ply of a three ply wood mat. These strips of course require much more rubber crumb than in the other embodiments where the encapsulation is in effect a coating over a three layer mat.

Instead of linear drain channels 1975 as shown, the mat surfaces can be prepared with different configurations that provide recessed areas for drainage of water for better traction of vehicles or personnel that move upon the mats. These drain channels can be linear in parallel arrangement as shown or additional drain channels can be provided at 90 degree or other angles to the parallel channels. As the core construction is flat, the raised crumb rubber portions can be provided as segmented shapes of other than rectangles, such as triangles or other polygons. The shapes can take the form of raised or recessed letters, numbers, writing or other combinations of alphanumeric characters. Alternatively, the surface can be provided with grit, particles or other granular material that would provide a more slip resistant surface. All of these provide better traction when personnel or equipment are moving upon the mat.

Figure 41:
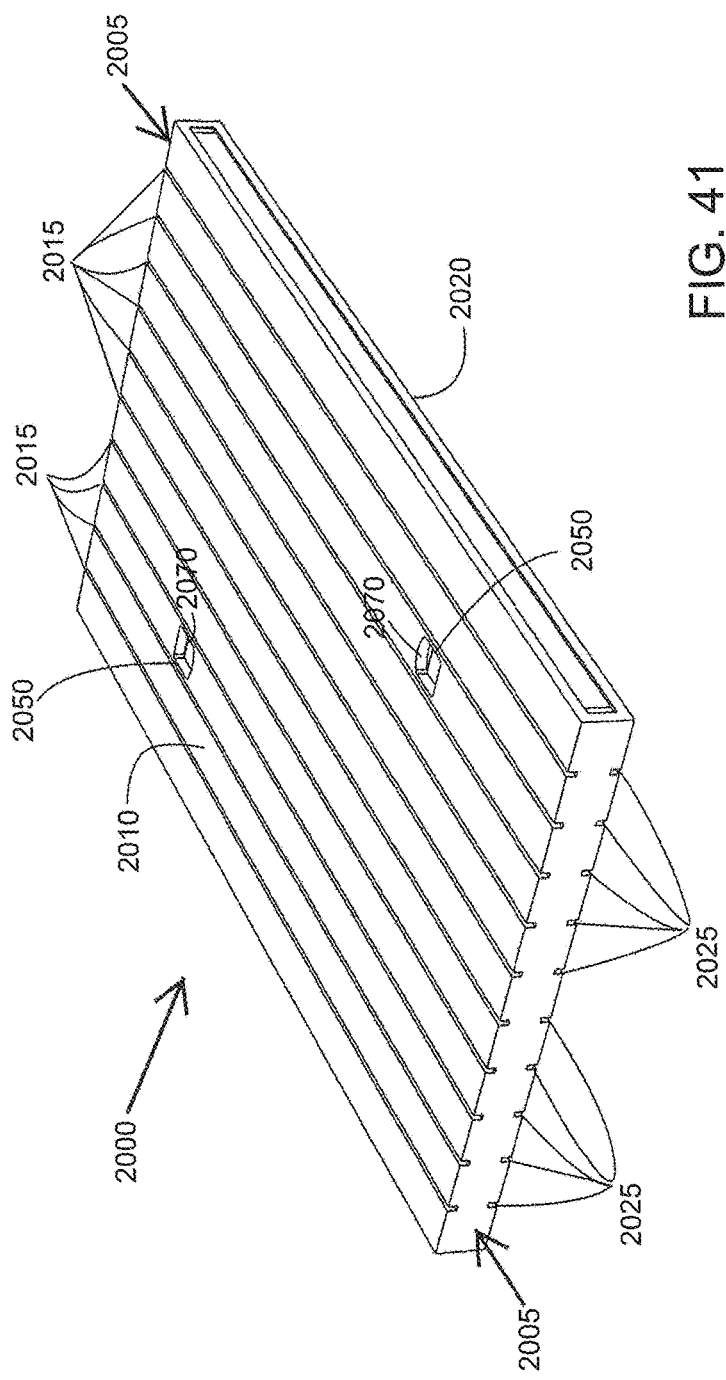
FIG. 41 illustrates another embodiment of an industrial mat according to the invention.
Figure 42:
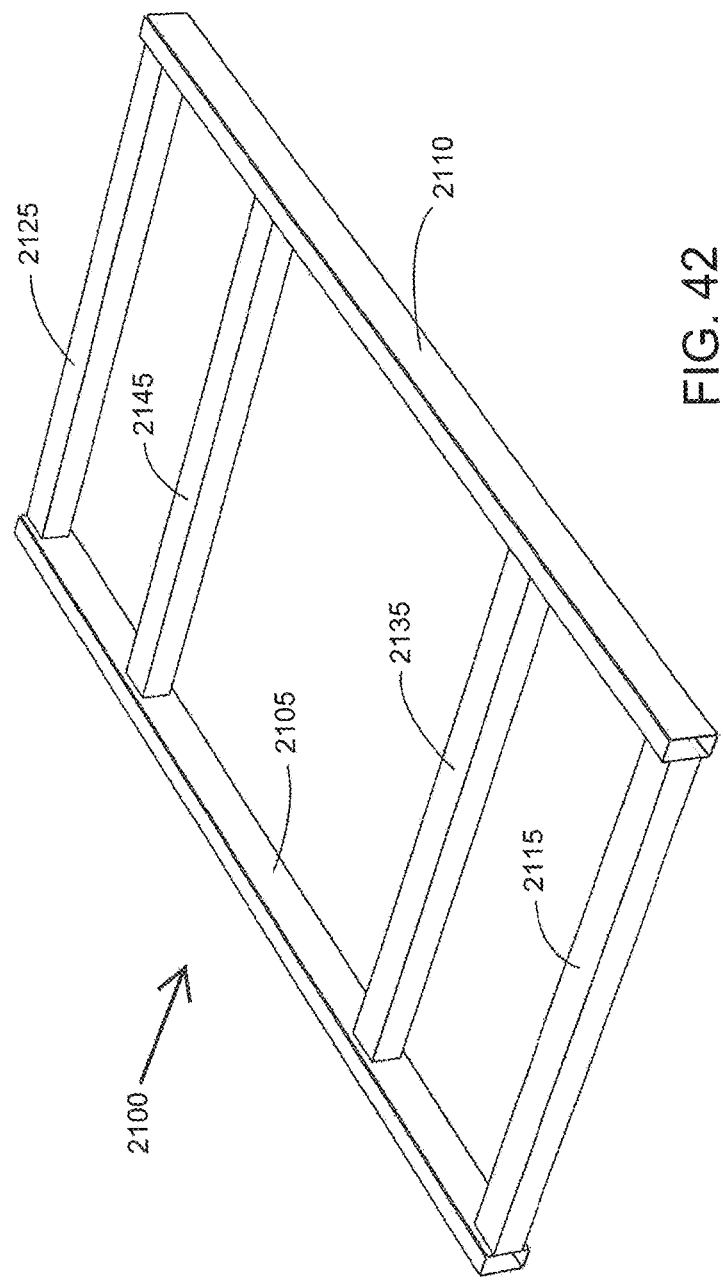
FIG. 42 illustrates a core structure for the mat of FIG. 41.

FIGS. 41 to 47 illustrate an additional encapsulating material that is used to encompass the entire mat including any spaces therein to form the encapsulated mat. FIGS. 41 and 42 illustrate a preferred embodiment of the invention wherein an industrial mat 2000 is shown that includes therein a frame 2100 that is provided as a core structure and which is enclosed within an encapsulating structure 2005 of a plastic material. As noted herein, the frame 2100 provides the strength and backbone of the mat while the encapsulating structure 2005 provides environmental resistance and protection of the frame and core. Any of the frames, cores, or structures disclosed herein can be encapsulated by the plastic material. Also, an elastomeric material can be used as the encapsulating structure in place of the plastic material, The encapsulating structure 2005 can be made of a variety of materials as noted herein. A wide range of thermoplastic, polymeric, thermosetting or elastomeric materials as disclosed herein can be molded or cast to the desired size and thickness of the mat. The encapsulating structure is typically molded as a unitary structure around a strength or support core. These materials can also be provided with conventional fillers to increase weight and hardness. They also can be reinforced with particulates, fibers such as glass, fabric or metal screening or scrim to reduce elongation and provide greater rigidity.

The top 2010 and bottom 2020 surfaces of the mat are also provided with drainage channels 2015, 2025 which are generally rectangular in shape and which typically have a width of 1.25 inch and a depth of 1 inch. It is of course also suitable to use U-shaped channels.

FIG. 41 also illustrates lifting elements 2050 on the upper surface of the mat. These lifting elements 2050 are configured as D shaped rings which are attached through the encapsulation to cross-members in recesses 2070 so that the lifting element 2050 can remain flat when the mat 2000 is in use. Two lifting elements are shown but a skilled artisan can determine how many elements are needed for lifting of any particularly sized mat. If desired, lifting elements can also be provided on the boards attached to the lower surface of the encapsulation for versatility in the handling and transportation of the mat.

The core structure is preferably configured as a frame 2100 as shown in FIG. 42. This frame 2100 includes side members 2105 and 2110 which can be made of any one of a number of different materials. In one embodiment, side members are rectangular tubes made of metal such as steel or of an FRP pultrusion. The open areas of the tubes can be filled with additional material such as a polyurethane foam, sand, rubber crumb or other particulate material to provide additional support to the tube or weight to the mat. These side members 2105, 2110 are configured and dimensioned to provide sufficient strength to the sides of the mat and to resist forces imparted thereto when moving the mat or when heavy equipment is driven over the sides of the mat. Alternatively, these side members may be made of a solid material instead of a tube, with wood or engineered wood being preferred for this alternative. And as noted herein, the top, bottom and outer side portions of the side members are provided by a predetermined thickness of at least 0.25 or 0.5 inch to as much as 5 inches of the material of the encapsulating structure.

In certain embodiments, however, the thickness of the encapsulating material on the side and cross members can be as little as 0.125 inch to as much as 0.6 inch, especially when polyuria or polyurethane is used as the encapsulating material. Greater thicknesses, while not undesirable, are simply not necessary and add additional cost without additional benefits for that material.

The frame 2100 also includes a plurality of cross members which provide structural support for the side members. These cross members may also be made of rectangular tubes of metal such as steel or of an FRP pultrusion or of wood or engineered wood. Specifically, the forward end of the mat includes cross member 2115 while the rear portion of the mat includes cross member 2125 forming a generally rectangular frame. Additional cross members 2135, 2145 may be provided within the rectangular frame depending upon the size of the mat to provide additional reinforcement to the side members to form a more robust core structure that provides overall strength to the mat. The number of cross members depends upon the size and thickness of the final mat.

The cross members preferably are made of a material that is the same as that of the side members 2105, 2110 to facilitate formation of the frame by joining similar materials together, but it is also possible for the cross members to be of a different material. When different materials are used, the cross and/or side members are configured in a way that would allow their connection by bolting to form the frame. For example, the cross members can be provided with separate L-shaped flange members at each end so that one part of the flange is bolted to the cross-member and the other end is bolted to the side member. Of course, many other arrangements can be made by skilled artisans using good structural engineering practices and all are considered to be included in the scope of the present invention.

The frame can be made of steel, wood, engineered wood or fiberglass reinforced plastic in the form of beams or tubular structures. When the frame is made of tubular structures, those structures may be filled with a reinforcing material that provides strength or reinforcement. Also, the frame can include elongated members therein to fill in a portion of the space between the side and cross members of the frame. These elongated members can be made of wood, engineered wood, end grain wood or open or filled thermosetting pultrusions, or a particulate filler of recycled rubber tire material, sand, gravel, earth or combinations thereof.

As shown in FIG. 42, the side members of the mat have a greater height than the cross members. Thus, the cross members are connected so that they are positioned in the center of the side members, with space provided both above and below the cross member so that the side members are taller than the cross members on both the top and bottom of the mat. This arrangement provides space for the channels 2015, 2025 in the upper 2010 and lower 2020 surfaces of the mat shown in FIG. 41 so that they do not contact the cross members and expose them to the elements during use of the mat. In fact, the encapsulating structure 2005 provides a thickness of at least 0.25 inch and preferably 1 inch around and about all surfaces of the frame members.

When the frame members are made of steel, they can be simply welded together to provide the frame structure. Of course, if the frame members are made of FRP, they would be molded together or adhered together to form the frame structure of the mat. The plastic of the FRP pultrusions would be any one of the thermosetting plastics of the types mentioned herein but thermosetting polyesters and epoxies are preferred. When the frame members are made of wood, they can simply be bolted or riveted together. As noted herein, when different materials are used for the side and cross members it is also possible although not preferred to provide these members with an appropriate structure so that they can be bolted together.

The encapsulating structure is provided in any way that fills in all open spaces of the frame structure as well as to provide the desired thickness on the top, bottom and outer side of the side members and the outer sides of the front and back cross members that form the frame. This can be done by placing the frame structure in a mold and providing the encapsulating material within and upon the frame as it sits in the mold.

Alternatively, the encapsulation can be provided in other ways, including but not limited to immersion coating of the entire core construction or by painting or otherwise depositing encapsulation material to completely encapsulate the core construction. The encapsulating material is typically a thermoplastic polymer, a thermosetting resin or an elastomeric material. For example, the entire core construction can be filled and coated with any of these materials to form a solid unitary mat structure.

Figure 43:
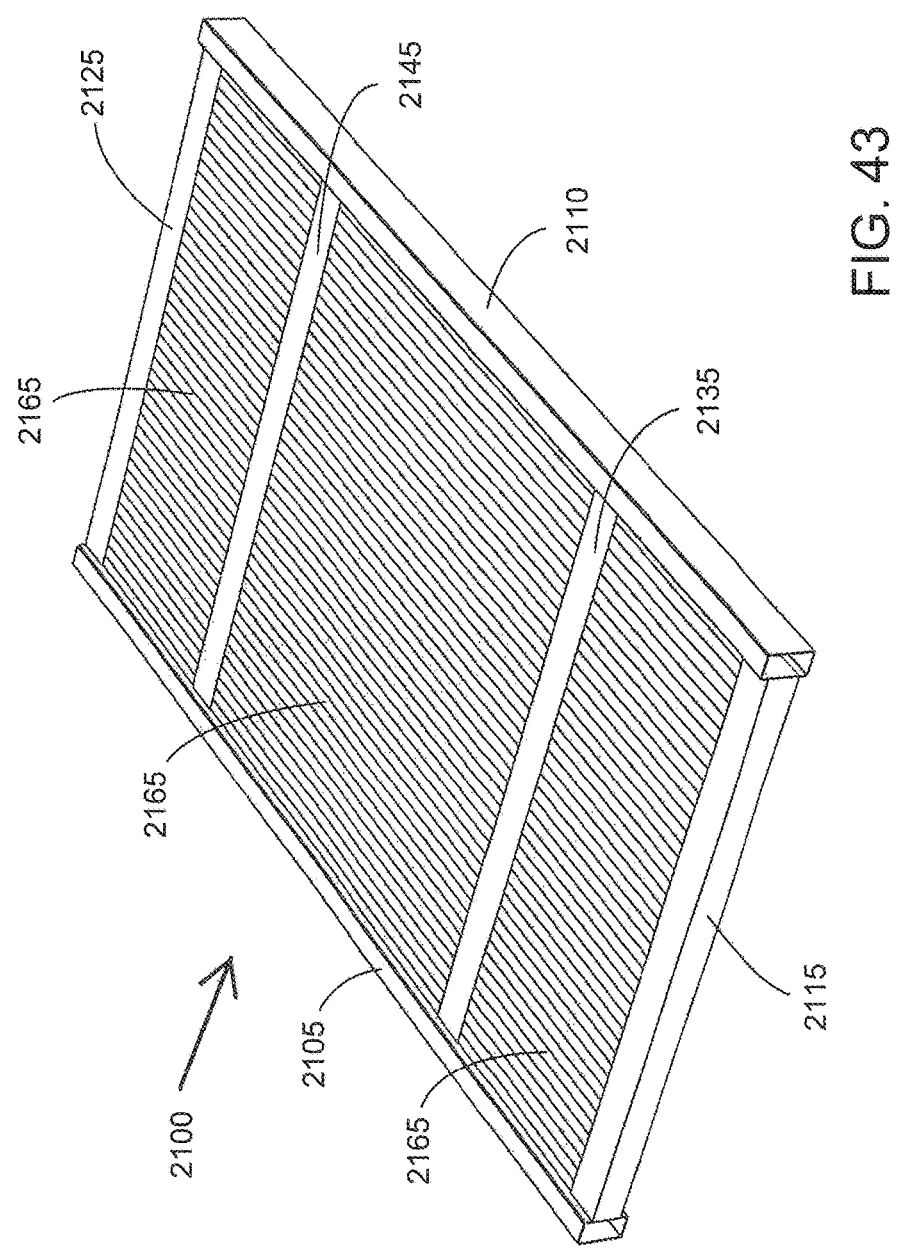
FIG. 43 illustrates the use of elongated members to fill in the open space of the core structure of FIG. 42.

FIG. 43 illustrates a variation of the invention that utilizes less plastic or elastomeric material to form the encapsulating structure. In this embodiment, the open areas of frame 2100 of FIG. 42 are filled with elongated members 2165 as shown in FIG. 43. These elongated members can be made of any of the materials disclosed herein, including wood, engineering wood, or FRP structures. Metal members can be used but these generally are more expensive than the other members mentioned in this paragraph and provide more strength that is necessary for the frame. Typically, wood members are used with treated pine being preferred from a cost standpoint. End grain wood sections can be provided for greater strength. Although these members are shown arranged to be perpendicular to the side members and wedged between them so that they are maintained in place during the application of the encapsulating material, these members can instead be oriented parallel or both parallel and perpendicular to the side members if desired. Also instead of wedging the boards in place, the can be bolted or adhered together before being bolted or adhered to the side members. Thus, when the encapsulating material is added it does not need to sill in the otherwise open spaced between the side and cross members.

Alternatively, it is also possible to use a plate, sheet or mesh upon the upper and lower surfaces of the cross members so that foam, particulate matter, small particles of plastic or rubber including rubber crumb can be added to the areas between the plate, sheet or mesh to fill in those areas. When a mesh is used, this generally allows the encapsulating material to penetrate into those areas and fill in any interstices between the particles and form a completely solid mat which is a preferred arrangement of the present invention. Also, the use of metal plate or sheet, for example, with the appropriate number of cross members enables the center areas of the core structure to remain open without reducing the compression strength of the mat. Typically, the sheeting may be plywood, plastic, metal or composite material, and can be attached to the mat by bolting or by an adhesive. The sheeting and core can be maintained in position be being encapsulated. For a more secure attachment, holes for the bolts can be drilled through the plate or sheeting to facilitate assembly by allowing passage of the bolts therethrough.

All of the mats according to the invention are to be installed on properly prepared ground so that they will perform acceptably. Ground preparation must be on a uniform material of uniform flatness (i.e., within +/−12" over an 8'×14' surface). Crushed stone or rock no larger than 4" diameter is acceptable for preparing the ground as a substrate for supporting the mats.

All mats according to the invention are designed to meet the following product specifications for preferred implementations as temporary roadways, equipment support surfaces, platforms and similar applications. The mats of the invention do not cause contamination of the ground surfaces upon which they are applied.

Figure 44:
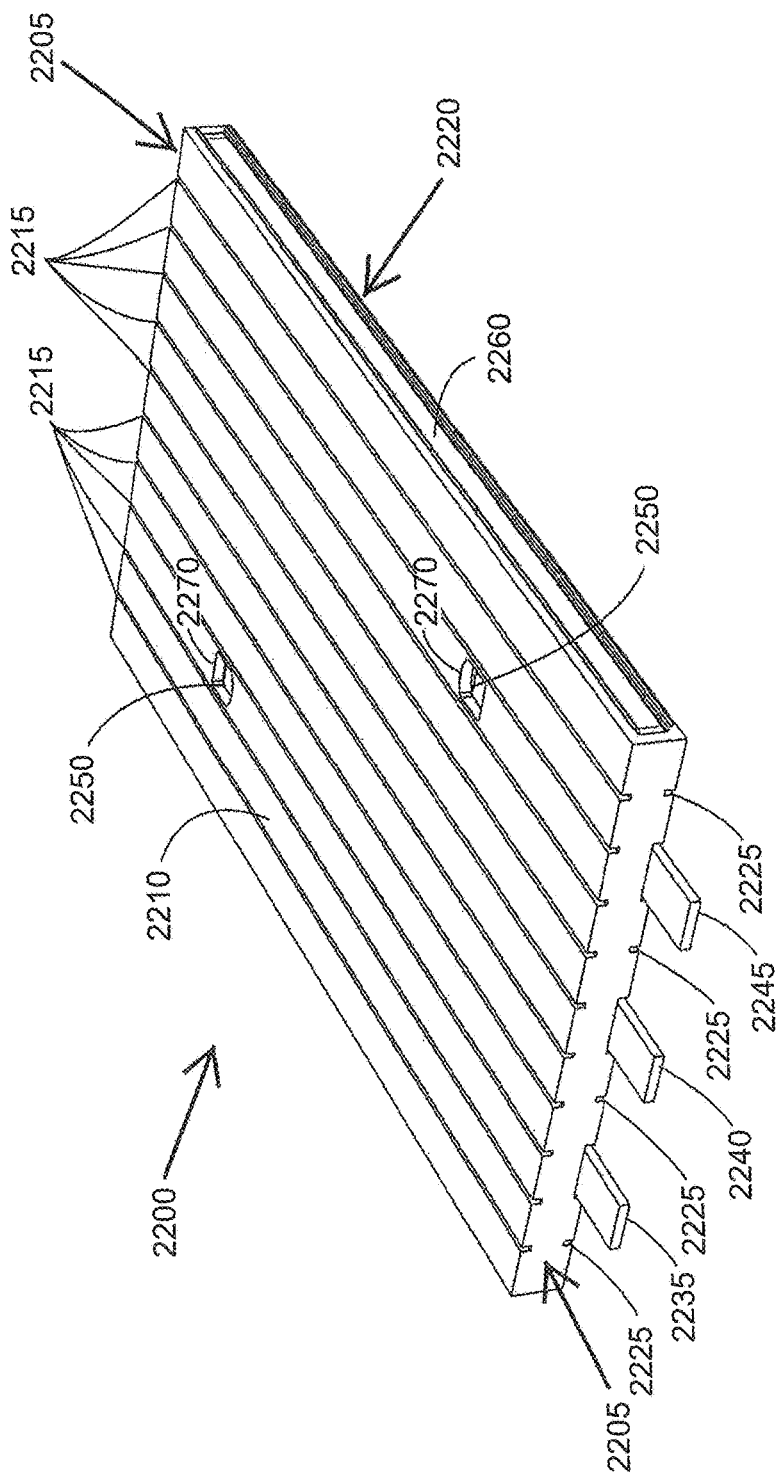
FIG. 44 illustrates another embodiment of an industrial mat according to the invention.

Preferred overall mat dimensions are approximately 8' wide×6" tall and are either 12 ft, 14 ft or 16 ft in length. The interlocking feature will extend the length of the mats by about 1 ft at three locations at one end of mat. These are also shown in FIGS. 44-45 herein, wherein another preferred mat 2200 is illustrated.

Mat 2200 is configured in the same way as mat 2000 and core structure 2100 in FIGS. 41 and 42 except that mat 2200 includes additional features that provide performance benefits.

One feature is the use of the interlocking boards on the bottom surface of the mat. These interlocking boards 2235, 2240, 2245 are typically made of wood and are bolted to the mat because they provide good wear resistance but if damaged or broken, they can be easily removed and replaced so that the mat can continue to be used in service without having to provide a new encapsulated core structure.

Figure 45:
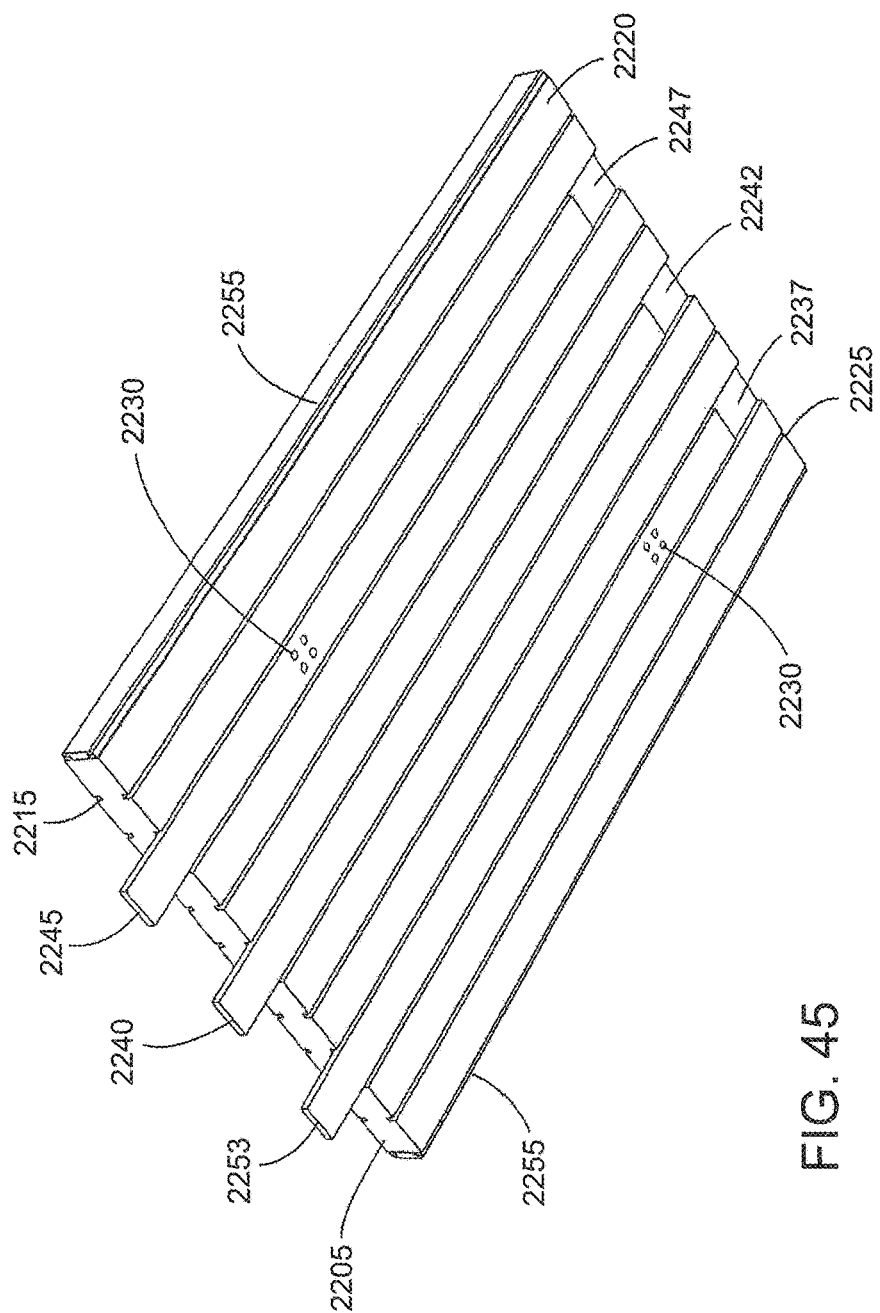
FIG. 45 is a bottom view of the mat of FIG. 44.

To provide the interlocking structure, as best shown in FIG. 45, recesses are provided on the bottom surface of the mat. These recesses 2237, 2242, 2247 are slightly wider than the width of the interlocking members 2235, 2240, 2245 that are to be bolted to the mat using bolts 2230. As shown, the interlocking members are typically boards of wood or other materials that are disclosed herein that have the same length as the mat but are offset to provide a stick out portion on one end and an open recess on the opposite end. Thus, the stick out portion of one mat can be received in the open recesses of an adjacent mat so that the two mats can be interlocked together.

The number and size of the interlocking boards is not critical to the invention and typically, at least two or three boards (as shown) are provided. The width of the boards can be between 4 and 8 inches or in some cases larger or smaller as desired depending upon the overall size of the mat. For an 8 foot wide mat, the use of three or four 4 inch wide boards or alternatively three or four 8 inch wide boards would be suitable. In some situations, a lesser number of wider boards or greater number of less wide boards can be used. And as noted, the boards can be made of different materials such as wood, engineered wood, or an FRP pultrusion as long as it is possible to bolt or otherwise securely attach those boards to the mat. Bolting of course is preferred since it will allow replacement of the boards if they become damaged or deteriorated during use. The bolts can be provided as an extension from a cross member. In particular, when the cross members are made of metal, the bolts can be welded to the cross member and the boards can be attached to the mat by nuts which are secured to the bolts after the bolts pass through the boards.

The recesses that are provided on the bottom surface of the mat are as deep as necessary to accommodate the thickness of the boards. Typically a one or two inch thickness is sufficient with the recesses sized correspondingly. The recesses are not so deep as to contact the cross members and as noted the thickness of the encapsulation would be at least 0.25 or 1 inch on the cross member as well as beneath the boards. Appropriate configuration of the cross members is needed to achieve the overall tolerances and sizes of the mat and encapsulating structure thickness.

Figure 46:
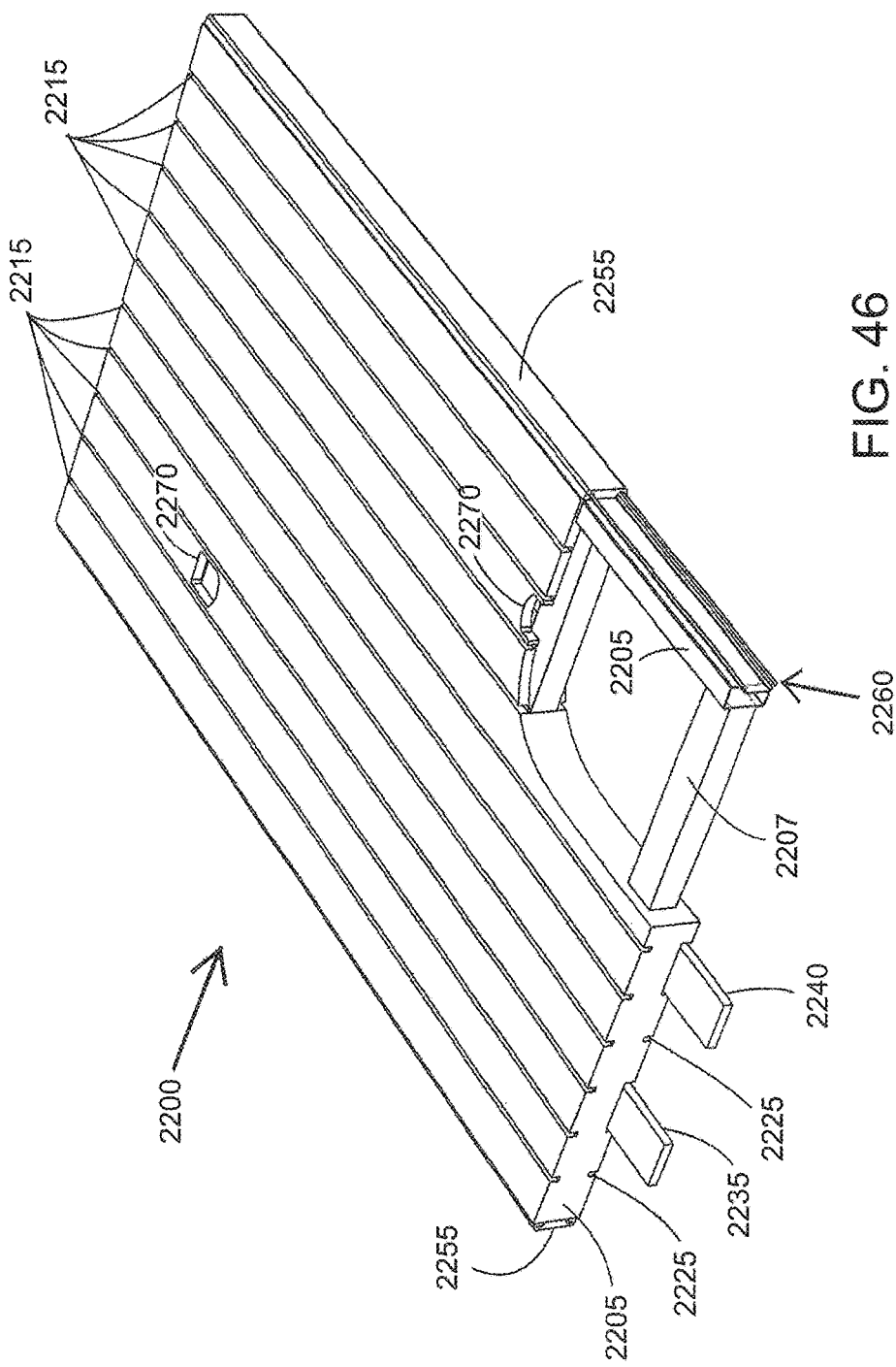
FIG. 46 is a view of the mat of FIG. 44 with a cut-out portion to show the construction of the core structure and its location within the encapsulating structure.
Figure 47:
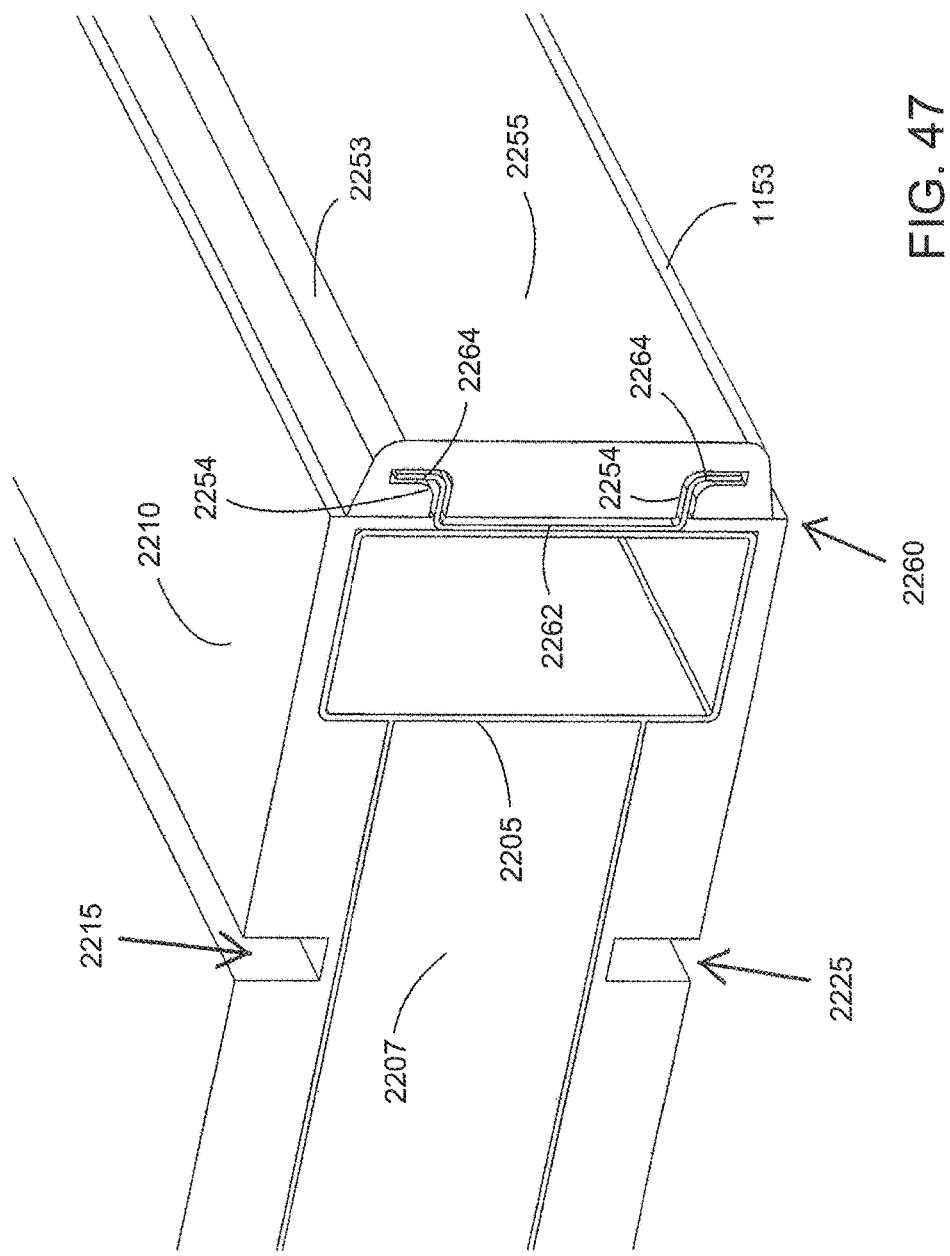
FIG. 47 is an enlarged view of the core of structure to show the details of the bumper support that is attached to the core structure.

FIGS. 44 to 47 also illustrate an additional feature of the invention in the form of a connector element 2260 that is used to mount a bumper member 2255 onto the mat to provide additional abuse protection to the sides of the mat. As best shown in FIGS. 46 and 47, the connector element 2260 has a base portion 2262 that is attached to the side member. When the side member is steel, the base portion 2262 can be made of metal and welded to the metal side member. If the side member is made of a different material, the base portion 2262 can be attached by bolting, nailing or riveting. Attaching the base portion by welding is preferred as is the provision of all frame members to be made of a metal with steel being the optimum material.

Base portion 2262 includes L-shaped arm members 2264 at each end. These arm members are received in a correspondingly shaped slots 2254 in bumper member 2255. The bumper member 2255 is typically made of a resilient and durable plastic material, such as high density polyethylene so that it can withstand shock or impact as the mats are being moved into position or transported to a job site and installed at the appropriate location. The L-shaped slots 2254 of bumper member 2255 extend along the entire length of the bumper member. Thus, for installation, the bumper member is slid onto the side member of the mat with slot members 2254 for engaging arm members 2264 of connector member 2260. End clips, screws or bolting can be used to maintain the bumper member in position and prevent its unintended removal from the mat by sliding off the arm members 2264 while also allowing slight movement for expansion and contraction of the mat.

Alternatively, the bumper members can be directly attached to the side members by bolting. Whatever type of attachment means are used it must be recognized that the bumper members will experience the greatest impact and abuse during movement of the mat and for this reason they may become damaged and require replacement. Thus, any mechanical connection of the bumpers to the mat must be one in which the bumpers can be relatively easily removed and replaced when necessary.

FIG. 46 also shows the cross-section of the mat by the cut out portion on the lower right corner. The open space is shown as being filled by the encapsulating material 2205 but that the space is relatively large and requires quite a bit of material to be filled into those open spaces of the mat. This is why the construction of FIG. 43 is preferred since the inclusion of additional members or filler into those spaces greatly reduces the amount of plastic or elastomeric material that would be needed to form the encapsulating structure.

FIG. 46 also shows that the connector element 2260 can be welded to the side member prior to encapsulation of the frame. In doing this however the encapsulating material is molded so that it does not extend over the arm members 2264 of connector element 2260 as those need to be exposed to receive bumper element 2255.

FIG. 47 also shows the drainage channels 2225 that allow water to drain from the mat during use.

In certain specific applications, the upper surface and possibly the lower surface of the encapsulation structure can require additional layers for further extending the service life of the mat. To attach these additional layers, the cross and side members can be provided with appropriate bolting that extends through the encapsulating structure and allows attachments of the additional layers.

These optional additional layers generally include two (2) layers of individual wood or composite boards, having cross section dimensions of 1.75" by 8". These can both be on the top side of the mat or one layer can be on the top side and one on the bottom side so that the additional layers form the outer layers of the mat. The members of the additional layers would generally be joined together by bolting, nailing or riveting if made of wood or by other attachment means such as adhesives if made of FRP. They are also attached to the mat in a way that facilitates their replacement if damaged during use, with bolting again being the preferred method of attachment.

FIGS. 48 to 51 illustrate a crane mat 2300 comprising a plurality of a plurality of longitudinal beams 2305, 2310, 2315, 2320 that are positioned in a side by side arrangement.

If desired, the mat can include metal plates located between one or more pairs (or between all pairs) of beams with the metal plates being essentially the same height and length as the beams. Each of the beams has a plurality of spaced lateral apertures passing therethrough, with the lateral apertures being in alignment to form bores through the mat, with each bore receiving a lateral rod. One such aperture 2325 is shown with the lateral rod 2330 passing therethrough and locked in place by a nut 2335 to hold the beams together in the side by side arrangement.

The mat is provided with at least two lifting elements each located in an opening in one of the beams, typically at each end of the mat. Alternatively, for wider mats, two spaced lifting elements can be provided at each end of the mat. Each lifting element 2340 is in the configuration of an eyelet. The lifting element 2340 has a body 2345 with a first end thereof 2350 connected to the lateral rod 2330 and a second end 2355 having grasping means 2360 for allowing a hook or connecting element of lifting equipment to engage the grasping means for lifting and manipulation of the mat. The grasping means 2360 is shown as an aperture in the second end 2355. The grasping means can also be a hook element or J- or L-shaped bar that can engage a mating connecting element on the lifting equipment.

The body 2345 is typically a flat plate that preferably has rounded corners but it also can be a bent or angled member that near one end has the necessary aperture to receive the lateral rod therein for attachment to the mat, and on the opposite end includes the aperture or other grasping means. In some cases, a chain or cable can be used instead of the flat plate with the chain or cable passing around the rod and out of the aperture to be engaged by the lifting equipment. The flat plate is preferred because it is more compact and thus requires a smaller hole than a chain or cable. The opening 2375 is configured and dimensioned to hold and maintain the lifting element 2340 in the opening 2340 in a first retracted position as shown in FIG. 50 when not in use and to allow retrieval and removal of the second end 2355 of the lifting element from the opening 2375 to a second operative position that exposes the grasping means 2360 when the mat is to be lifted or manipulated, as shown in FIG. 48. FIG. 49 illustrates the second end 2355 of the lifting element in a position of movement between the first and second positions. The opening 2375 is either positioned at an end of the mat so that it is open at that end as shown or has a sufficient volume to allow a user to reach therein to grab and move the second end 2355 from the retracted position to the operative position.

Generally, one lifting element is located on a lateral rod nearest one end of the mat and another lifting element is located on a lateral rod nearest the opposite end of the mat. It is also possible to utilize four lifting elements, two on the lateral rod nearest the first end of the mat and two other lifting elements located on a lateral rod nearest the opposite end of the mat.

Another variation of this embodiment is to prepare a mat similar to what is shown in FIGS. 48-51 but with the addition of an encapsulation about the longitudinal beams. As a skilled artisan would know the openings 2375, 2385 for the lifting elements would be masked or otherwise protected from the encapsulation so that they will remain open in the final article. The remainder of the mat, however, would be encapsulated with a plastic or elastomeric material and preferably with a crumb rubber/urethane coating or other encapsulation as described herein to provide further impact and abuse resistance to the crane mat, as well as to prevent deterioration of the beams or timbers. This also allows the beams and timbers to be made of pine or other softwoods rather than oak or hardwoods to reduce the cost of the timber materials. And to enhance the strength of the mat, the mat can include metal plates located between one or more pairs (or between all pairs) of beams or timbers with the metal plates being essentially the same height and length as the beams or timbers.

FIG. 51 illustrates a variation of the location of the lifting element shown in FIGS. 48-50. Elements which are the same as in FIGS. 48-50 are designated with the same reference numbers as in FIGS. 51, 51A, and 51B. In these figures, the lifting element 2340 is spaced from the end of the mat by a few feet, e.g., 1 to 3 feet. To provide access to the lifting element 2340, the opening 2385 in which the element resides is elongated so that it extends from the point where the lifting element 2340 is present all the way to the end of the mat. This provides access to the lifting element to remove it from its retracted position, which is shown in FIG. 51B, to an operative position as shown in FIG. 51A. Again, the lifting element 2340 has one end attached to joining bar 2330 which joins the beams together and which allows the lifting element 2340 to pivot between those positions.

And although the opening 2385 is illustrated as being much longer than the length of the lifting element, it is also possible to simply widen the opening about the retracted lifting element rather than have a thinner opening that extends to the end of the mat. The configuration of the openings 2375, 2385 should simply be sufficient to allow an operator to be able to reach in and grab the lifting element to raise it to its operative position. When the opening is placed further back in the mat, it should be widened to allow the hand of the operator to reach into the opening. And while the lifting element operates in the same way as in FIGS. 48-50, the opening is simply made slightly larger so that a worker may reach into the opening to pull up the free and of the lifting element 2340 to engage a hook or other part of a lifting device.

Figure 54:
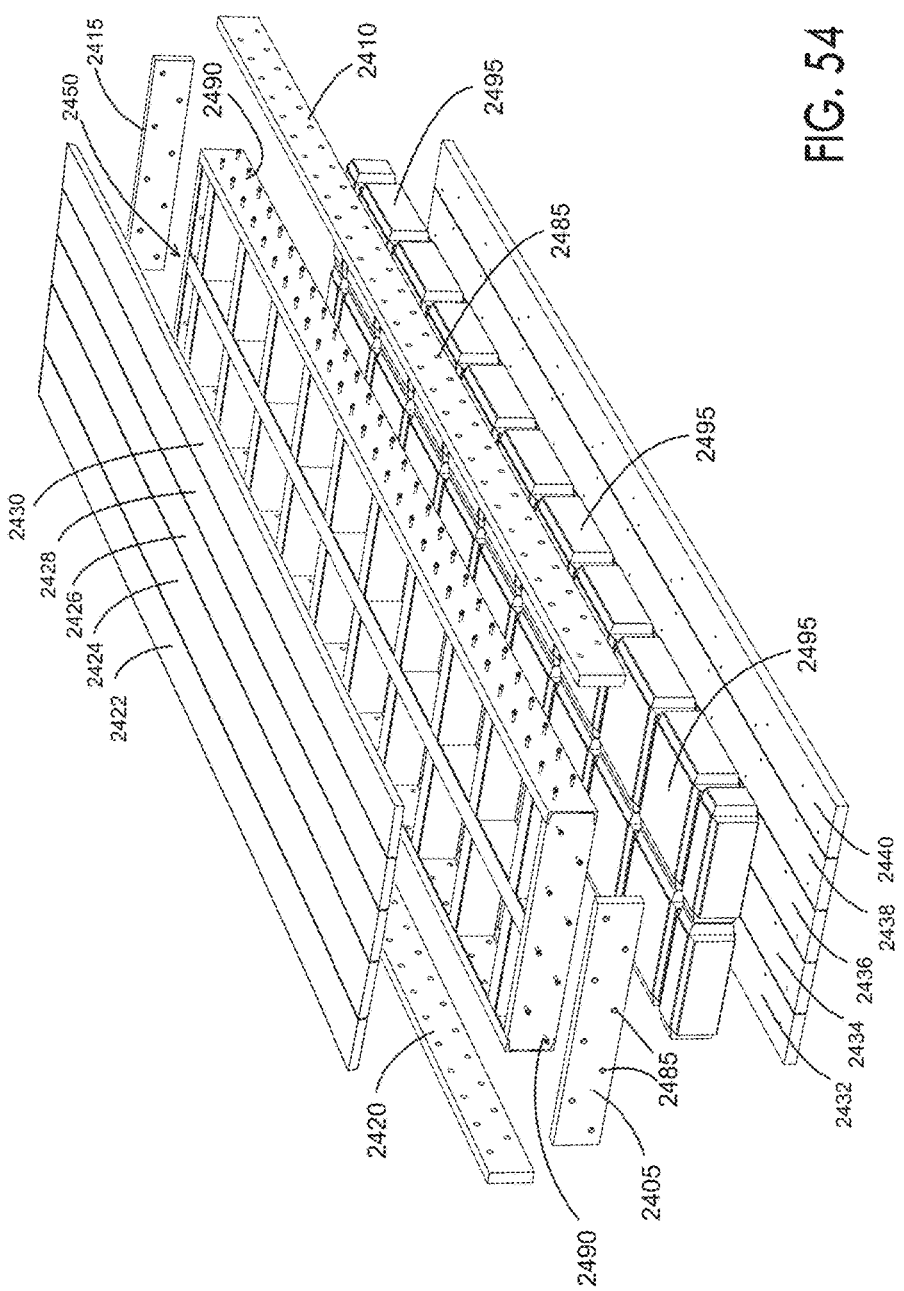
FIG. 54 is an exploded view of the components of the crane mat of FIG. 52.

FIGS. 52-54 illustrate another embodiment of the invention in the form of another crane mat 2400. This mat includes an internal frame structure 2450 that is preferably made of steel but that could be made of a thermosetting plastic material, preferably one that is reinforced, in order to obtain similar performance results. The steel frame 2450A or 2450B includes a first longitudinal member 2455 and a second longitudinal member 2460. These are connected by end members 2465 and 2470. Frame 2450A may be rectangular in shape as shown in FIG. 53A while for additional strength, frame 2450B preferably includes a center beam 2475 as shown in FIG. 53B. For either construction, a plurality of cross members 2480 are provided for connecting the sides 2455, 2460 to the center beam 2475 as shown in FIG. 53B or to connect the sides 2455, 2460 to each other as shown in FIG. 53A. The side and end members 2455, 2460, 2465 and 2470 of the frame include a plurality of bolting elements 2490 which are configured to match the holes 2485 of the side and end members to facilitate attachment of those external components to the frame.

The external components include first and second elongated side members 2410, 2420, first and second elongated end members 2405, 2415, an upper layer comprised of additional elongated members 2422, 2424, 2426, 2428 and a lower layer comprised of additional elongated members 2432, 2434, 2436, 2438. The upper and lower layers provide the top and bottom surfaces of the mat.

The first and second side and end elongated members for the mat may be made of any one of a variety of the materials disclosed herein. In particular, the elongated members may be boards made of wood, engineering wood, or of a thermoplastic, thermosetting plastic or elastomeric material. Combinations of such materials can also be used with the plastic or elastomeric materials being provided as a coating on a wood or engineered wood board. And as noted herein, recycled plastic materials can also be extruded into boards that can be used for these components.

Alternatively, the upper and lower layers can be made of a single member, such as a plate or sheet of such materials. The exact material to be used would be determined by a skilled artisans who is designing the mat for a particular end use application. When the frame and core are made of a metal such as steel or aluminum, the upper and lower layers can be made of sheets or plates of the same material so that the mat can be assembled by welding or brazing of the upper and lower layers to the frame.

The frame structure of the core 2450 as shown has various open spaces therein. For certain end use applications these spaces can be left open so that the overall weight of the mat is lessened. In other applications, however, the open spaces within the core structure are filled with other materials as disclosed herein for other mat constructions. In particular, wood boards or blocks 2495 as shown in FIG. 54 can be used to provide further weight and ruggedness to the mat. It is also possible to fill in these open spaces with plastic or elastomeric materials either as blocks, boards, foam, or even pellets. Sand, gravel crumb rubber or other particulate materials can instead be used. Of course, when particulate matter is used to fill in the open spaces, the upper and lower layers would need to be configured to retain the particulate matter therein, and this is easily achieved by providing those layers in the form of a sheet, plate, or board which is secured to the frame.

The configuration of the side and end members 2405, 2410, 2415, 2420 can be made as shown in FIG. 52. There, the elongated members of the upper and lower layers extend over the side and end members. Alternatively, the elongated members of the upper and lower layers can instead be configured to extend over the end members, while the side members extend both above and below the frame to provide side protection to the boards of the upper and lower layers. Of course, the side and end members can be configured to extend both above and below the frame to provide side and protection to the elongated members of the upper and lower layers. And the end members can instead be configured to be taller than the frame so that they protect the front and rear ends of the elongated members of the upper and lower layers while the elongated members of those layers extend over the side members. The particular configuration of the side and end members can be designed for any particular application and it is also possible for it to be varied on different mats in order to best protect the edges between the upper or lower layers and the side and end members.

The upper and lower elongated members can be attached to the frame or cross members by being provided with holes similar to holes 2485 and bolting that is similar to bolting members 2490 which extend from the frame or cross members. Joining the components in this manner provides a very secure construction.

And in additional embodiments, the side and end members can be omitted. This is particularly useful when the upper and lower layers are steel plates as an entire welded steel frame is provided with steel plates for the upper and lower layers.

And another variation of this embodiment is to prepare a mat similar to what is shown in FIGS. 52-54 but with the addition of a encapsulation about the entire construction or alternatively, about only the frame and with the side and end members attached to the encapsulation longitudinal beams. The encapsulation material would again be a plastic or elastomeric material and preferably with a crumb rubber/urethane coating or encapsulation as described herein to provided further impact and abuse resistance to the crane mat.

A number of additional features may be provided in any of the mats of the present invention. A radio frequency identification (RFID) tag can be embedded into the access mats in a routered pocket in the core construction to enable the access mats to be monitored in an inventory system or when rented for use. The tag provides a unique identification serial number for each mat, such that the mats which are being used or rented can be tracked and accounted for as to location of use. The mats can be scanned when in a warehouse, when loaded on trucks for delivery, when delivered to a job site, or when collected from a jobsite after use. The RFID tags can be active or passive and if desired, other tracking devices such as barcodes could similarly be for the same purposes. It is preferred, however, that the RFID tag be embedded in the mat so that it is protected from damage by the skin that encapsulates the mat. When a barcode or other surface mounted tag or indicia is used, it should be placed on a surface portion of the mat that is less likely to experience wear or abuse. Thus, the tag may preferably be applied onto the side of the mat so that it is not directed exposed to traffic on the mat.

In order to manipulate the mats for loading/unloading, or moving from one location to another or for installation and retrieval, the mats can include a retractable lifting element. This can be the lifting elements described above and those elements lie in a recess in the top surface of the mat during use for ease of access and to prevent tripping or damage to items moving over the mat or damage to the lifting elements themselves. Alternatively, a more complicated design such as that of US patent publication 2008/0292397 can be used.

And while for some embodiments the drawings show the lifting element to be well below the surface of the mat, in practice, the open space above the lifting element should be minimized so that the lifting element helps form part of the surface of the mat. This prevents tripping or stumbling by workers who step onto the opening when moving across the mat surface.

As noted herein, to assist in the use of the mat during the night or on days that are dark due to poor weather conditions, the mat may include one or more lighting elements, such as those disclosed in International application WO 2006/048654. For an encapsulated mat, these lighting elements would preferably be embedded in the skin. The skin can be provided of clear plastic, so that the lighting element may be positioned below the skin for better protection of the lighting element during use. As the embedding of the lighting element below the skin surface can result in reduced luminosity, a skilled artisan can best determine the appropriate location for the placement of the lighting element in or under the skin and for providing the skin of the appropriate color or clarity to achieve the desired lighting brightness. This can also be adjusted by providing a larger number of lighting elements or of lighting elements of larger size.

Another feature of the invention is the use of color coding to identify the specific layers that are used in the construction of the mat. This can also be used to identify mats for a particular customer or end user. When mats are rented or leased, the color coding can be used to identify which mats belong to the leasing company compared to mats provided by others. The color coding can be of a single color or of certain stripes, patterns, dots or other indicia that provides a "signature" that identifies the specific support structure that is present in the mat or a particular end user or owner of the mat.

The preferred crane mats of the invention may be 2' wide to 12' wide with all mat components being square or rectangular timbers or beams/bumper members connected together by the lateral rods. Various mat thicknesses can be used from 2" to 24". And instead of single beams, boards or layers of boards can be used. In a preferred embodiment, oak or other hardwood beams can be used alone at those dimensions with the beams connected by the lateral rods although combinations of different materials can be used if desired. For any of these embodiments, at least two lifting elements are provided on the upper working surface with the base plate of each lifting element connected to one of the lateral rods. The lifting element would preferably be the T-shaped lifting elements described herein and be provided in a recess in one or more of the mat components. Intermediate steel plates can also be included between the beams if desired.

Additionally, the mats can be made of various combinations of components including frames of a metal such as steel or of a thermosetting plastic. The internal components in the frame can be beams, board or other structural shapes of wood, engineered wood, plastic or elastomeric materials. These can be of sizes that vary from width and height dimensions of about 2" by 2" to as much as 24" by 24". The interior timbers can be from 2"×2" up to 12"×12" or even 16" by 16". Generally, the various beams and mat components are square but rectangular shapes are also acceptable. Useful core thicknesses are 2", 3", 6", 8", 12" and 16" with the upper and lower protective boards making up the balance of the thickness of the mat. The upper and lower protective boards can also be provided in multiple layers rather than in larger thicknesses, and these are attached to the mat by the use of various fasteners that are generally known and used in the art. Bolting is preferred, however, as that allows any damaged beams or boards to be removed and replaced while the core of the mat is reused.

Therefore, in sum, it is to be realized the optimum dimensional relationships for the parts of the invention can include variations and tolerances in size, materials, shape, form, function and use are deemed readily apparent and obvious to the skilled artisan, and all equivalent relationships to those illustrated in the drawings and described in the specification are intended to be encompassed by the claims appended hereto.

Unless defined otherwise, all technical and scientific terms used herein have same meaning as commonly understood by one of ordinary skill in the art to which this invention belongs. Also, as used herein and in the appended claims, the singular form "a", "and", and "the" include plural referents unless the context clearly dictates otherwise. All technical and scientific terms used herein have the same meaning.

The foregoing detailed description is considered as illustrative only of the principles of the invention. Further, since numerous modifications and changes will readily be apparent to those having ordinary skill in the art, it is not desired to limit the invention to the exact constructions demonstrated. In particular, it would be understood that the various sizes, materials, configurations and arrangements disclosed herein may be combined and constructed in any way that is feasible to create a hybrid may for any particular end use. Accordingly, all suitable modifications and equivalents may be resorted to falling within the scope of the appended claims.

What is claimed is:

1. A crane mat comprising a plurality of longitudinal beams that are positioned in a side by side arrangement; each of the beams having a plurality of spaced lateral apertures passing therethrough, with the lateral apertures being in alignment to form bores through the mat; a plurality of lateral rods with each rod passing through each beam through the aligned lateral apertures to hold the beams together in the side by side arrangement; an opening provided in one of the beams or in and between adjacent beams and having a depth sufficient to expose a lateral rod that passes through the opening; a rectangular metal collar having side plates that extend into the opening but not to the depth where the lateral rod passes through the opening, and an upper plate that extends from the side plates and onto the respective upper and/or lower surfaces of the beam or beams surrounding the opening; and fastening means that removably attach the metal collar to the elongated members; wherein the opening is configured to receive, hold and maintain a lifting element therein in a first retracted position below the surface of the mat when not in use and to allow retrieval and removal of the lifting element from the opening to a second position that exposes grasping means when the mat is to be lifted or manipulated; and wherein the upper plate of the rectangular metal collar protects the surface of the beam or beams surrounding the opening.

2. The crane mat of claim 1, wherein the lifting element has a body with a first end thereof connected to the lateral rod that passes through the opening, and a second end having the grasping means for allowing a hook or connecting element of equipment to engage the grasping means for lifting and manipulation of the mat.

3. The crane mat of claim 2, wherein the first end of the lifting element includes a first aperture in the body which is configured and dimensioned to receive the lateral rod to allow the lateral rod to pass through the first aperture to attach the lifting element to the lateral rod, and the second end of the lifting element includes a second aperture in the body which is configured and dimensioned to receive the hook or connecting element when removed from the opening and placed in the second position.

4. The crane mat of claim 2, wherein the body of the lifting element is elongated and the first and second ends are arcuate to allow rotational movement of the second end about the lateral rod when the second end is to be rotated from the retracted position where the lifting element is oriented parallel to the beams to the second position where the lifting element is oriented perpendicular to the beams, wherein the opening is sufficiently large to provide space around or access to the lifting element to allow a user to grab the second end to rotate it about the lateral rod and out of the opening, wherein, when in the retracted position a side portion of the lifting element prevents a worker from stepping into the opening.

5. The crane mat of claim 1, which includes at least two openings each configured for receiving, holding and maintaining a lifting element therein, wherein one lifting element is located in an opening associated with a lateral rod nearest one end of the mat and another lifting element is located in an opening associated with a lateral rod nearest the opposite end of the mat, wherein the openings are spaced about 1 to 3 feet from the front or rear ends of the mat.

6. The crane mat of claim 1, wherein the beams have a width by height dimensions of between about 6 by 6 inches to about 24 by 24 inches and a length of between about 4 and about 60 feet, and are made of wood, engineered wood, or a thermosetting plastic material and optionally comprising metal plates located between one or more pairs of beams with the metal plates being essentially the same height and length as the beams.

7. The crane mat of claim 1, wherein each lifting element comprises a chain, a cable, a connector, an eyelet, a hook, a D-shaped member, a U-shaped member, or a ring, wherein each opening associated with a lifting element is configured and dimensioned to hold and maintain the lifting element therein in a first retracted position when not in use and to allow retrieval and removal of the lifting element portion from the opening to a second position that exposes the lifting element portion when the mat is to be lifted or manipulated.

8. The crane mat of claim 1, wherein the fastening means comprises nails or screws for attaching the metal collar to the opening in the beam(s).

9. The crane mat of claim 1, wherein the lateral rod that passes through the opening includes a flange or ring thereon to assist in positioning the lifting element in the opening, and wherein the lifting element includes a connectable link that releasably connects the lifting element to the lateral rod.

10. The crane mat of claim 9, wherein the lifting element comprises a chain, a cable, a connector, an eyelet, a hook, a D-shaped member, a U-shaped member, or a ring.

11. The crane mat of claim 9, wherein the lifting element comprises a chain, a cable, a connector, an eyelet, a hook, a D-shaped member, a U-shaped member, or a ring.

12. A crane mat comprising a plurality of longitudinal beams that are positioned in a side by side arrangement; each of the beams having a plurality of spaced lateral apertures passing therethrough, with the lateral apertures being in alignment to form bores through the mat; a plurality of lateral rods with each rod passing through each beam through the aligned lateral apertures to hold the beams together in the side by side arrangement; an opening provided in one of the beams or in and between adjacent beams and having a depth sufficient to expose a lateral rod that passes through the opening; an upper layer provided above the beams for forming at least part of an upper surface of the mat, a lower layer provided below the beams for providing forming at least part of a lower surface of the mat, or both upper and lower layers, with the upper and/or lower layers configured to include a cut out portion above or below the opening; and a rectangular metal collar having side plates that extend into the opening but not to the depth where the lateral rod passes through the opening, and an upper plate that extends from the side plates and onto the respective upper and/or lower surfaces of the opening as well as adjacent surfaces of the upper and/or lower layers; fastening means that removably attach the metal collar to the elongated members; wherein the opening is configured to receive, hold and maintain a lifting element therein in a first retracted position below the surface of the mat when not in use and to allow retrieval and removal of the lifting element from the opening to a second position that exposes grasping means when the mat is to be lifted or manipulated;
  wherein the upper and/or lower layers are independently made of a plate, sheet or plurality of elongated members; and wherein the collar protects the elongated member contacting the lifting element and adds stability when the mat is being hoisted or moved; and
  wherein the upper plate of the rectangular metal collar protects the surface of the beam or beams surrounding the opening.

13. The crane mat of claim 12, wherein the lifting element has a body with a first end thereof connected to the lateral rod that passes through the opening, and a second end having the grasping means for allowing a hook or connecting element of equipment to engage the grasping means for lifting and manipulation of the mat.

14. The crane mat of claim 12, wherein the first end of the lifting element includes a first aperture in the body which is configured and dimensioned to receive the lateral rod to allow the lateral rod to pass through the first aperture to attach the lifting element to the lateral rod, and the second end of the lifting element includes a second aperture in the body which is configured and dimensioned to receive the hook or connecting element when removed from the opening and placed in the second position.

15. The crane mat of claim 12, wherein the body of the lifting element is elongated and the first and second ends are arcuate to allow rotational movement of the second end about the lateral rod when the second end is to be rotated from the retracted position where the lifting element is oriented parallel to the beams to the second position where the lifting element is oriented perpendicular to the beams, wherein the opening is sufficiently large to provide space around or access to the lifting element to allow a user to grab the second end to rotate it about the lateral rod and out of the opening, wherein, when in the retracted position a side portion of the lifting element prevents a worker from stepping into the opening.

16. The crane mat of claim 12, which includes at least two openings each configured for receiving, holding and maintaining a lifting element therein, wherein one lifting element is located in an opening associated with a lateral rod nearest one end of the mat and another lifting element is located in an opening associated with a lateral rod nearest the opposite end of the mat, wherein the openings are spaced about 1 to 3 feet from the front or rear ends of the mat.

17. The crane mat of claim 12, wherein the beams have a width by height dimensions of between about 6 by 6 inches to about 24 by 24 inches and a length of between about 4 and about 60 feet, and are made of wood, engineered wood, or a thermosetting plastic material and optionally comprising metal plates located between one or more pairs of beams with the metal plates being essentially the same height and length as the beams.

18. The crane mat of claim 12, wherein each lifting element comprises a chain, a cable, a connector, an eyelet, a hook, a D-shaped member, a U-shaped member, or a ring, wherein each opening associated with a lifting element is configured and dimensioned to hold and maintain the lifting element therein in a first retracted position when not in use and to allow retrieval and removal of the lifting element portion from the opening to a second position that exposes the lifting element portion when the mat is to be lifted or manipulated.

19. The crane mat of claim 12, wherein the fastening means comprises nails or screws for attaching the metal collar to the opening in the elongated member(s).

20. The crane mat of claim 12, wherein the lateral rod that passes through the opening includes a flange or ring thereon to assist in positioning the lifting element in the opening, and wherein the lifting element includes a connectable link that releasably connects the lifting element to the lateral rod.

* * * * *